US012034115B2

(12) United States Patent
Mochizuki et al.

(10) Patent No.: US 12,034,115 B2
(45) Date of Patent: Jul. 9, 2024

(54) SOLID ELECTROLYTE COMPOSITION, SHEET FOR ALL-SOLID STATE SECONDARY BATTERY, ELECTRODE SHEET FOR ALL-SOLID STATE SECONDARY BATTERY, AND ALL-SOLID STATE SECONDARY BATTERY

(71) Applicant: FUJIFILM Corporation, Tokyo (JP)

(72) Inventors: Hiroaki Mochizuki, Kanagawa (JP); Tomonori Mimura, Kanagawa (JP); Yo Kushida, Kanagawa (JP)

(73) Assignee: FUJIFILM Corporation, Tokyo (JP)

(*) Notice: Subject to any disclaimer, the term of this patent is extended or adjusted under 35 U.S.C. 154(b) by 570 days.

(21) Appl. No.: 17/225,126

(22) Filed: Apr. 8, 2021

(65) Prior Publication Data

US 2021/0234194 A1 Jul. 29, 2021

Related U.S. Application Data

(63) Continuation of application No. PCT/JP2019/039800, filed on Oct. 9, 2019.

(30) Foreign Application Priority Data

Oct. 11, 2018 (JP) ................................ 2018-192281

(51) Int. Cl.

| | |
|---|---|
| ***H01M 10/0562*** | (2010.01) |
| ***C08K 3/22*** | (2006.01) |
| ***C08K 3/30*** | (2006.01) |
| ***C08L 75/08*** | (2006.01) |
| ***H01M 4/02*** | (2006.01) |
| ***H01M 4/62*** | (2006.01) |

(Continued)

(52) U.S. Cl.

CPC ........... *H01M 10/0562* (2013.01); *C08K 3/22* (2013.01); *C08K 3/30* (2013.01); *C08L 75/08* (2013.01);

(Continued)

(58) Field of Classification Search

CPC ............. H01M 10/0562; H01M 4/622; H01M 2004/021; H01M 2300/0068;

(Continued)

(56) References Cited

U.S. PATENT DOCUMENTS

| | | | |
|---|---|---|---|
| 9,276,263 | B2 | 3/2016 | Yoshida et al. |
| 10,535,896 | B2 | 1/2020 | Makino et al. |

(Continued)

FOREIGN PATENT DOCUMENTS

| | | |
|---|---|---|
| EP | 3713002 | 9/2020 |
| JP | 2011238494 | * 11/2011 |

(Continued)

OTHER PUBLICATIONS

"International Search Report (Form PCT/ISA/210) of PCT/JP2019/039800," dated Dec. 24, 2019, with English translation thereof, pp. 1-5.

(Continued)

*Primary Examiner* — Lisa S Park

(74) *Attorney, Agent, or Firm* — JCIPRNET

(57) ABSTRACT

There is provided a solid electrolyte composition containing an inorganic solid electrolyte having ion conductivity of a metal belonging to Group 1 or Group 2 in the periodic table and a binder containing non-spherical binder particles consisting of secondary particles formed of primary particles having an average particle size of 1 to 1,000 nm. There are also provided an all-solid state secondary battery, an electrode sheet for an all-solid state secondary battery, and an all-solid state secondary battery, which have a layer constituted of this composition.

18 Claims, 1 Drawing Sheet

(52) U.S. Cl.
CPC ..... *H01M 4/622* (2013.01); *C08K 2003/2244* (2013.01); *C08K 2003/3009* (2013.01); *H01M 2004/021* (2013.01); *H01M 2300/0068* (2013.01)

(58) Field of Classification Search
CPC ..... H01M 2004/027; H01M 2004/028; H01M 10/052; H01M 4/13; H01M 4/62; C08K 3/22; C08K 3/30; C08K 2003/2244; C08K 2003/3009; C08L 75/08; Y02E 60/10; C03C 3/321; C08G 18/227; C08G 18/282; C08G 18/6692; C08G 18/69; C08G 18/758; C08G 18/7621; C08G 18/348; C08G 18/4833; C08G 18/698; C08G 18/7664; H01B 1/10; H01B 1/20; H01B 1/06; C01B 17/22
See application file for complete search history.

(56) References Cited

U.S. PATENT DOCUMENTS

| | | | |
|---|---|---|---|
| 2016/0359195 | A1 | 12/2016 | Makino et al. |
| 2018/0277891 | A1 | 9/2018 | Mimura et al. |
| 2021/0091409 | A1 | 3/2021 | Mimura et al. |

FOREIGN PATENT DOCUMENTS

| | | |
|---|---|---|
| JP | 2012099315 | 5/2012 |
| JP | 2015167126 | 9/2015 |
| KR | 1020160119194 | 10/2016 |
| WO | 2012173089 | 12/2012 |
| WO | 2015122290 | 8/2015 |
| WO | 2017099248 | 6/2017 |

OTHER PUBLICATIONS

"Written Opinion of the International Searching Authority (Form PCT/ISA/237) of PCT/JP2019/039800," dated Dec. 24, 2019, with English translation thereof, pp. 1-7.
"Search Report of Europe Counterpart Application", dated Nov. 5, 2021, p. 1-p. 11.
"Office Action of Korea Counterpart Application", dated Dec. 20, 2022, with English translation thereof, p. 1-p. 11.

* cited by examiner

SOLID ELECTROLYTE COMPOSITION, SHEET FOR ALL-SOLID STATE SECONDARY BATTERY, ELECTRODE SHEET FOR ALL-SOLID STATE SECONDARY BATTERY, AND ALL-SOLID STATE SECONDARY BATTERY

CROSS-REFERENCE TO RELATED APPLICATIONS

This application is a Continuation of PCT International Application No. PCT/JP2019/039800 filed on Oct. 9, 2019, which claims priority under 35 U.S.C. § 119 (a) to Japanese Patent Application No. 2018-192281 filed in Japan on Oct. 11, 2018. Each of the above applications is hereby expressly incorporated by reference, in its entirety, into the present application.

BACKGROUND OF THE INVENTION

1. Field of the Invention

The present invention relates to a solid electrolyte composition, a sheet for an all-solid state secondary battery, an electrode sheet for an all-solid state secondary battery, and an all-solid state secondary battery.

2. Description of the Background Art

A lithium ion secondary battery is a storage battery including a negative electrode, a positive electrode, and an electrolyte sandwiched between the negative electrode and the positive electrode and enables charging and discharging by the reciprocal migration of lithium ions between both electrodes. In the related art, in lithium ion secondary batteries, an organic electrolytic solution has been used as the electrolyte. However, in organic electrolytic solutions, liquid leakage is likely to occur, there is a concern that a short-circuit and ignition may be caused in batteries due to overcharging or overdischarging, and there is a demand for additional improvement in safety and reliability.

Under these circumstances, all-solid state secondary batteries in which an inorganic solid electrolyte is used instead of the organic electrolytic solution are attracting attention. In an all-solid state secondary battery, a negative electrode, an electrolyte, and a positive electrode are all solid, and safety and reliability of batteries including an organic electrolytic solution can be significantly improved.

In such an all-solid state secondary battery, as a material which forms a constituent layer such as a negative electrode active material layer, a solid electrolyte layer, and a positive electrode active material layer, a material containing an inorganic solid electrolyte or further containing an active material, a conductive auxiliary agent, or the like, and further a binder (a binding agent) that binds these solid particles is being studied. Further, the kind and the structure of the polymer which forms the binder which is used for such materials, the shape of the binder, and the like are also being studied.

As a material focusing on the structure of the polymer and the like, for example, WO2012/173089A discloses a slurry containing a binding agent consisting of a particle polymer having a core-shell structure having a specific average particle size, and an inorganic solid electrolyte. Further, as a material focusing on the shape of the binder and the like, for example, JP2015-167126A discloses a solid electrolyte composition containing non-spherical polymer particles having a specific group, a dispersion medium, and an inorganic solid electrolyte.

SUMMARY OF THE INVENTION

Since a constituent layer of an all-solid state secondary battery is formed of solid particles, it is generally difficult to form a good interface state between the solid particles. For example, in a case where the interfacial contact of the inorganic solid electrolyte, the active material, or the like is not sufficient, the interfacial resistance increases (the ion conductivity and the battery capacity decrease). Further, in a case where the binding property between the solid particles is weak, the constituent layer does not have sufficient strength. Further, poor contact between solid particles occurs due to the contraction and expansion of a constituent layer, in particular, an active material layer caused by charging and discharging of an all-solid state secondary battery (intercalation and deintercalation of lithium ions). As a result, the electrical resistance rises, and the battery performance rapidly deteriorates, leading to a shortening of battery life.

Moreover, in recent years, the development of all-solid state secondary batteries has progressed rapidly, and in addition to overcoming the above problems, further improvement of battery performance such as discharge capacity and discharge capacity density is demanded.

An object of the present invention is to provide a solid electrolyte composition. In an all-solid state secondary battery obtained by using the solid electrolyte composition as a material which forms a constituent layer, an increase in the interfacial resistance between solid particles can be suppressed, the solid particles cab be firmly bound, and an excellent discharge capacity and an excellent discharge capacity density can be maintained even after repeated charging and discharging. In addition, another object of the present invention is to provide a sheet for an all-solid state secondary battery and an electrode sheet for an all-solid state secondary battery, which have a layer formed of the solid electrolyte composition and thus are excellent in film strength. Further, another object of the present invention is to provide an all-solid state secondary battery capable of maintaining an excellent discharge capacity, an excellent discharge capacity density, and excellent resistance.

As a result of various studies, the inventors of the present invention have found that in a case where binder particles that are used in combination with an inorganic solid electrolyte in the material which forms the above-described constituent layer are formed of secondary particles which are formed of primary particles having a specific average particle size and are formed to have a non-spherical shape, a high-strength layer in which the solid particles are firmly bound in a state where the interfacial resistance between the solid particles is suppressed can be formed. Moreover, the inventors have found that an all-solid state secondary battery having this layer as a constituent layer can maintain a high discharge capacity and a discharge capacity density even after repeated charging and discharging, and exhibits a good battery life. The present invention has been completed through further studies based on these findings.

That is, the above problems have been solved by the following means.

<1> A solid electrolyte composition comprising an inorganic solid electrolyte having an ion conductivity of a metal belonging to Group 1 or Group 2 in the periodic table and a binder consisting of a polymer, in which the binder contains a non-spherical binder particle which consists of secondary particles formed of primary particles having an average primary particle size of 1 to 1,000 nm.

<2> The solid electrolyte composition according to <1>, in which the secondary particles have an average particle size of 2 to 1,000 times the average primary particle size.

<3> The solid electrolyte composition according to <1> or <2> in which the secondary particle has an aspect ratio of 1.1 to 1,000.

<4> The solid electrolyte composition according to any one of <1> to <3>, in which the polymer exhibits a breaking elongation of 10% or more.

<5> The solid electrolyte composition according to any one of <1> to <4>, further comprising a dispersion medium.

<6> The solid electrolyte composition according to any one of <1> to <5>, further comprising an active material.

<7> The solid electrolyte composition according to <6>, in which the active material is an active material that is capable of being alloyed with lithium.

<8> The solid electrolyte composition according to any one of <1> to <7>, in which the polymer contains at least one functional group selected from Group (a) of functional groups, Group (a) of functional groups an acidic functional group, a basic functional group, a hydroxy group, a cyano group, an alkoxysilyl group, an aryl group, a heteroaryl group, and an aliphatic hydrocarbon ring group in which 3 or more rings are fused.

<9> The solid electrolyte composition according to any one of <1> to <8>, in which the polymer is polyamide, polyimide, polyurea, polyurethane, or a (meth)acrylic polymer.

<10> The solid electrolyte composition according to any one of <1> to <9>, in which the inorganic solid electrolyte is a sulfide-based solid electrolyte.

<11> A sheet for an all-solid state secondary battery, comprising a layer formed of the solid electrolyte composition according to any one of <1> to <10>.

<12> An electrode sheet for an all-solid state secondary battery, the electrode sheet comprising an active material layer formed of the solid electrolyte composition according to <6> or <7>.

<13> An all-solid state secondary battery comprising, in the following order; a positive electrode active material layer, a solid electrolyte layer, and a negative electrode active material layer, in which at least one of the positive electrode active material layer, the negative electrode active material layer, or the solid electrolyte layer is a layer formed of the solid electrolyte composition according to any one of <1> to <10>.

<14> The all-solid state secondary battery according to <13>, in which the negative electrode active material layer is a layer formed of the solid electrolyte composition according to <6> or <7>.

In a case where the solid electrolyte composition according to an aspect of the present invention is used, a solid electrolyte layer with which an increase in the interfacial resistance between solid particles is suppressed, the solid particles is firmly bound, and an excellent discharge capacity and an excellent discharge capacity density are maintained even after repeated charging and discharging can be formed. Further, the sheet for an all-solid state secondary battery and the electrode sheet for an all-solid state secondary battery according to another aspect of the present invention have a layer formed of the solid electrolyte composition according to the embodiment of the present invention and are excellent in film strength. Further, the all-solid state secondary battery according to another aspect of the present invention is capable of maintaining an excellent discharge capacity, an excellent discharge capacity density, and excellent resistance.

The above-described and other characteristics and advantages of the present invention will be further clarified by the following description with appropriate reference to the accompanying drawing.

DESCRIPTION OF THE PREFERRED EMBODIMENTS

Figure 1:
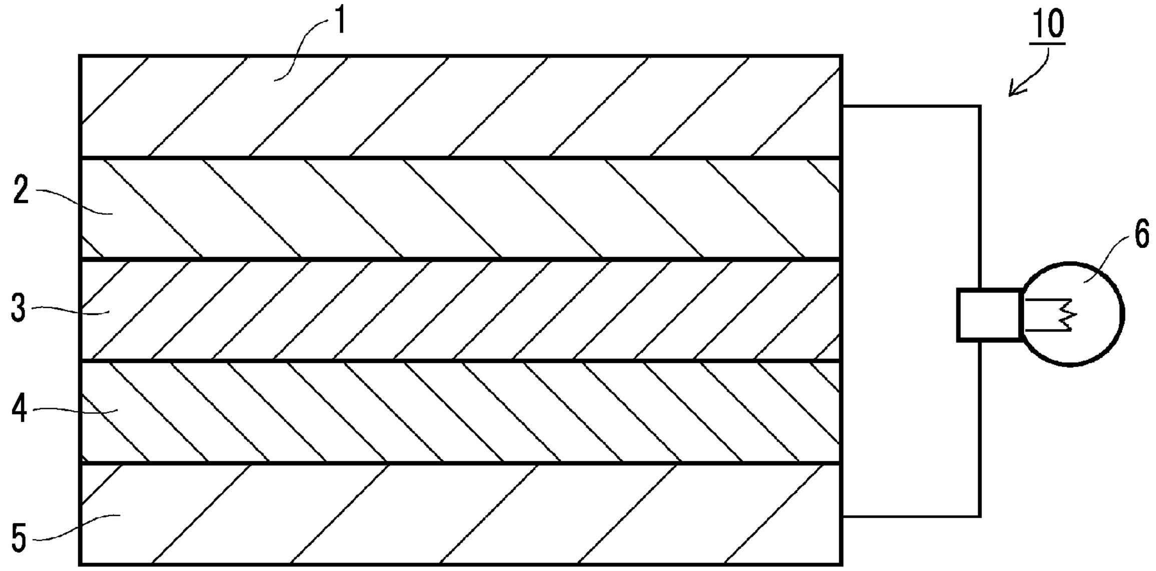
FIG. 1 is a vertical cross-sectional view schematically illustrating an all-solid state secondary battery according to a preferred embodiment of the present invention.

In the description of the present invention, numerical ranges expressed using "to" include numerical values before and after the "to" as the lower limit value and the upper limit value.

In the description of the present specification, the simple expression "acryl" or "(meth)acryl" refers to acryl and/or methacryl.

In the present specification, the expression of a compound (for example, in a case where a compound is represented by an expression with "compound" added to the end) refers to not only the compound itself but also a salt or an ion thereof. In addition, this expression also refers to a derivative obtained by modifying a part of the compound, for example, by introducing a substituent into the compound within a range where desired effects are exhibited.

A substituent, a linking group, or the like (hereinafter, referred to as "substituent or the like") is not specified in the present specification regarding whether to be substituted or unsubstituted may have an appropriate substituent. Accordingly, even in a case where a YYY group is simply described in the present specification, this YYY group includes not only an aspect having a substituent but also an aspect not having a substituent. The same shall be applied to a compound that is not specified in the present specification regarding whether to be substituted or unsubstituted. Preferred examples of the substituent include a substituent T described below.

In the present specification, in a case where a plurality of substituents or the like represented by a specific reference numeral are present or a plurality of substituents or the like are simultaneously or alternatively defined, the respective substituents or the like may be the same as or different from each other. In addition, unless specified otherwise, in a case where a plurality of substituents or the like are adjacent to each other, the substituents may be linked or fused to each other to form a ring.

In the present invention, unless specified otherwise, molecular weights of a polymer and an oligomer (including polymer chains) refer to mass-average molecular weights in terms of standard polystyrene by gel permeation chromatography (GPC). Regarding the measurement method of the mass-average molecular weight and the number-average molecular weight (in terms of standard polystyrene), basically, a value measured using a method under the following condition 1 or condition 2 (preferred) is used. However, an appropriate eluent can be appropriately selected depending on the kind of polymer or the like.

(Conditions 1)

Column: Two TOSOH TSKgel Super AWM-H (trade name, manufactured by Tosoh Corporation) columns connected to each other Carrier: 10 mM LiBr/N-methylpyrrolidone Measurement temperature: 40° C.

Carrier flow rate: 1.0 ml/min

Sample concentration: 0.1% by mass

Detector: refractive index (RI) detector (Condition 2)

Column: A column obtained by connecting TOSOH TSKgel Super HZM-H, TOSOH TSKgel Super HZ4000, and TOSOH TSKgel Super HZ2000 (all of which are trade names, manufactured by Tosoh Corporation)

Carrier: tetrahydrofuran

Measurement temperature: 40° C.

Carrier flow rate: 1.0 ml/min

Sample concentration: 0.1% by mass

Detector: refractive index (RI) detector

[Solid Electrolyte Composition]

The solid electrolyte composition according to the embodiment of the present invention (also referred to as an inorganic solid electrolyte-containing composition) contains an inorganic solid electrolyte and a binder particle consisting of a polymer. This binder particle contains a non-spherical binder particle which consists of secondary particles formed of primary particles having an average primary particle size of 1 to 1,000 nm.

The non-spherical binder particle is not particularly limited as long as the binder particles can bind solid particles of the inorganic solid electrolyte and the like to each other and further bind solid particles and an adjacent layer (for example, a current collector) to each other in a case where the non-spherical binder particle is used for a constituent layer or a coated and dried layer of the solid electrolyte composition described below. The non-spherical binder particles do not have to bind the solid particles in the solid electrolyte composition.

In a case where the solid electrolyte composition according to the embodiment of the present invention contains an inorganic solid electrolyte and a non-spherical binder particle as one kind of the binder particle, the solid particles are firmly bound in the constituent layer formed of the solid electrolyte composition in a state where an increase in the interfacial resistance between the solid particles is suppressed, and an all-solid state secondary battery having this constituent layer can maintain an excellent discharge capacity and an excellent discharge capacity density even after repeated charging and discharging. Although not yet clear, the details of the reason can be considered as follows.

The non-spherical binder particles contained in the solid electrolyte composition according to the embodiment of the present invention are not spherical but non-spherical, which will be described in detail later, and can be adsorbed (adhered) to the surface of solid particles without the excessive coating of the surface of the solid particles in the constituent layer and the like. As a result, contact between the uncoated surfaces of the solid particles can be ensured, and a sufficient ion conduction path and/or sufficient electron conduction path can be formed. In addition since the surface area of the binder particles is large, the solid particles can be firmly bound to each other, and in a case where the constituent layer is formed on the current collector, the current collector and the solid particles can be firmly bound to each other. Further, it is considered that even in a case where the contraction and expansion of the constituent layer, particularly, the active material layer, occurs due to charging and discharging and particularly in a case where a network is constructed by a plurality of binder particles, the binder particles can be deformed in good response to the volume change due to contraction and expansion or can be deformed to be capable of absorbing the volume change since the binder particles are non-spherical. Due to such deformation of the binder particles, a firmly bound state between the solid particles can be maintained. It is considered that the above-described action and function can increase the discharge capacity (the discharge capacity density) while suppressing the interfacial resistance between solid particles to be low, and can suppress an increase in battery resistance and a shortening of battery life.

As described above, it is considered that in the constituent layer formed of the solid electrolyte composition according to the embodiment of the present invention, the contact state (the construction volume of the ion conduction path constructed) between the solid particles and the binding force between the solid particles and the like are improved with a good balance, the solid particles and the like are bound to each other with a firm binding property while constructing an ion conduction path, and thus the interfacial resistance between the solid particles is low. Each of the sheets or the all-solid state secondary battery, which has a constituent layer having such excellent characteristics, exhibits a high discharge capacity (discharge capacity density) while suppressing an increase in electrical resistance. Further, the high discharge capacity can be maintained even in a case where charging and discharging is repeated.

The solid electrolyte composition according to the embodiment of the present invention includes an aspect including not only an inorganic solid electrolyte but also an active material and appropriately further a conductive auxiliary agent or the like as a dispersoid (the composition in this aspect may be referred to as the "composition for an electrode"). In the solid electrolyte composition according to the embodiment of the present invention, even in a case of containing a negative electrode active material having a large volume change due to charging and discharging, the bound state and the contact state of the solid particles can be maintained in response to the volume change of the negative electrode active material (the negative electrode active material layer) or by absorbing the volume change, and thus the above-described excellent action and effect are exhibited. As a result, regarding the solid electrolyte composition according to the embodiment of the present invention, an aspect containing the negative electrode active material is one of the preferred aspects.

Since the solid electrolyte composition according to the embodiment of the present invention is suitably used as a material which forms a constituent layer of an all-solid state secondary battery, an aspect containing a dispersion medium is preferable. In the aspect in which the solid electrolyte composition according to the embodiment of the present invention contains a dispersion medium, it is preferable that the inorganic solid electrolyte and the non-spherical binder particles are dispersed in the dispersion medium in a solid state.

The solid electrolyte composition according to the embodiment of the present invention is a non-aqueous composition. In the present invention, the non-aqueous composition includes not only an aspect not including moisture but also an aspect where the moisture content (also referred to as the "water content") is 50 ppm or lower. In the non-aqueous composition, the moisture content is preferably 20 ppm or lower, more preferably 10 ppm or lower, and still more preferably 5 ppm or lower. The moisture content refers to the content of water (mass proportion to the solid electrolyte composition) in the solid electrolyte composition. The moisture content can be obtained by Karl Fischer titration after filtering the solid electrolyte composition through a membrane filter having a pore size of 0.45 μm.

Hereinafter, components that the solid electrolyte composition according to the embodiment of the present invention contains and is capable of containing will be described.

<Inorganic Solid Electrolyte>

In the present invention, the inorganic solid electrolyte is an inorganic solid electrolyte, and the solid electrolyte refers to a solid-form electrolyte capable of migrating ions therein. The inorganic solid electrolyte is clearly distinguished from organic solid electrolytes (polymer electrolytes such as polyethylene oxide (PEO) and organic electrolyte salts such as lithium bis(trifluoromethanesulfonyl)imide (LiTFSI)) since the inorganic solid electrolyte does not include any organic substance as a principal ion conductive material. In addition, the inorganic solid electrolyte is solid in a steady state and thus, typically, is not dissociated or liberated into cations and anions. Due to this fact, the inorganic solid electrolyte is also clearly distinguished from inorganic electrolyte salts of which cations and anions are dissociated or liberated in electrolytic solutions or polymers ($LiPF_6$, $LiBF_4$, LiFSI, LiCl, and the like). The inorganic solid electrolyte is not particularly limited as long as it has an ion conductivity of a metal belonging to Group 1 or Group 2 in the periodic table and generally does not have electron conductivity. In a case where the all-solid state secondary battery according to the embodiment of the present invention is a lithium ion battery, the inorganic solid electrolyte preferably has an ion conductivity of an lithium ion.

As the inorganic solid electrolyte, a solid electrolyte material that is typically used for an all-solid state secondary battery can be appropriately selected and used. Examples of the inorganic solid electrolyte include (i) a sulfide-based inorganic solid electrolyte, (ii) an oxide-based inorganic solid electrolyte, (iii) a halide-based inorganic solid electrolyte, and (iv) a hydride-based solid electrolyte. In the present invention, from the viewpoint of the high ion conductivity and easiness of the interfacial joining between particles and from the viewpoint that a more favorable interface can be formed between the active material and the inorganic solid electrolyte, an sulfide-based inorganic solid electrolyte is preferably used.

(i) Sulfide-Based Inorganic Solid Electrolyte

The sulfide-based inorganic solid electrolyte is preferably a compound that contains a sulfur atom, has an ion conductivity of a metal belonging to Group 1 or Group 2 in the periodic table, and has electron-insulating properties. The sulfide-based inorganic solid electrolytes are preferably inorganic solid electrolytes which, as elements, contain at least Li, S, and P and have an ion conductivity of a lithium ion, but the sulfide-based inorganic solid electrolytes may also include elements other than Li, S, and P depending on the purposes or cases.

Examples of the sulfide-based inorganic solid electrolyte include a lithium ion-conductive sulfide-based inorganic solid electrolyte satisfying the composition represented by Formula (1).

$$L_{a1}M_{b1}P_{c1}S_{d1}A_{e1} \qquad \text{Formula (I)}$$

In the formula, L represents an element selected from Li, Na, or K and is preferably Li. M represents an element selected from B, Zn, Sn, Si, Cu, Ga, Sb, Al, or Ge. A represents an element selected from I, Br, Cl, or F, and a1 to e1 represent the compositional ratios between the respective elements, and a1:b1:c1:d1:e1 satisfies 1 to 12:0 to 5:1:2 to 12:0 to 10. a1 is preferably 1 to 9 and more preferably 1.5 to 7.5. b1 is preferably 0 to 3 and more preferably 0 to 1. d1 is preferably 2.5 to 10 and more preferably 3.0 to 8.5. e1 is preferably 0 to 5 and more preferably 0 to 3.

The compositional ratios between the respective elements can be controlled by adjusting the ratios of raw material compounds blended to manufacture the sulfide-based inorganic solid electrolyte as described below.

The sulfide-based inorganic solid electrolytes may be non-crystalline (glass) or crystallized (made into glass ceramic) or may be only partially crystallized. For example, it is possible to use Li—P—S-based glass containing Li, P, and S or Li—P—S-based glass ceramic containing Li, P, and S.

The sulfide-based inorganic solid electrolytes can be manufactured by a reaction of at least two raw materials of, for example, lithium sulfide ($Li_2S$), phosphorus sulfide (for example, diphosphorus pentasulfide ($P_2S_5$)), a phosphorus single body, a sulfur single body, sodium sulfide, hydrogen sulfide, lithium halides (for example, LiI, LiBr, and LiCl), or sulfides of an element represented by M (for example, $SiS_2$, SnS, and $GeS_2$).

The ratio of $Li_2S$ to $P_2S_5$ in Li—P—S-based glass and Li—P—S-based glass ceramic is preferably 60:40 to 90:10 and more preferably 68:32 to 78:22 in terms of the molar ratio, $Li_2S$:$P_2S_5$. In a case where the ratio between $Li_2S$ and $P_2S_5$ is set in the above-described range, it is possible to increase an ion conductivity of a lithium ion. Specifically, an ion conductivity of a lithium ion can be preferably set to $1\times10^{-4}$ S/cm or more and more preferably set to $1\times10^{-3}$ S/cm or more. The upper limit is not particularly limited but realistically $1\times10^{-1}$ S/cm or less.

As specific examples of the sulfide-based inorganic solid electrolytes, combination examples of raw materials will be described below. Examples thereof include $Li_2S$—$P_2S_5$, $Li_2S$—$P_2S_5$—LiCl, $Li_2S$—$P_2S_5$—$H_2S$, $Li_2S$—$P_2S_5$—$H_2S$—LiCl, $Li_2S$—LiI—$P_2S_5$, $Li_2S$—LiI—$Li_2O$—$P_2S_5$, $Li_2S$—LiBr—$P_2S_5$, $Li_2S$—$Li_2O$—$P_2S_5$, $Li_2S$—$Li_3PO_4$—$P_2S_5$, $Li_2S$—$P_2S_5$—$P_2O_5$, $Li_2S$—$P_2S_5$—$SiS_2$, $Li_2S$—$P_2S_5$—$SiS_2$—LiCl, $Li_2S$—$P_2S_5$—SnS, $Li_2S$—$P_2S_5$—$Al_2S_3$, $Li_2S$—$GeS_2$, $Li_2S$—$GeS_2$—ZnS, $Li_2S$—$Ga_2S_3$, $Li_2S$—$GeS_2$—$Ga_2S_3$, $Li_2S$—$GeS_2$—$P_2S_5$, $Li_2S$-$Ges_2$-$Sb_2S_5$, $Li_2S$—$GeS_2$—$Al_2S_3$, $Li_2S$—$SiS_2$, $Li_2S$—$SiS_5$, $Li_2s$-$Al_2S_3$, $Li_2S$—$SiS_2$—$Al_2S_3$, $Li_2S$—$SiS_2$—$P_2S_5$, $Li_2S$—$SiS_2$—$P_2S_5$—LiI, $Li_2S$—$SiS_2$—LiI, $Li_2S$—$SiS_2$—$Li_4SiO_4$, $Li_2S$—$SiS_2$—$Li_3PO_4$, and $Li_{10}GeP_2S_{12}$. The mixing ratio between the individual raw materials does not matter. Examples of the method of synthesizing a sulfide-based inorganic solid electrolyte material using the above-described raw material compositions include an amorphization method. Examples of the amorphization method include a mechanical milling method, a solution method, and a melting quenching method. This is because treatments at a normal temperature become possible, and it is possible to simplify manufacturing processes.

(ii) Oxide-Based Inorganic Solid Electrolytes

The oxide-based inorganic solid electrolyte is preferably a compound that contains an oxygen atom, has an ion conductivity of a metal belonging to Group 1 or Group 2 in the periodic table, and has electron-insulating properties.

The ion conductivity of the oxide-based inorganic solid electrolyte is preferably $1\times10^{-6}$ S/cm or more, more preferably $5\times10^{-6}$ S/cm or more, and particularly preferably $1\times10^{-5}$ S/cm or more. The upper limit is not particularly limited; however, it practically $1\times10^{-1}$ S/cm or less.

Specific examples of the compound include $Li_{xa}La_{ya}TiO_3$ [xa=0.3 to 0.7 and ya=0.3 to 0.7] (LLT), $Li_{xb}La_{yb}Zr_{zb}M^{bb}_{mb}O_{nb}$ ($M^{bb}$ is at least one element of Al, Mg, Ca, Sr, V, Nb, Ta, Ti, Ge, In or Sn, xb satisfies 5≤xb≤10, yb satisfies 1≤yb≤4, zb satisfies 1≤zb≤4, mb satisfies 0≤mb≤2, and nb satisfies 5≤nb≤20), $Li_{xc}B_{yc}M^{cc}_{zc}O_{nc}$ ($M^{cc}$ is at least one element of C, S, Al, Si, Ga, Ge, In, or Sn, xc satisfies 0<xc≤5, yc satisfies 0<yc≤1, zc satisfies 0<zc≤1, and nc satisfies 0<nc≤6), $Li_{xd}(Al, Ga)_{yd}(Ti, Ge)_{zd}Si_{ad}P_{md}O_{nd}$ (1≤xd≤3, 0≤yd≤1, 0≤zd≤2, 0≤ad≤1, 1≤md≤7, 3≤nd≤13), $Li_{(3-2xe)}M^{ee}_{xe}D^{ee}O$ (xe represents a number value of 0 or more and 0.1 or less, $M^{ee}$ represents a divalent metal atom, and $D^{ee}$ represents a halogen atom or a combination of two or more halogen atoms), $Li_{xf}Si_{yf}O_{zf}$ (1≤xf≤5, 0<yf≤3, 1≤zf≤10), $Li_{xg}S_{yg}O_{zg}$ (1≤xg≤3, 0<yg≤2, 1≤zg≤10), $Li_3BO_3$—$Li_2SO_4$, $Li_2O$—$B_2O_3$—$P_2O_5$, $Li_2O$—$SiO_2$, $Li_6BaLa_2Ta_2O_{12}$, $Li_3PO_{(4-3/2w)}N_w$ (w satisfies w<1), $Li_{3.5}Zn_{0.25}GeO_4$ having a lithium super ionic conductor (LISICON)-type crystal structure, $La_{0.55}Li_{0.35}TiO_3$ having a perovskite type crystal structure, $LiTi_2P_3O_{12}$ having a natrium super ionic conductor (NASICON)-type crystal structure, $Li_{1+xh+yh}(Al, Ga)_{xh}(Ti, Ge)_{2-xh}Si_{yh}P_{3-yh}O_{12}$ (0≤xh≤1, 0≤yh≤1), $Li_7La_3Zr_2O_{12}$ (LLZ) having a garnet-type crystal structure. In addition, phosphorus compounds containing Li, P, and O are also desirable. Examples thereof include lithium phosphate ($Li_3PO_4$) and LiPON in which a part of the oxygens in lithium phosphate are substituted with nitrogens, $LiPOD^1$ ($D^1$ is at least one element selected from Ti, V, Cr, Mn, Fe, Co, Ni, Cu, Zr, Nb, Mo, Ru, Ag, Ta, W, Pt, Au, or the like). It is also possible to preferably use $LiA^1ON$ ($A^1$ represents at least one element selected from Si, B, Ge, Al, C, Ga, or the like) and the like.

(iii) Halide-Based Inorganic Solid Electrolyte

The halide-based inorganic solid electrolyte is preferably a compound that is generally used, contains a halogen atom, has an ion conductivity of a metal belonging to Group 1 or Group 2 in the periodic table, and has electron-insulating properties.

The halide-based inorganic solid electrolyte is not particularly limited, and examples thereof include LiCl, LiBr, LiI, and compounds such as $Li_3YBr_6$ or $Li_3YCl_6$ described in ADVANCED MATERIALS, 2018, 30, 1803075. In particular, $Li_3YBr_6$ or $Li_3YCl_6$ is preferable.

(iv) Hydride-Based Inorganic Solid Electrolyte

The hydride-based inorganic solid electrolyte is preferably a compound that contains a hydrogen atom, has an ion conductivity of a metal belonging to Group 1 or Group 2 in the periodic table, and has electron-insulating properties.

The hydride-based inorganic solid electrolyte is not particularly limited, and examples thereof include $LiBH_4$, $Li_4(BH_4)_3I$, and $3LiBH_4$—LiCl.

The inorganic solid electrolyte is preferably in the form of particles. In this case, the average particle size (volume-average particle size) of the inorganic solid electrolyte is not particularly limited; however, it is preferably 0.01 μm or more and more preferably 0.1 μm or more. The upper limit is preferably 100 μm or less and more preferably 50 μm or less. The average particle size of the inorganic solid electrolyte is measured in the following order. The inorganic solid electrolyte particles are diluted and prepared using water (heptane in a case where the inorganic solid electrolyte is unstable in water) in a 20 mL sample bottle to prepare 1% by mass of a dispersion liquid. The diluted dispersion liquid sample is irradiated with 1 kHz ultrasonic waves for 10 minutes and is then immediately used for testing. Data collection is carried out 50 times using this dispersion liquid sample, a laser diffraction/scattering-type particle size distribution measurement instrument LA-920 (trade name, manufactured by Horiba Ltd.), and a quartz cell for measurement at a temperature of 25° C. to obtain the volume-average particle size. Other detailed conditions and the like can be found in JIS Z8828: 2013 "Particle Size Analysis-Dynamic Light Scattering" as necessary. Five samples per level are prepared and measured, and the average values thereof are employed.

The inorganic solid electrolyte may be used singly, or two or more inorganic solid electrolyte may be used in combination.

In terms of dispersibility, reduction of the interfacial resistance, and binding property, the content of the inorganic solid electrolyte in the solid electrolyte composition is not particularly limited and is preferably 50% by mass or higher, more preferably 70% by mass or higher, and still more preferably 90% by mass or higher, with respect to 100% by mass of the solid content. From the same viewpoint, the upper limit is preferably 99.9% by mass or less, more preferably 99.5% by mass or less, and particularly preferably 99% by mass or less. Here, in a case where the solid electrolyte composition contains an active material described below, the content of the inorganic solid electrolyte in the solid electrolyte composition refers to the total content of the inorganic solid electrolyte and the active material.

In the present invention, the solid content (solid component) refers to components that neither volatilize nor evaporate and disappear in a case where the solid electrolyte composition is dried at 150° C. for 6 hours in a nitrogen atmosphere at a pressure of 1 mmHg. Typically, the solid content refers to a component other than a dispersion medium described below.

<Binder Particle>

The binder contained in the solid electrolyte composition according to the embodiment of the present invention may contain at least one kind of non-spherical binder particles described later and may contain a binder other than the non-spherical binder particles. The binder (aother binder) other than the non-spherical binder particles is not particularly limited, and it may be spherical binder particles or a binder that dissolves in a dispersion medium. Further, the binder may be a binder particle consisting of the primary particles.

The material which forms the binder is not particularly limited; however, a polymer is preferable. Examples thereof include a typical polymer which forms a binder that is used for an all-solid state secondary battery, and further a polymer which forms non-spherical binder particles, which will be described later. The content of the other binder in the solid electrolyte composition according to the embodiment of the present invention is not particularly limited and is appropriately determined.

(Non-Spherical Binder Particle)

The non-spherical binder particles consist of secondary particles formed of primary particles having an average primary particle size of 1 to 1,000 nm. In a case where such non-spherical binder particles are contained as the binder contained in the solid electrolyte composition, a layer having an excellent contact state and an excellent binding force between the solid particles can be formed, with which an all-solid state secondary battery that maintains an excellent performance even in a case where charging and discharging are repeated can be obtained. In addition, it is possible to suppress an increase in battery resistance due to charging and discharging.

In the present invention, the secondary particles refer to particles formed by aggregating a plurality of primary particles (unit particles), and the intermolecular force acting in a case where the primary particles are aggregated may be a physical force (for example, Van der Waals force) or may be a chemical force (for example, a chemical bonding). Examples of the secondary particles include a clustered body or an aggregate of primary particles. In the present invention, the number of primary particles which form the secondary particle is not particularly limited.

It can be confirmed by a conventionally known method that the non-spherical binder particles consist of the secondary particles. Examples thereof include a method of observing the shape using an electron microscope and a measuring method with a particle size measuring device using light scattering or the like. In the present invention, it can also be confirmed at the time of measurement of the aspect ratio of the secondary particles, which will be described later.

-Non-Spherical Binder Particle-

The non-spherical binder particle (secondary particles) does not have to be spherical (perfectly spherical) and have a distorted shape (a shape having anisotropy). The shape pf the non-spherical binder particle is not particularly limited, and examples thereof include an amorphous shape, an elliptical spherical shape, a flat shape, and a (needle-shaped) fibrous shape; however, the shape is not particularly limited.

The non-spherical binder particles (secondary particles) preferably have an (average) aspect ratio of 1.1 to 1,000 [a ratio of average length Ly/average width Lx] in terms of reduction of the interfacial resistance, binding property, and battery performances (discharge capacity, discharge capacity density, and battery life). The aspect ratio of the secondary particle is preferably 1.5 or more, more preferably 2 or more, still more preferably 4 or more, and particularly preferably 9 or more in terms of binding property and the like. On the other hand, particularly in terms of battery life and the like among the battery performances, the aspect ratio of the secondary particle is preferably 500 or less, more preferably 100 or less, and still more preferably 50 or less. The aspect ratio can be adjusted by the composition of the polymer or the synthesis conditions for forming a binder and further the preparation conditions of the dispersion liquid, which will be described later. For example, the aspect ratio tends to decrease as the stirring speed among the preparation conditions of the dispersion liquid is increased. Further, in a case where the polarity of the dispersion medium is improved, the aspect ratio tends to decrease.

The method of measuring the aspect ratio will be described later.

The average length (Ly) of the non-spherical binder particles is not particularly limited; however, for example, it is preferably 10 to 10,000 nm and more preferably 20 to 1,000 nm. The average width (Lx) of the non-spherical binder particles is not particularly limited; however, for example, it is preferably 5 to 1,000 nm and more preferably 10 to 500 nm.

The average particle size (also referred to as the average secondary particle size) of the non-spherical binder particles (secondary particles) is not particularly limited; however, for example, it is preferably 2 to 1,000 times the average particle size (also referred to as the average primary particle size) of the primary particles since the reduction of interfacial resistance, binding property, and battery performance are in balance with each other. The average secondary particle size is preferably 2.2 times or more, more preferably 2.5 times or more, still more preferably 3.0 times or more, and particularly preferably 6.2 times or more relative to the average primary particle size in terms of stability of the secondary particles and the like. On the other hand, the average secondary particle size is preferably 500 times or less, more preferably 100 times or less, still more preferably 50 times or less, and particularly preferably 25 times or less in terms of reduction of the interfacial resistance and the like.

Specifically, the average secondary particle size is, for example, preferably 5 nm or more, more preferably 10 nm or more, still more preferably 20 nm or more, and particularly preferably 30 nm or more, and can also be 230 nm or more. The upper limit is preferably 1,000 nm or less, more preferably 500 nm or less, still more preferably 400 nm or less, and particularly preferably 300 nm or less.

-Primary Particle-

The primary particles which form the secondary particles are, for example, particles consisting of a polymer described later and have an average primary particle size of 1 to 1,000 nm. In a case where the average primary particle size is in the above range, secondary particles can be easily formed, and reduction of interfacial resistance, binding property, and battery performance can be in balance with each other. The average primary particle size is preferably 2 nm or more, more preferably 3 nm or more, and still more preferably 5 nm or more in terms of reduction of the interfacial resistance and the like. On the other hand, in terms of binding property and the like, the average primary particle size is preferably 500 nm or less, more preferably 400 nm or less, still more preferably 300 nm or less, and even still more preferably 100 nm or less. The average primary particle size can be adjusted by the composition of the polymer or synthesis conditions for forming the binder, and further the preparation conditions of the dispersion liquid, which will be described later. For example, in a case where the molecular weight of the polymer increased, the average primary particle size tends to increase. Further, in a case where the polarity of the dispersion medium is decreased, the average primary particle size tends to decrease.

The shape of the primary particle is not particularly limited and may be spherical or non-spherical.

-Method of Measuring Aspect Ratio and Average Particle Size-

The aspect ratio and the average particle size (the average primary particle size and the average secondary particle size) of the non-spherical binder particles are measured as follows.

Non-spherical binder particles are mixed with a dispersion medium (for example, octane) to prepare a dispersion liquid for measurement. The concentration of the binder particles is not particularly limited; however, the binder is diluted to a concentration (for example, about 0.5% by mass) at which the binder particles are dispersed in a state of being isolated from each other in the dispersion liquid for measurement. The dispersion liquid for measurement prepared in this manner is dropwise added to a grid mesh for observation with a transmission electron microscope (TEM), and then dried at room temperature. Thereafter, the dispersion liquid for measurement is observed by TEM and a TEM image is taken. The obtained TEM image is converted into a bitmap (BMP) file, 50 isolated binder particles are captured by “A Image-Kun”, which is an integrated application of IP-1000PC (trade name, manufactured by ASAHI ENGI- NEERING Co., Ltd.), and then the diameter of each of 50 primary particles forming the binder particle is measured for each binder particle. The average value of the diameters measured in this manner is determined, and this average value is used as the average primary particle size.

Further, in the above TEM image, Lx and Ly are respectively measured for one binder particle, where Ly denotes the length along the shape of the binder particle in the direction in which the length is the longest (in other words, the length in a case where the binder particle is linearly deformed) and Lx denotes the shortest length of the binder particle, which is orthogonal to Ly measured along the binder shape (in other words, the shortest length (width) orthogonal to Ly in a case where the binder particle is linearly deformed). The ratio of the measured Ly to the measured Lx, [Ly/Lx], is determined. The average value of the ratios obtained for the 50 binder particles is denoted by the (average) aspect ratio.

In a case of measuring the aspect ratio and the average particle size of the non-spherical binder particles in a solid electrolyte composition or a constituent layer, the measurement target is the non-spherical binder particles taken out (extracted) from the composition or the constituent layer as follows. The method of taking out the non-spherical binder particles may be any method (condition) that does not cause a change in the size of the non-spherical binder particles. For example, a method of washing the composition or the constituent layer with a solvent that is used as a dispersion medium can be applied. At this time, a solvent that does not dissolve the non-spherical binder particles is used.

-Polymer which Forms Primary Particle-

The polymer (hereinafter, may be referred to as the binder-forming polymer) that forms primary particles (non-spherical binder particles) is not particularly limited, and examples thereof include a typical polymer that forms a binder that is used in an all-solid state secondary battery and further include a polymer described later.

The binder-forming polymer preferably has a breaking elongation of 10% or more, more preferably 30% or more, and more preferably 50% or more, in terms of being capable of achieving a firm binding property while maintaining the reduction of interfacial resistance and battery performance. On the other hand, the upper limit of the breaking elongation is not particularly limited; however, for example, it is practically 10,000% or less, and preferably 1,000% or less and more preferably 800% or less, in terms of being capable of achieving a firm binding property while maintaining the reduction of interfacial resistance and battery performance.

The breaking elongation of the binder-forming polymer may be measured by applying stress to the primary particles alone or by carrying out a tensile test on a film prepared from the secondary particles.

The measurement method using a film will be described below.

-Preparation of Test Pieces-

First, a film as a test piece is prepared. That is, a dispersion liquid of non-spherical binder particles, for example, a dispersion liquid of non-spherical binder particles obtained by a synthesis method described later is applied onto a Teflon (registered trade mark) sheet using a baker-type applicator (manufactured by PALTEK Corporation), and then allowed to stand in an air sending dryer (manufactured by Yamato Scientific Co., Ltd.) to carry out drying at 200° C. for 40 hours. Next, the dried film is used to prepare a standard test piece type 5 using a shopper type sample punching machine (manufactured by YASUDA SEIKI SEISAKUSHO, Ltd.), which is specified by JIS K 7127 "Plastic—Test Method for Tensile Properties, Part 3: Film and Sheet Test Conditions".

-Overview of Tensile Test-

Using the standard test piece type 5 obtained in this manner as a test piece, a tensile test is carried out using a digital force gauge ZTS-5N and a vertical electric measurement stand MX2 series (both trade names, manufactured by Imada Co., Ltd.). Two parallel marking lines are drawn in the central region of the test piece to be separated by 50 mm with each other, the test piece is stretched at a speed of 10 mm per minute, and the tensile breaking strain (referred to as the "breaking elongation" in the present invention) is calculated based on JIS K 7161-1: 2014 "Plastic—Test Method for Tensile Properties" and JIS K 7161-1: 2014 "Plastic—How to determine tensile properties—Part 1: General rules".

In a case of measuring the breaking elongation of the binder-forming polymer of the non-spherical binder particles in the solid electrolyte composition or the constituent layer, the following is carried out. That is, after taking out the non-spherical binder particles according to the method of taking out the non-spherical binder particles described above, the particles are dissolved in a solvent in which the binder-forming polymer is dissolved and measurement is carried out by the above method.

The glass transition temperature of the binder-forming polymer is not particularly limited; however, it is preferably −120° C. to 80° C., more preferably −100 to 60° C., and still more preferably −80° C. to 40° C. in terms of forming a shape according to the shape of the solid particles or the protrusions and recesses on the surface.

In a case where the binder-forming polymer has a plurality of glass transition temperatures, it is preferable that at least one of the glass transition temperature (typically, the highest glass transition temperature) is within the above range, and it is more preferable that all the glass transition temperatures are within the above range.

The glass transition temperature (Tg) is measured using a dry sample and a differential scanning calorimeter "X-DSC7000" (trade name, manufactured by SII Nanotechnology Inc.) under the following conditions. The measurement is carried out twice for the same sample, and the result of the second measurement is adopted.

Atmosphere in measurement room: Nitrogen (50 mL/min)

Temperature rising rate: 5° C./min

Measurement start temperature: −100° C.

Measurement end temperature: 200° C.

Sample pan: Aluminum pan

Mass of measurement sample: 5 mg

Calculation of Tg: Tg is calculated by rounding off the decimal point of the intermediate temperature between the descent start point and the descent end point of the DSC chart.

The glass transition temperature of the binder-forming polymer of the non-spherical binder particles in the solid electrolyte composition or the constituent layer can be obtained, for example, by putting the composition or the constituent layer in water to disperse the content components thereof, subsequently carrying out filtration, collecting the solid remaining after filtration, and measuring the temperature with the above-described measuring method.

The mass-average molecular weight of the binder-forming polymer in the binder is not particularly limited and is preferably 5,000 or more, more preferably 10,000 or higher, and still more preferably 30,000 or higher. The upper limit is preferably 1,000,000 or lower and more preferably 200,000 or lower.

The binder-forming polymer is not particularly limited, and various polymers that form a binder that is used in an all-solid state secondary battery can be applied. Examples thereof include a sequential polymerization (a polycondensation, a polyaddition, or an addition condensation) type polymer such as polyurethane, polyurea, polyamide, polyimide, polyester, polyether, or polycarbonate, and further include, a chain polymerization type polymer such as a fluorine-containing polymer, a hydrocarbon-based polymer, a vinyl polymer, or (meth)acrylic polymer. Examples of the hydrocarbon-based polymer include natural rubber, polybutadiene, polyisoprene, polystyrene butadiene, and hydrogen-added (hydrogenated) polymers thereof. Among the above, the binder-forming polymer is preferably a sequential polymerization type polymer or a (meth)acrylic polymer and more preferably each polymer of polyurethane, polyurea, polyamide, polyimide, or a (meth)acrylic polymer.

Each of the above polymers may be a polymer consisting of one segment or a polymer consisting of two or more segments.

In the present invention, a main chain of the polymer refers to a linear molecular chain in which all the molecular chains forming the polymer other than the main chain can be considered as a branched chain or a pendant with respect to the main chain. Although depending on the mass-average molecular weight of the molecular chain regarded as the pendant, the longest chain among the molecular chains constituting the polymer is typically the main chain. In this case, a functional group at a polymer terminal is not included in the main chain. In addition, side chains of the polymer refer to molecular chains other than the main chain and include a short molecular chain and a long molecular chain.

(Sequential Polymerization Type Polymer)

It is preferable that the sequential polymerization type polymer suitable as the binder-forming polymer is a polymer has a main chain formed by combining 2 or more constituent components (preferably 2 or 3 constituent components) represented by any one of Formulae (I-1) to (1-4) or a main chain formed by sequential polymerization of a carboxylic dianhydride represented by Formula (I-5) and a diamine compound from which a constituent component represented by Formula (I-6) is derived. The combination of each of the constituent components is appropriately selected depending on the kind of polymer. Examples of the main chain consisting of polycarbonate include a main chain having a constituent component represented by Formula (I-2) in which oxygen atoms are introduced at both end portions of $R^{P1}$ or a constituent component represented by Formula (I-2) which adopts a constituent component represented by Formula (I-3) as $R^{P1}$, and a constituent component represented by Formula (I-3). One constituent component in the combination of the constituent components refers to the kind of the constituent component represented by any one of the following formulae. Even in a case where the polymer includes two constituent components represented by one of the following formulae, it is not considered that the polymer includes two kinds of constituent components.

Formula (I-1)

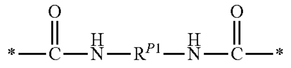

-continued

Formula (I-2)

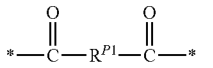

Formula (I-3)

$*—O—R^{P2}—O—*$

Formula (I-4)

$*—HN—R^{P2}—NH—*$

Formula (I-5)

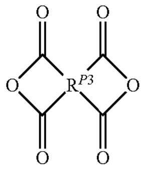

Formula (I-6)

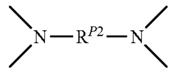

In the formulae, $R^{P1}$ and $R^{P2}$ each independently represent a molecular chain having a (mass-average) molecular weight of 20 to 200,000. The molecular weight of the molecular chain cannot be uniquely determined because it depends on the kind thereof and the like, and is, for example, preferably 30 or higher, more preferably 50 or higher, still more preferably 100 or higher, and still more preferably 150 or higher. The upper limit is preferably 100,000 or lower and more preferably 10,000 or lower. The (mass-average) molecular weight of the molecular chain is measured for a raw material compound before being incorporated into the main chain of the polymer.

The molecular chain which can be adopted as $R^{P1}$ and $R^{P2}$ is not particularly limited and is preferably a hydrocarbon chain, a polyalkylene oxide chain, a polycarbonate chain, or a polyester chain, more preferably a hydrocarbon chain or a polyalkylene oxide chain, and still more preferably a hydrocarbon chain, a polyethylene oxide chain, or a polypropylene oxide chain.

The hydrocarbon chain which can be adopted as $R^{P1}$ and $R^{P2}$ means a chain of hydrocarbon including a carbon atom and a hydrogen atom, and more specifically means a structure in which at least two atoms (for example, hydrogen atoms) or a group (for example, a methyl group) is desorbed from the compound including a carbon atom and a hydrogen atom. However, in the present invention, the hydrocarbon chain also includes a chain that includes a chain having an oxygen atom, a sulfur atom, or a nitrogen atom, for example, as in a hydrocarbon group represented by Formula (M2). A terminal group that may be present in a terminal of the hydrocarbon chain is not included in the hydrocarbon chain. This hydrocarbon chain may include a carbon-carbon unsaturated bond or may include a ring structure of an aliphatic ring and/or an aromatic ring. That is, the hydrocarbon chain may be a hydrocarbon chain including a hydrocarbon selected from an aliphatic hydrocarbon or an aromatic hydrocarbon.

The hydrocarbon chain only has to satisfy the molecular weight and includes a double hydrocarbon chain including a chain consisting of a hydrocarbon group having a low molecular weight and a hydrocarbon chain (also referred to as "hydrocarbon polymer chain") consisting of a hydrocarbon polymer.

The hydrocarbon chain having a low molecular weight is a chain consisting of a typical (non-polymerizable) hydrocarbon group, and examples of the hydrocarbon group include an aliphatic or aromatic hydrocarbon group. Specifically, an alkylene group (having preferably 1 to 12 carbon atoms, more preferably 1 to 6 carbon atoms, and still more preferably 1 to 3 carbon atoms), an arylene group (having preferably 6 to 22 carbon atoms, more preferably 6 to 14 carbon atoms, and still more preferably 6 to 10 carbon atoms), or a group consisting of a combination of the above-described groups is preferable. As the hydrocarbon group forming the hydrocarbon chain having a low molecular weight which can be adopted as $R^{12}$, an alkylene group is more preferable, an alkylene group having 2 to 6 carbon atoms is still more preferable, and an alkylene group having 2 or 3 carbon atoms is still more preferable.

The aliphatic hydrocarbon group is not particularly limited, and examples thereof include a hydrogen reduced form of an aromatic hydrocarbon group represented by Formula (M2) and a partial structure (for example, a group consisting of isophorone) in a conventionally known aliphatic diisocyanate compound.

The aromatic hydrocarbon group is preferably a phenylene group or a hydrocarbon group represented by Formula (M2).

(M2)

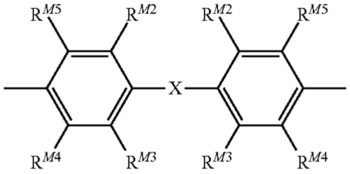

In Formula (M2), X represents a single bond, $—CH_2—$, $—C(CH_3)_2—$, $—SO_2—$, —S—, —CO—, or —O— and is preferably $—CH_2—$ or —O—, and more preferably $—CH_2—$ from the viewpoint of binding property. The alkylene group exemplified herein may be substituted with a substituent T and preferably a halogen atom (more preferably a fluorine atom).

$R^{M2}$ to $R^{M5}$ each independently represent a hydrogen atom or a substituent and preferably a hydrogen atom. The substituent which can be adopted as $R^{M2}$ to $R^{M5}$ is not particularly limited, and examples thereof include an alkyl group having 1 to 20 carbon atoms, an alkenyl group having 1 to 20 carbon atoms, $—OR^{M6}$, $—N(R^{M6})_2$, $—SR^{M6}$ ($R^{M6}$ represents a substituent and preferably an alkyl group having 1 to 20 carbon atoms or an aryl group having 6 to 10 carbon atoms), and a halogen atom (for example, a fluorine atom, a chlorine atom, or a bromine atom). Examples of $—N(R^{M6})_2$ include an alkylamino group (having preferably 1 to 20 carbon atoms and more preferably 1 to 6 carbon atoms) and an arylamino group (having preferably 6 to 40 carbon atoms and more preferably 6 to 20 carbon atoms).

The hydrocarbon polymer chain is not particularly limited as long as it is a polymer chain formed by polymerizing (at least two) polymerizable hydrocarbons and a chain consisting of a hydrocarbon polymer having a larger number of carbon atoms than the above-described hydrocarbon chain having a low molecular weight; however, it is preferably a chain consisting of a hydrocarbon polymer consisting of 30 or more carbon atoms and more preferably 50 or more carbon atoms. The upper limit of the number of carbon atoms forming the hydrocarbon polymer is not particularly limited and may be, for example, 3,000. The hydrocarbon polymer chain is preferably a chain consisting of a hydrocarbon polymer formed of an aliphatic hydrocarbon in which the main chain satisfies the above-described number of carbon atoms and more preferably a chain consisting of a polymer (preferably an elastomer) formed of an aliphatic saturated hydrocarbon or an unsaturated aliphatic hydrocarbon. Examples of the polymer include a diene polymer having a double bond in the main chain and a non-diene polymer not having a double bond in the main chain. Examples of the diene polymer include a styrene-butadiene copolymer, a styrene-ethylene-butadiene copolymer, a copolymer (preferably butyl rubber (IIR)) of isobutylene and isoprene, a butadiene polymer, an isoprene polymer, and an ethylene-propylene-diene copolymer. Examples of the non-diene polymer include an olefin polymer such as an ethylene-propylene copolymer or a styrene-ethylene-butylene copolymer and a hydrogen reduced form of the above-described diene polymer.

The hydrocarbon chain which can be adopted as $R^{P1}$ and $R^{P2}$ may have a substituent as described later, and the hydrocarbon chain is preferable to have an ether group or carbonyl group, or both thereof. In particular, the hydrocarbon chain which can be adopted as $R^{P2}$ of the constituent component represented by Formula (I-3) or Formula (I-4) preferably has an ether group or a carbonyl group, or both thereof (for example, a —CO—O— group and preferably a carboxy group). It is preferable that the end portions of the ether group and the carbonyl group have an atom such as a hydrogen atom or a substituent (for example, a substituent T described later).

The hydrocarbon forming the hydrocarbon chain preferably has a reactive group at a terminal and more preferably has a terminal reactive group capable of polycondensation. The terminal reactive group capable of polycondensation or polyaddition forms a group bonded to $R^{P1}$ or $R^{P2}$ in each of the formulae by polycondensation or polyaddition. Examples of the terminal reactive group include an isocyanate group, a hydroxy group, a carboxy group, an amino group, and an acid anhydride. In particular, a hydroxy group is preferable.

As the hydrocarbon polymer having a terminal reactive group, for example as trade names, NISSO-PB series (manufactured by NIPPON SODA Co., Ltd.), Krasol series (manufactured by TOMOE Engineering Co., Ltd.), PolyVEST-HT series (manufactured by Evonik Industries AG), Poly-bd series (manufactured by Idemitsu Kosan Co., Ltd.), Poly-ip series (manufactured by Idemitsu Kosan Co., Ltd.), EPOL (manufactured by Idemitsu Kosan Co., Ltd.), and POLYTAIL series (manufactured by Mitsubishi Chemical Corporation) are suitably used.

Examples of the polyalkylene oxide chain (polyalkyleneoxy chain) include a chain consisting of a conventionally known polyalkylene oxide. The number of carbon atoms in the alkyleneoxy group is preferably 1 to 10, more preferably 1 to 6, and still more preferably 2 or 3 (a polyethylene oxide chain or a polypropylene oxide chain). The polyalkylene oxide chain may be a chain consisting of one alkylene oxide or may be a chain consisting of two or more alkylene oxides (for example, a chain consisting of ethylene oxide and propylene oxide).

Examples of the polycarbonate chain or the polyester chain include a chain consisting of a conventionally known polycarbonate or polyester.

It is preferable that the polyalkylene oxide chain, the polycarbonate chain, or the polyester chain includes an alkyl group (having preferably 1 to 12 carbon atoms and more preferably 1 to 6 carbon atoms) at a terminal.

The terminal of the polyalkylene oxide chain, the polycarbonate chain, or the polyester chain, which can be used as $R^{P1}$ and $R^{P2}$, can be appropriately changed to a typical chemical structure that can be incorporated into the constituent component represented by each of the formulae as $R^{P1}$ and $R^{P2}$. For example, like the polyurethane synthesized in Examples, the terminal oxygen atom of the polyalkylene oxide chain is removed and incorporated as the above-described constituent component $R^{P1}$ or $R^{P2}$.

In the alkyl group in the molecular chain or at a terminal thereof, an ether group (—O—), a thioether group (—S—), a carbonyl group (>C═O), or an imino group (>$NR^N$: $R^N$ represents a hydrogen atom, an alkyl group having 1 to 6 carbon atoms, or an aryl group having 6 to 10 carbon atoms) may be present.

In each of the formulae, $R^{P1}$ and $R^{P2}$ represent a divalent molecular chain but may represent a trivalent or higher molecular chain in which at least one hydrogen atom is substituted with —NH—CO—, —CO—, —O—, —NH—, or —N<.

Among the above-described hydrocarbon chains, $R^{P1}$ is preferably a hydrocarbon chain having a low molecular weight, more preferably a hydrocarbon chain consisting of an aliphatic or aromatic hydrocarbon group, and still more preferably a hydrocarbon chain consisting of an aromatic hydrocarbon group.

$R^{P2}$ is preferably an aliphatic hydrocarbon group or a molecular chain other than the hydrocarbon chain having a low molecular weight, and more preferably an aspect including an aliphatic hydrocarbon group and a molecular chain other than the hydrocarbon chain having a low molecular weight. In this aspect, Formula (I-3), a constituent component represented by any one of Formula (I-4) or Formula (I-6) include at least two kinds of a constituent component in which $R^{P2}$ is an aliphatic hydrocarbon group having a low molecular weight and a constituent component in which $R^{P2}$ is a molecular chain other than the aliphatic hydrocarbon chain having a low molecular weight.

Specific examples of the constituent component represented by Formula (I-1) are shown below. Examples of the raw material compound (the diisocyanate compound) from which the constituent component represented by Formula (I-1) is derived include the diisocyanate compound represented by Formula (M1) described in WO2018/020827A and the specific example thereof and further include a polymeric 4,4'-diphenylmethane diisocyanate. In the present invention, the constituent component represented by Formula (I-1) and the raw material compound derived from the constituent component are not limited to those described in the following specific examples and the above documents.

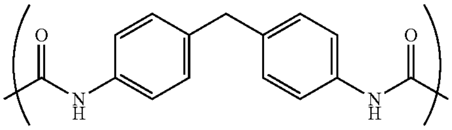
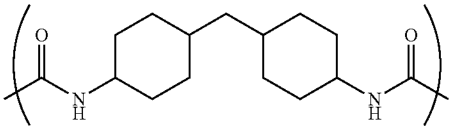
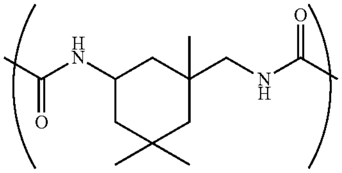
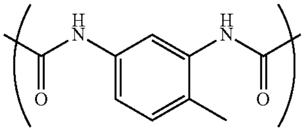
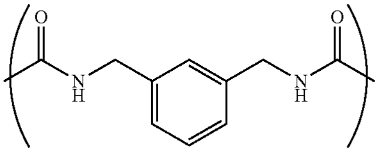
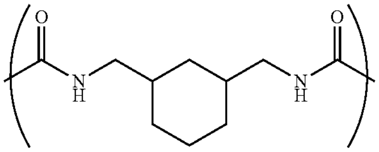
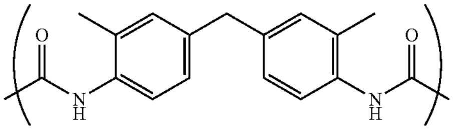
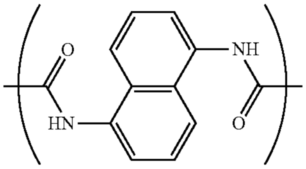
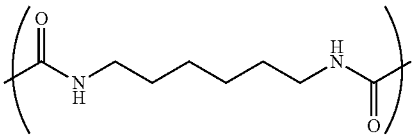
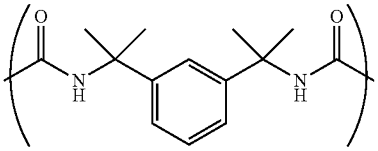
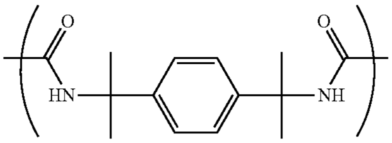
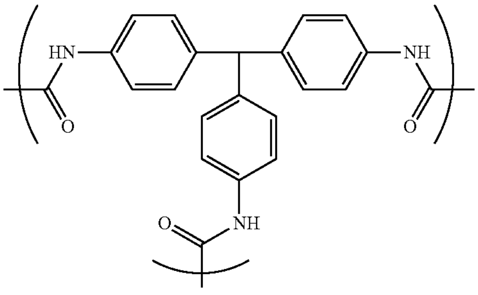
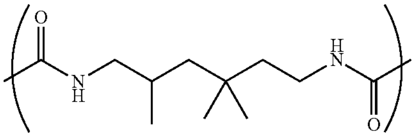
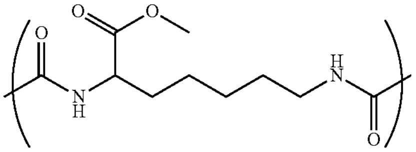
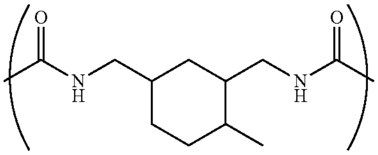

-continued

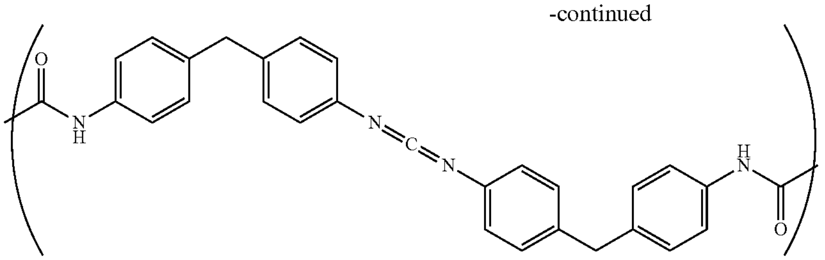

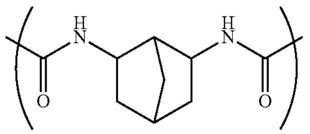

The raw material compound (a carboxylic acid, an acid chloride thereof, or the like) from which the constituent components represented by Formula (I-2) are derived is not particularly limited, and examples of the raw material include the carboxylic acid or the compound of the acid chloride, and the specific examples thereof, which are described in paragraph [0074] of WO2018/020827A.

Specific examples of the constituent components represented by Formula (I-3) or Formula (I-4) are shown below. The raw material compound (the diol compound or the diamine compound) from which the constituent component represented by Formula (I-3) or Formula (I-4) is derived is not particularly limited. Examples thereof include the respective compounds and the specific examples thereof, which are described in WO2018/020827A, and further include dihydroxyoxamide. In the present invention, the constituent components represented by Formula (I-3) or Formula (I-4) and the raw material compounds from which the compounds are derived are not limited to those described in the following specific examples and the above documents.

In the following specific examples, in a case where the constituent component has a repeating structure, the number of repetitions is an integer of 1 or more and is appropriately set within a range satisfying the molecular weight or the number of carbon atoms of the molecular chain.

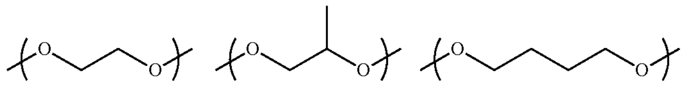

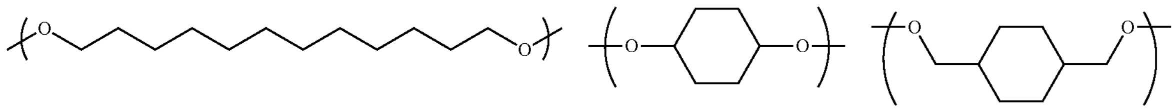

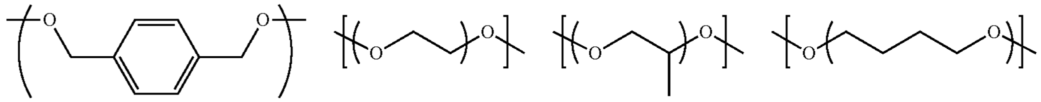

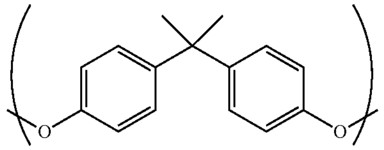

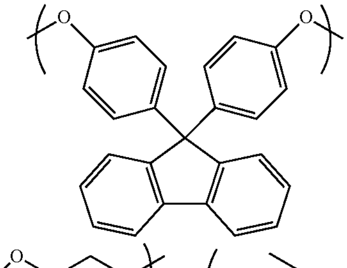

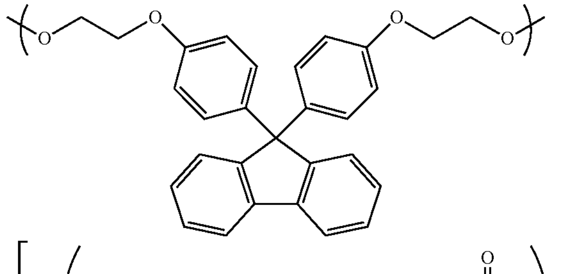

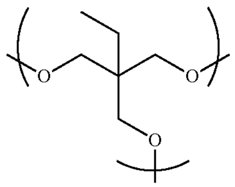

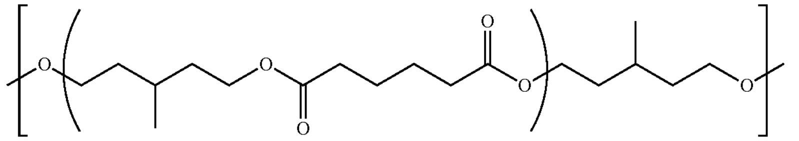

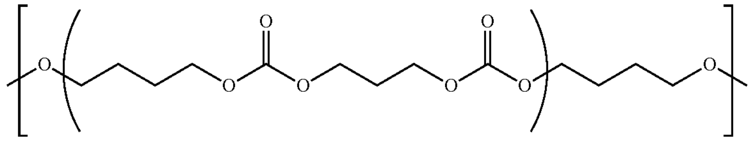

-continued

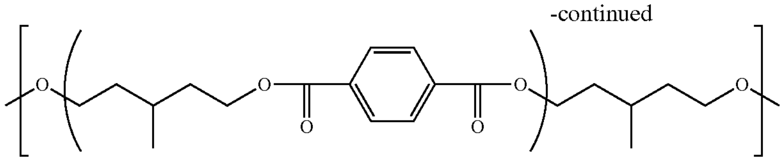
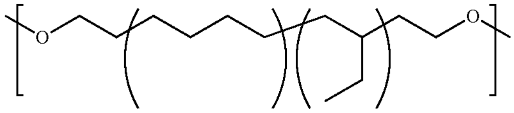
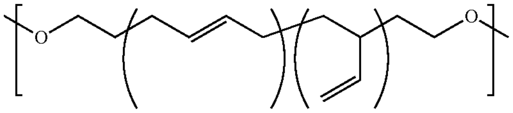
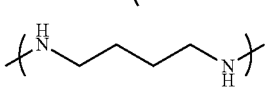
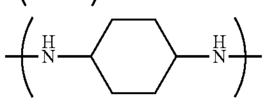
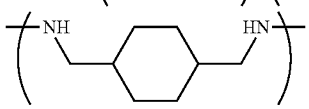
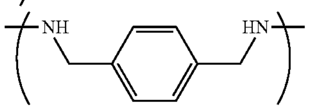
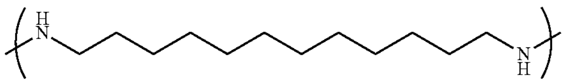
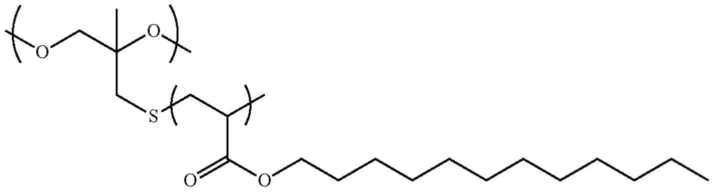
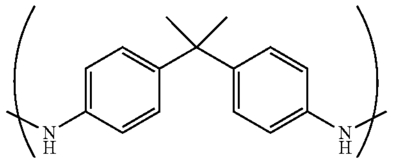
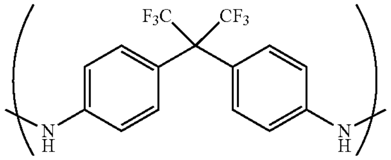

In Formula (I-5), $R^{P3}$ represents an aromatic or aliphatic linking group (tetravalent) and preferably a linking group represented by any one of Formulae (i) to (iix).

(i)

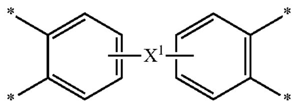

(ii)

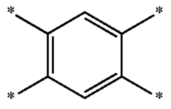

(iii)

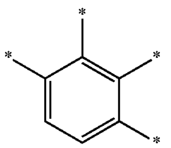

(iv)

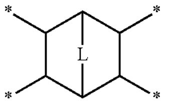

(v)

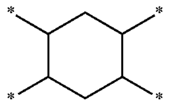

-continued (vi)

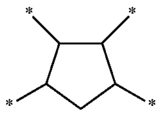

(vii)

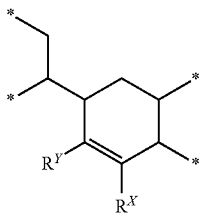

(iix)

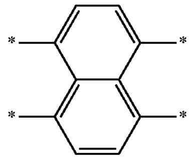

In Formulae (i) to (iix), $X^1$ represents a single bond or a divalent linking group. As the divalent linking group, an alkylene group having 1 to 6 carbon atoms (for example, methylene, ethylene, or propylene) is preferable. The propylene is preferably 1,3-hexafluoro-2,2-propanediyl. L represents $-CH_2{=}CH_2-$ or $-CH_2-$. $R^X$ and $R^Y$ each independently represent a hydrogen atom or a substituent. In each of the formulae, * represents a binding position to the carbonyl group in Formula (I-5). The substituent that can be used as $R^X$ and $R^Y$ is not particularly limited, and examples thereof include the substituent T described below. In particular, an alkyl group (having preferably 1 to 12 carbon atoms, more preferably 1 to 6 carbon atoms, still more preferably 1 to 3 carbon atoms) or an aryl group (having preferably 6 to 22 carbon atoms, more preferably 6 to 14 carbon atoms, still more preferably 6 to 10 carbon atoms) is preferable.

The carboxylic acid dianhydride represented by Formula (I-5) and the raw material compound (the diamine compound) from which the constituent components represented by Formula (I-6) are respectively derived are not particularly limited, and examples thereof include the respective compounds and the specific examples thereof, which are described in WO2018/020827A and WO2015/046313A.

$R^{P1}$, $R^{P2}$, and $R^{P3}$ may each independently have a substituent. The substituent is not particularly limited, and examples thereof include the substituent T described below. In particular, the substituents that can be used as $R^{M2}$ are preferable.

The binder-forming polymer preferably has, as a constituent component represented by Formula (I-3) or Formula (I-4) and preferably Formula (I-3), a constituent component (preferably a constituent component represented by Formula (I-3A)) in which $R^{P2}$ is an aliphatic hydrocarbon group (preferably an ether group or a carbonyl group, or both thereof, and more preferably a group having a carboxy group) and a constituent component (preferably a constituent component represented by Formula (I-3B)) in which $R^{P2}$ is the polyalkylene oxide chain as a molecular chain, and more preferably further has at least three constituent components (preferably constituent components represented by Formula (I-3C)) in which $R^{P2}$ is the polyalkylene oxide chain as a molecular chain. The binder-forming polymer preferably has a constituent component represented by Formula (I-1), a constituent component represented by Formula (I-3A), and a constituent component represented by Formula (I-3B), and more preferably has a constituent component represented by Formula (I-3C) in addition to these constituent components.

Formula (I-1)

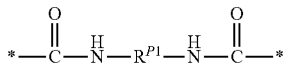

Formula (I-3A)

$$*—O—R^{P2A}—O—*$$

Formula (I-3B)

$$*—O—R^{P2B}—O—*$$

Formula (I-3C)

$$*—O—R^{P2C}—O—*$$

In Formula (I-1), $R^{P1}$ is as described above. In Formula (I-3A), $R^{P2A}$ represents an aliphatic hydrocarbon group (preferably an aliphatic hydrocarbon group), preferably has an ether group or a carbonyl group, or both thereof, and more preferably a carboxy group. Examples thereof include a bis(hydroxymethyl) acetic acid compound such as 2,2-bis (hydroxymethyl) butyric acid. In Formula (I-3B), $R^{P2B}$ represents a polyalkylene oxide chain. In Formula (I-3C), $R^{P2C}$ represents a hydrocarbon polymer chain. The aliphatic hydrocarbon group which can be adopted as $R^{P2A}$, the polyalkylene oxide chain which can be adopted as $R^{P2C}$, and the hydrocarbon polymer chain which can be adopted as $R^{P2B}$ are respectively the same as the aliphatic hydrocarbon group, the polyalkylene oxide chain, and the hydrocarbon polymer chain, each of which can be adopted as $R^{P2}$ in Formula (I-3), and the same is applied to the preferred ones thereof.

The content of the constituent component represented by each of the above formulae, in the binder-forming polymer, will be described later.

The binder-forming polymer may have a constituent component other than the constituent component represented by the above formulae. Such a constituent component is not particularly limited as long as it can be sequentially polymerized with the constituent component represented by each of the above formulae.

The (total) content of the constituent components represented by the above formula, in the binder-forming polymer, is not particularly limited; however, it is preferably 5% to 100% by mass, more preferably 10% to 100% by mass, and still more preferably 50% to 100% by mass. The upper limit value of the content may be, for example, 90% by mass or less regardless of the above 100% by mass.

The content of the constituent component other than the constituent component represented by each of the above formulae, in the binder-forming polymer, is not particularly limited; however, it is preferably 80% by mass or less.

The content of the constituent component represented by Formula (I-1) or Formula (I-2) or the constituent component derived from the carboxylic acid dianhydride represented by Formula (I-5), in the binder-forming polymer, is not particularly limited, and 10% to 50% by mol is preferable, 20% to 50% by mol is more preferable, and 30% to 50% by mol is still more preferable.

The content of the constituent component represented by Formula (I-3), Formula (I-4), or Formula (I-6), in the binder-forming polymer, is not particularly limited, and it is preferably 10% to 50% by mol, more preferably 20% to 50% by mol, and still more preferably 30% to 50% by mol.

It is noted that in a case where the binder-forming polymer has a plurality of constituent components represented by the respective formulae, the above-described content of each of the constituent components is the total content.

Among the constituent components represented by Formula (I-3) or Formula (I-4), the content of the constituent component in which $R^{P2}$ is an aliphatic hydrocarbon group (which has an ether group or a carbonyl group, or both thereof, and more preferably a carboxy group), in the binder-forming polymer, is not particularly limited; however, for example, it is preferably 0% to 50% by mol, more preferably 1% to 30% by mol, and still more preferably 2% to 20% by mol, in terms of the polymer content.

Among the constituent components represented by Formula (I-3) or Formula (I-4), the content of the constituent component in which $R^{P2}$ is the polyalkylene oxide chain as a molecular chain, in the binder-forming polymer, is not particularly limited; however, for example, it is preferably 0% to 50% by mol, more preferably 1% to 45% by mol, and still more preferably 3% to 40% by mol.

Among the constituent components represented by Formula (I-3) or Formula (I-4), the content of the constituent component in which $R^{P2}$ is the hydrocarbon polymer chain as a molecular chain, in the binder-forming polymer, is not particularly limited; however, it is preferably 0% to 50% by mol, more preferably 1% to 45% by mol, and still more preferably 3% to 40% by mol.

Examples of polyurethane, polyurea, polyamide, and polyimide polymers which can be adopted as the binder-forming polymer include, in addition to those synthesized in Examples, each of the polymers described in WO2018/020827A and WO2015/046313A and further include each of the polymers described in JP2015-088480A.

(Chain Polymerization Type Polymer)

A Chain polymerization type polymer suitable as the binder-forming polymer is a polymer obtained by chain-polymerizing one or more monomers having a non-aromatic carbon-carbon double bond, and specific examples thereof include each of the polymers described above. Among them, preferred examples thereof include a polymer (a (meth) acrylic polymer) obtained by polymerizing at least one (meta)acrylic compound selected from (meth)acrylic acid, a (meth)acrylic acid ester compound, a (meth)acrylamide compound, or a (meth)acrylonitrile compound. Further, a copolymer of a (meth)acrylic compound and another polymerizable compound can also be mentioned. The other polymerizable compound is not particularly limited, and examples thereof include a styrene compound, a vinyl naphthalene compound, a vinyl carbazole compound, an allyl compound, a vinyl ether compound, a vinyl ester compound, and a dialkyl itaconate compound. Specific examples of the copolymer with the other polymerizable compound include a copolymer of methyl (meth)acrylate and styrene, and a copolymer of butyl (meth)acrylate, acrylonitrile, and styrene. In the specification of the present application, the copolymer may be any one of a statistical copolymer or a periodic copolymer, and a block copolymer is preferable. Examples of the (meth)acrylic polymer include the polymer described in JP2015-088486A.

The (meth)acrylic acid ester compound is not particularly limited, and examples thereof include the compound represented by any of Formulae (b-1) to (b-6) described in JP2015-088486A. Specific examples thereof include a (meth)acrylic acid alkyl ester compound and a (meth)acrylic acid (hetero)aryl ester compound. Examples of the alkyl group, aryl group, and heteroaryl group which are contained in these (meth)acrylic acid ester compounds respectively include an alkyl group, an aryl group, and an aromatic heterocyclic group in the substituent T described later. Further, the alkyl group, the aryl group, and the heteroaryl group may have a substituent. Examples of the substituent include a substituent selected from the substituent T described later, and preferably a functional group selected from Group (a) of functional groups described later. More specific examples thereof include the compounds (monomers) A-1 to A-60 described in JP2015-088486A.

The (meth)acrylic polymer is preferably a polymer obtained by polymerizing at least two (meth)acrylic compounds selected from (meth)acrylic acid, a (meth)acrylic acid alkyl ester compound, a (meth)acrylamide compound, and a (meth)acrylic nitrile compound, and more preferably a polymer obtained by polymerizing at least two (meth) acrylic compounds selected from (meth)acrylic acid, a (meth)acrylic acid alkyl ester compound, and a (meth) acrylic nitrile compound. Examples of the (meth)acrylic acid alkyl ester compound constituting the chain polymerization type polymer preferably include an alkyl ester compound of (meth)acrylic acid, which has 1 to 6 carbon atoms, and an alkyl compound of (meth)acrylic acid, which has 7 to 20 carbon atoms.

The contents of the constituent components in the (meth) acrylic polymer is not particularly limited and is appropriately set. For example, the total content of the (meth)acrylic compound can be 20% to 100% by mass.

In addition, the content of the constituent component derived from (meth)acrylic acid is preferably 0% to 50% by mass and more preferably 3% to 20% by mass.

The content of the constituent component derived from the (meth)acrylic acid alkyl ester compound is preferably 20% to 99% by mass and more preferably 30% to 95% by mass. Among the (meth)acrylic acid alkyl ester compounds, the content of the constituent component derived from the alkyl ester compound having 1 to 6 carbon atoms is preferably 5% to 80% by mass and more preferably 20% to 60% by mass. The content of the constituent component derived from the alkyl compound having 7 to 20 carbon atoms is preferably 5% to 80% by mass and more preferably 10% to 60% by mass.

The content of the constituent component derived from the (meth)acrylonitrile compound is preferably 0% to 80% by mass and more preferably 5% to 60% by mass.

The content of the (meth)acrylic polymer is as described above; however, the content of the constituent component derived from the compound having a functional group selected from Group (a) of functional groups is preferably 1% to 80% by mass and more preferably 5 to 60% by mass.

In a case where a plurality of corresponding constituent components are present, each of the contents described above is the total content thereof.

The binder-forming polymer preferably has at least one functional group selected from Group (a) of functional groups described below, in terms of exhibiting a high binding property to the solid particles and thus being capable of firmly binding the solid particles to each other. This functional group may be contained in the main chain or the side chain.

Group (a) of Functional Groups an acidic functional group, a basic functional group, a hydroxy group, a cyano group, an alkoxysilyl group, an aryl group, a heteroaryl group, and an aliphatic hydrocarbon ring group in which 3 or more rings are fused.

The functional group (the functional group having adsorptivity to the surface of the inorganic particle) which the binder-forming polymer has mutually interact chemically or physically with the surface of the inorganic solid electrolyte in the solid electrolyte composition, or the surface of the optionally coexisting active material or conductive auxiliary agent. This interaction is not particularly limited; however, examples thereof include an interaction due to a hydrogen bonding, an interaction due to an ionic bonding of acid and base, an interaction due to covalent bonding, an interaction due to a π-π interaction involving an aromatic ring, and an interaction due to a hydrophobicity-hydrophobicity interaction. In a case where the functional group interacts, the chemical structure of the functional group may change or may not change. For example, in the above-described π-π interaction or the like, the functional group typically does not change and the structure is maintained as it is. On the other hand, in an interaction due to covalent bonding or the like, a carboxylic acid group or the like releases active hydrogen and becomes an anion (the functional group is changed) to bond with a solid electrolyte or the like, thereby binding to the solid electrolyte or the like. This interaction contributes to the adsorption of the non-spherical binder particles to the solid particles at the time of the preparation or during the preparation of the solid electrolyte composition. The functional group also interacts with the surface of the current collector.

Examples of the acidic functional group are not particularly limited; however, preferred examples thereof include a carboxylic acid group (—COOH), a sulfonic acid group (a sulfo group: $—SO_3H$), and a phosphate group (a phospho group: $—OPO(OH)_2$ or the like). The acidic functional group may be a salt thereof or an ester. Examples of the salt include a sodium salt and a calcium salt. Examples of the ester include an alkyl ester and an aryl ester. In a case of an ester, the number of carbon atoms is preferably 1 to 24, more preferably 1 to 12, and still more preferably 1 to 6.

The basic functional group is not particularly limited; however, preferred examples thereof include an amino group. The amino group is not particularly limited, and examples thereof include an amino group having 0 to 20 carbon atoms. The amino group includes an alkylamino group and an arylamino group. The amino group preferably has 0 to 12 carbon atoms, more preferably 0 to 6 carbon atoms, and still more preferably 0 to 2 carbon atoms. Examples of the amino group include amino, N,N-dimethylamino, N,N-diethylamino, N-ethylamino, and anilino.

The amino group may be a group capable of forming a salt, such as a hydroxy group or an amino group.

The alkoxysilyl group is not particularly limited, and examples thereof include a mono-, di-, and tri-alkoxysilyl groups. Preferred examples thereof include an alkoxysilyl group having 1 to 20 carbon atoms, such as monomethoxysilyl, dimethoxysilyl, trimethoxysilyl, and triethoxysilyl.

The aryl group may be a monocyclic ring or a fused ring. The number of carbon atoms is preferably 6 to 26, more preferably 6 to 20. Specific examples thereof include a ring group consisting of benzene, naphthalene, anthracene, phenanthrene, pyrene, tetracene, tetraphene, chrysene, triphenylene, pentacene, pentaphene, perylene, benzo [a] pyrene, coronene, anthanthrene, corannulene, ovalene, graphene, cycloparaphenylene, polyparaphenylene, or cyclophene.

The heteroaryl group is not particularly limited, and examples thereof include a 5- or 6-membered heteroaryl group having at least one selected from an oxygen atom, a sulfur atom, or a nitrogen atom, as a ring-constituting atom. The heteroaryl group may be a monocyclic ring or a fused ring and preferably has 2 to 20 carbon atoms.

The aliphatic hydrocarbon ring group in which 3 or more rings are fused is not particularly limited as long as it is a ring group in which the aliphatic hydrocarbon ring has three or more rings. Examples of the aliphatic hydrocarbon ring to be fused include a saturated aliphatic hydrocarbon ring and an unsaturated aliphatic hydrocarbon ring. The aliphatic hydrocarbon ring is preferably a 5-membered ring or a 6-membered ring. In the aliphatic hydrocarbon ring group in which 3 or more rings are fused, the number of rings to be fused is not particularly limited; however, 3 to 5 rings are preferable, and 3 rings or 4 rings are more preferable.

The ring group in which 3 or more rings of the saturated aliphatic hydrocarbon ring or the unsaturated aliphatic hydrocarbon ring is fused is not particularly limited, and examples thereof include a ring group consisting of a compound having a steroid skeleton. Examples of the compound having a steroid skeleton include cholesterol, ergosterol, testosterone, estradiol, aldosterone, hydrocortisone, stigmasterol, thymosterol, lanosterol, 7-dehydrodesmosterol, 7-dehydrocholesterol, cholanic acid, cholic acid, lithocholic acid, deoxycholic acid, sodium deoxycholic acid, lithium deoxycholic acid, hyodeoxycholic acid, chenodeoxycholic acid, ursodeoxycholic acid, dehydrocholic acid, hokecholic acid, and hyocholic acid, and compounds containing a skeleton thereof. Among these, a ring group consisting of a compound having a cholesterol skeleton is more preferable.

The functional group selected from Group (a) of functional groups is appropriately selected; however, it is preferably an acidic functional group, a basic functional group, a hydroxy group, a cyano group, or an alkoxysilyl group, and more preferably a carboxylic acid group in terms of the binding property to the active material, in a case where the solid electrolyte composition contains an inorganic solid electrolyte or a positive electrode active material. On the other hand, in a case where the solid electrolyte composition contains a negative electrode active material or a conductive auxiliary agent, an aryl group, a heteroaryl group, or an aliphatic hydrocarbon ring group in which 3 or more rings are fused is preferable, and an aliphatic hydrocarbon ring group in which 3 or more rings are fused is more preferable.

The functional group is preferably a carboxylic acid group, a sulfonic acid group, a phosphoric acid group, or an aryl group, and a carboxylic acid group is more preferable, in terms of exhibiting a high binding property regardless of the active material.

The number of functional groups which the binder-forming polymer has in one molecule may be one or more and preferably has a plurality of functional groups. Further, the number of kinds of functional groups is not particularly limited as long as the binder-forming polymer has at least one functional group, and may be one kind or two or more kinds. In a case of having two or more kinds of functional groups, two or more kinds of functional groups selected from the above-described Group (a) of functional groups can be appropriately combined individually. In addition, two or more functional groups selected from Group (a) of functional groups may be appropriately combined to form one composite functional group. Examples of the composite functional group include a group consisting of an aryl group, a heteroaryl group, or an aliphatic hydrocarbon ring group in which 3 or more rings are fused, and an acidic functional group, a basic functional group, a hydroxy group, a cyano group, or an alkoxysilyl group.

The content of the constituent component having a functional group is not particularly limited; however, it can be set within the range of the content corresponding to the constituent component before the introduction of the functional group among the constituent components constituting each of the polymers.

The binder-forming polymer (each constituent component) may have a substituent. Examples of the substituent include a group selected from the following substituent T. Examples of the substituent T include the followings; however, the examples are not limited thereto.

The examples are an alkyl group (preferably an alkyl group having 1 to 20 carbon atoms, for example, methyl, ethyl, isopropyl, t-butyl, pentyl, heptyl, 1-ethylpentyl, benzyl, 2-ethoxyethyl, and 1-carboxymethyl), an alkenyl group (preferably an alkenyl group having 2 to 20 carbon atoms, such as vinyl, allyl, andoleyl), an alkynyl group (preferably an alkynyl group having 2 to 20 carbon atoms, for example, ethynyl, butadynyl, and phenylethynyl), a cycloalkyl group (preferably a cycloalkyl group having 3 to 20 carbon atoms, such as cyclopropyl, cyclopentyl, cyclohexyl, and 4-methylcyclohexyl), an aryl group (preferably an aryl group having 6 to 26 carbon atoms, such as phenyl, 1-naphthyl, 4-methoxyphenyl, 2-chlorophenyl, and 3-methylphenyl), and a heterocyclic group (preferably a heterocyclic group having 2 to 20 carbon atoms and preferably a 5- or 6-membered heterocyclic group having at least one oxygen atom, one sulfur atom, or one nitrogen atom. The heterocyclic group includes an aromatic heterocyclic group (a heteroaryl group) and an aliphatic heterocyclic group. Examples there of include a tetrahydropyran ring group, a tetrahydrofuran ring group, 2-pyridyl, 4-pyridyl, 2-imidazolyl, 2-benzimidazolyl, 2-thiazolyl, or 2-oxazolyl); an alkoxy group (preferably an alkoxy group having 1 to 20 carbon atoms, for example, methoxy, ethoxy, isopropyloxy, or benzyloxy); an aryloxy group (preferably an aryloxy group having 6 to 26 carbon atoms, for example, phenoxy, 1-naphthyloxy, 3-methylphenoxy, or 4-methoxyphenoxy); a heterocyclic oxy group (a group in which an —O— group is bonded to the above-described heterocyclic group), an alkoxycarbonyl group (preferably an alkoxycarbonyl group having 2 to 20 carbon atoms, for example, ethoxycarbonyl or 2-ethylhexyloxycarbonyl); an aryloxycarbonyl group (preferably an aryloxycarbonyl group having 6 to 26 carbon atoms, for example, phenoxycarbonyl, 1-naphthyloxycarbonyl, 3-methylphenoxycarbonyl, or 4-methoxyphenoxycarbonyl); an amino group (preferably an amino group having 0 to 20 carbon atoms, an alkylamino group, or an arylamino group, for example, amino (—NH$_2$—), N,N-dimethylamino, N,N-diethylamino, N-ethylamino, or anilino); a sulfamoyl group (preferably a sulfamoyl group having 0 to 20 carbon atoms, for example, N,N-dimethylsulfamoyl or N-phenylsufamoyl); an acyl group (an alkylcarbonyl group, an alkenylcarbonyl group, an alkynylcarbonyl group, an arylcarbonyl group, or a heterocyclic carbonyl group, preferably an acyl group having 1 to 20 carbon atoms, for example, acetyl, propionyl, butyryl, octanoyl, hexadecanoyl, acryloyl, methacryloyl, crotonoyl, benzoyl, naphthoyl, or nicotinoyl); an acyloxy group (an alkylcarbonyloxy group, an alkenylcarbonyloxy group, an alkynylcarbonyloxy group, an arylcarbonyloxy group, or a heterocyclic carbonyloxy group, preferably an acyloxy group having 1 to 20 carbon atoms, for example, acetyloxy, propionyloxy, butyryloxy, octanoyloxy, hexadecanoyloxy, acryloyloxy, methacryloyloxy, crotonoyloxy, benzoyloxy, naphthoyloxy, or nicotinoyloxy); an aryloyloxy group (preferably an aryloyloxy group having 7 to 23 carbon atoms, for example, benzoyloxy); a carbamoyl group (preferably a carbamoyl group having 1 to 20 carbon atoms, for example, N,N-dimethylcarbamoyl or N-phenylcarbamoyl); an acylamino group (preferably an acylamino group having 1 to 20 carbon atoms, for example, acetylamino or benzoylamino); an alkylthio group (preferably an alkylthio group having 1 to 20 carbon atoms, for example, methylthio, ethylthio, isopropylthio, or benzylthio); an arylthio group (preferably an arylthio group having 6 to 26 carbon atoms, for example, phenylthio, 1-naphthylthio, 3-methylphenylthio, or 4-methoxyphenylthio); a heterocyclic thio group (a group in which an —S— group is bonded to the above-described heterocyclic group), an alkylsulfonyl group (preferably an alkylsulfonyl group having 1 to 20 carbon atoms, for example, methylsulfonyl or ethylsulfonyl), an arylsulfonyl group (preferably an arylsulfonyl group having 6 to 22 carbon atoms, for example, benzenesulfonyl), an alkylsilyl group (preferably an alkylsilyl group having 1 to 20 carbon atoms, for example, monomethylsilyl, dimethylsilyl, trimethylsilyl, or triethylsilyl); an arylsilyl group (preferably an arylsilyl group having 6 to 42 carbon atoms, for example, triphenylsilyl), a phosphoryl group (preferably a phosphate group having 0 to 20 carbon atoms, for example, —OP(=O)(R$^P$)$_2$), a phosphonyl group (preferably a phosphonyl group having 0 to 20 carbon atoms, for example, —P(=O)(R$^P$)$_2$), a phosphinyl group (preferably a phosphinyl group having 0 to 20 carbon atoms, for example, —P(R$^P$)$_2$), a sulfo group (sulfonate group), a hydroxy group, a sulfanyl group, a cyano group, and a halogen atom (for example, a fluorine atom, a chlorine atom, a bromine atom, or an iodine atom). R$^P$ represents a hydrogen atom or a substituent (preferably a group selected from the substituent T).

In addition, each group exemplified in the substituent T may be further substituted with the substituent T.

In a case where a compound or a substituent, a linking group, or the like includes, for example, an alkyl group, an alkylene group, an alkenyl group, an alkenylene group, an alkynyl group, and/or an alkynylene group, these groups may be cyclic or chained, may be linear or branched.

The content of the non-spherical binder particles is preferably 5% to 100% by mass, more preferably 30% to 100% by mass, and still more preferably 50% to 100% by mass with respect to the total of 100% by mass of all the binders contained in the solid electrolyte composition. In a case where this content is not 100% by mass, the rest is preferably the other binder described above. In a case where the solid electrolyte composition according to the embodiment of the present invention contains primary particles that do not form the non-spherical binder particle (the secondary particle), the ratio (the proportion) of the secondary particles is preferably 20% to 100%, more preferably 30% to 100%, and still more preferably 40% to 100%, with respect to the total number of the secondary particles and the primary particles.

For the ratio of secondary particles, the number N of the binder particles forming the secondary particles among the 50 binder particles is counted using the TEM image obtained in the above aspect ratio measurement. The obtained number N is divided by 50 to calculate the ratio [N/50] of secondary particles among the 50 binder particles, which is defined as the ratio of secondary particles.

The content of the non-spherical binder particles in the solid electrolyte composition is preferably 0.01% by mass or more, more preferably 0.05% by mass or more, and still more preferably 0.1% by mass or more, with respect to 100% by mass of the solid content, since a layer having an excellent film strength, an excellent contact state, and an excellent binding force between the solid particles can be formed, with which an all-solid state secondary battery that maintains an excellent battery performance even in a case where charging and discharging are repeated can be obtained. From the viewpoint of battery capacity, the upper limit is preferably 20% by mass or lower, more preferably 10% by mass or lower, and still more preferably 5% by mass or lower.

In the solid electrolyte composition according to the embodiment of the present invention, the mass ratio [(the mass of the inorganic solid electrolyte+the mass of the active material)/(the mass of the binder)] of the total mass (total amount) of the inorganic solid electrolyte and the active material to the mass of the binder is preferably in a range of 1,000 to 1. This ratio is more preferably 500 to 2 and still more preferably 100 to 5.

The solid electrolyte composition according to the embodiment of the present invention may contain one kind of non-spherical binder particles singly or two or more kinds of thereof.

(Preparation of Non-Spherical Binder Particle)

The non-spherical binder particle is not particularly limited; however, the non-spherical binder particle can be prepared by, for example, by dispersing a synthesized binder-forming polymer in a dispersion medium to form primary particles and further, for example, aggregating the primary particles to form the secondary particle. At this time, the synthesis conditions, the dispersion conditions, and the like are appropriately set to the conditions under which the secondary particle can be formed.

-Synthesis of Binder-Forming Polymer-

The binder-forming polymer can be synthesized by appropriately combining raw material compounds from which the predetermined constituent components are derived, depending on the kind of the main chain, and carrying out the chain polymerization such as the sequential polymerization or the addition polymerization in the presence of a catalyst (including a polymerization initiator, a chain transfer agent, or the like) as necessary. The method and the conditions of the sequential polymerization or chain polymerization are not particularly limited, and a conventionally known method and a conventionally known condition can be appropriately selected. The above-described characteristics and physical properties of the binder-forming polymer can be adjusted according to the kind of the binder-forming polymer and further according to the kind of the constituent component (the raw material compound), the bonding mode or content, the molecular weight of the polymer, the glass transition temperature, and the like.

As the raw material compound, a conventionally known compound is appropriately selected depending on the kind of the binder-forming polymer. Examples thereof include, in addition to the above-described raw material compounds, each of the raw material compounds such as the polymer having a urethane bond, the polymer having a urea bond, the polymer having an amide bond (the polyamide resin), the polymer having an imide bond, and the like described in JP2015-088480A.

The solvent for synthesizing the binder-forming polymer is not particularly limited, and a solvent mentioned as a dispersion medium described later can be preferably used. In the present invention, in a case where a dispersion liquid of the binder-forming polymer is prepared by the phase inversion emulsification method described later, the preferred method is a method in which the solvent used in the synthesis of the binder-forming polymer (at the time of the preparation of a binder-forming polymer solution) is substituted with a dispersion medium with which the binder-forming polymer can be emulsified and dispersed and the solvent used in the synthesis the binder-forming polymer is removed. In this method, the boiling point of the solvent used in synthesizing the binder-forming polymer is preferably lower than the boiling point of the dispersion medium with which the binder-forming polymer can be emulsified and dispersed. As the dispersion medium with which the binder-forming polymer can be emulsified and dispersed, a dispersion medium with which the binder-forming polymer can be emulsified and dispersed described later can be preferably used.

-Preparation of Dispersion Liquid of Binder-Forming Polymer-

The method of preparing the dispersion liquid of the binder-forming polymer is not particularly limited, and the dispersion liquid can also be prepared by synthesizing the binder-forming polymer (for example, the emulsion polymerization method) and dispersing the synthesized binder-forming polymer in an appropriate dispersion medium. Examples of the method of dispersing the binder-forming polymer in the dispersion medium include a method of using a flow reactor (a method of causing the primary particles of the binder-forming polymer to collide with each other), a method of carrying out stirring using a homogenizer, and a phase inversion emulsification method. Among the above, a method of carrying out phase inversion emulsification of the synthesized binder-forming polymer is preferable in terms of productivity, characteristics of the obtained binder-forming polymer, physical properties, and the like.

The phase inversion emulsification method includes a process of dispersing the binder-forming polymer and a process of removing the solvent used in the synthesis of the binder-forming polymer. Examples of the process of carrying out dispersion include a method of emulsifying a binder-forming polymer solution by dropwise adding (for example, under the conditions of −20° C. to 150° C. and 0.5 to 8 hours) a solution of the binder-forming polymer into a dispersion medium with which the binder-forming polymer can be emulsified and dispersed and a method of emulsifying the binder-forming polymer by dropwise adding slowly a dispersion medium with which the binder-forming polymer can be emulsified and dispersed while vigorously stirring the solution. Examples of the process of removing the solvent include a method of concentrating the dispersion liquid of the binder-forming polymer obtained as described above under reduced pressure or heating the dispersion liquid under an inert air stream. As a result, the solvent used in the synthesis of the binder-forming polymer can be selectively removed, and the concentration of the dispersion medium with which the binder-forming polymer can be emulsified and dispersed can be increased.

In the present invention, the above-described "vigorous stirring" is not particularly limited as long as mechanical energy such as impact, shearing, shear stress, friction, or vibration is applied to the polymer solution. For example, an aspect in which a device such as a homogenizer, a Homodisper, a shaker, a dissolver, a Taitec mixer, a stirring blade in a stirring tank, a high pressure injection type disperser, an ultrasonic disperser, a ball mill, a bead mill, or the like is used and stirring is carried out, for example, under the conditions of the number of rotations of 300 to 1,000 rpm can be mentioned. Further, "dropwise adding slowly" is not particularly limited as long as the addition is not carried out at one time; however, for example, conditions in which a dispersion medium to be dropwise added is dropwise added and mixed to the binder-forming polymer solution over 2 hours or more (dropwise addition rate: 5 to 20 mL per hour) can be mentioned.

The dispersion medium with which the binder-forming polymer can be emulsified and dispersed is appropriately determined according to the kind of the constituent components of the binder-forming polymer and the like. For example, in a case where a constituent component having a hydrocarbon polymer chain is contained, a solvent in which this constituent component is easily dissolved and another constituent component such as the constituent component represented by Formula (I-1) is difficult to be dissolved can be mentioned. Such a solvent is not particularly limited; however, among the above-described dispersion media, a non-aqueous dispersion medium (an aliphatic compound or an aromatic compound) is preferable. Examples of the aliphatic compound include hexane, heptane, normal octane, isooctane, nonane, decane, dodecane, cyclohexane, cycloheptane, cyclooctane, methylcyclohexane, ethylcyclohexane, decalin, light oil, kerosene, and gasoline. Examples of the aromatic hydrocarbon include benzene, toluene, ethylbenzene, xylene, mesitylene, and tetralin. The dispersion medium may be used singly or in a combination of two or more thereof. A polar solvent (an ether solvent, a ketone solvent, an ester solvent, or the like) may be added as long as it does not inhibit the emulsification and dispersion of the polymer. The mass ratio of the non-aqueous dispersion medium to the polar solvent [the mass of the non-aqueous dispersion medium/the mass of the polar solvent] is preferably 100/0 to 70/30, more preferably 100/0 to 90/10, and most preferably 100/0 to 99/1.

The boiling point of the dispersion medium, at which the binder-forming polymer can be emulsified and dispersed at normal pressure, is preferably 80° C. or higher, preferably 100° C. or higher, and preferably 120° C. or higher. The range of the preferred SP value of the dispersion medium is preferably the same as the range of the SP value of the hydrocarbon polymer chain from the viewpoint of improving the particle dispersibility.

In this manner, the secondary particle (the non-spherical binder particle) formed of the primary particles consisting of the binder-forming polymer can be formed.

In the phase inversion emulsification method, the average primary particle size, average secondary particle size, aspect ratio, and secondary particle ratio of the non-spherical binder particles can be adjusted with the solid content concentration or dropwise addition rate of the binder-forming polymer solution used and the kind of the binder-forming polymer, and further with the kind of the constituent component, the bonding mode, the content, and the like. For example, in a case where the content of the constituent component in which $R^{P2}$ is the hydrocarbon polymer chain as a molecular chain and which is represented by Formula (I-3), in the binder-forming polymer, increases, the primary particles tend to become too small and thus the secondary particle to be large, or the secondary particle tends to be not easily formed. In addition, in a case where the solid content concentration of the binder-forming polymer solution used is increased, the secondary particles tend to become larger. Further, in a case where the dropwise addition rate is increased, the secondary particles tend to become larger.

<Active Material>

The solid electrolyte composition according to the embodiment of the present invention may also include an active material. This active material is a material capable of intercalating and deintercalating ions of a metal element belonging to Group 1 or Group 2 in the periodic table. Examples of such active materials include a positive electrode active material and a negative electrode active material.

In the present invention, the solid electrolyte composition (the composition for an electrode) containing the positive electrode active material may also be referred to as the composition for a positive electrode. In addition, the solid electrolyte composition containing the negative electrode active material may also be referred to as the "composition for a negative electrode".

(Positive Electrode Active Material)

The positive electrode active material is preferably a positive electrode active material capable of reversibly intercalating and deintercalating lithium ions. The above-described material is not particularly limited as long as the material has the above-described characteristics and may be a transition metal oxide, an organic substance, an element capable of being complexed with Li such as sulfur, a complex of sulfur and a metal, or the like.

Among the above, as the positive electrode active material, transition metal oxides are preferably used, and transition metal oxides having a transition metal element Ma (one or more elements selected from Co, Ni, Fe, Mn, Cu, and V) are more preferable. In addition, an element $M^b$ (an element of Group 1 (Ia) of the metal periodic table other than lithium, an element of Group 2 (IIa), or an element such as Al, Ga, In, Ge, Sn, Pb, Sb, Bi, Si, P, or B) may be mixed into this transition metal oxide. The amount of the element mixed is preferably 0% to 30% by mol of the amount (100% by mol) of the transition metal element $M^a$. It is more preferable that the transition metal oxide is synthesized by mixing the above components such that a molar ratio $Li/M^a$ is 0.3 to 2.2.

Specific examples of the transition metal oxides include transition metal oxides having a bedded salt-type structure (MA), transition metal oxides having a spinel-type structure (MB), lithium-containing transition metal phosphoric acid compounds (MC), lithium-containing transition metal halogenated phosphoric acid compounds (MD), and lithium-containing transition metal silicate compounds (ME).

Specific examples of the transition metal oxides having a bedded salt-type structure (MA) include $LiCoO_2$ (lithium cobalt oxide [LCO]), $LiNi_2O_2$(lithium nickelate), $LiNi_{0.85}Co_{0.10}Al_{0.05}O_2$(lithium nickel cobalt aluminum oxide [NCA]), $LiNi_{1/3}Co_{1/3}Mn_{1/3}O_2$ (lithium nickel manganese cobalt oxide [NMC]), and $LiNi_{0.5}Mn_{0.5}O_2$ (lithium manganese nickelate).

Specific examples of the transition metal oxides having a spinel-type structure (MB) include $LiMn_2O_4$(LMO), $LiCoMnO_4$, $Li_2FeMn_3O_8$, $Li_2CuMn_3O_8$, $Li_2CrMn_3O_8$, and $Li_2NiMn_3O_8$.

Examples of the lithium-containing transition metal phosphoric acid compound (MC) include olivine-type iron phosphate salts such as $LiFePO_4$ and $Li_3Fe_2(PO_4)_3$, iron pyrophosphates such as $LiFeP_2O_7$, and cobalt phosphates such as $LiCoPO_4$, and a monoclinic NASICON type vanadium phosphate salt such as $Li_3V_2(PO_4)_3$(lithium vanadium phosphate).

Examples of the lithium-containing transition metal halogenated phosphoric acid compound (MD) include iron fluorophosphates such as $Li_2FePO_4F$, manganese fluorophosphates such as $Li_2MnPO_4F$, cobalt fluorophosphates such as $Li_2CoPO_4F$.

Examples of the lithium-containing transition metal silicate compounds (ME) include $Li_2FeSiO_4$, $Li_2MnSiO_4$, and $Li_2CoSiO_4$.

In the present invention, the transition metal oxide having a bedded salt-type structure (MA) is preferable, and LCO or NMC is more preferable.

The shape of the positive electrode active material is not particularly limited but is preferably a particle shape. The average particle size (sphere-equivalent average particle size) of positive electrode active material particles is not particularly limited. For example, the volume-average particle diameter can be set to 0.1 to 50 m. The average particle size of the positive electrode active material particles can be measured using the same method as that of the average particle size of the inorganic solid electrolyte. In order to allow the positive electrode active material to have a predetermined particle size, an ordinary pulverizer or classifier is used. For example, a mortar, a ball mill, a sand mill, a vibration ball mill, a satellite ball mill, a planetary ball mill, a swirling air flow jet mill, or a sieve is preferably used. During crushing, it is also possible to carry out wet-type crushing in which water or an organic solvent such as methanol is made to coexist as necessary. In order to provide the desired particle size, classification is preferably carried out. A classification method is not particularly limited, and a method using, for example, a sieve or an air classifier can be optionally used. Both of the dry-type classification and the wet-type classification can be carried out.

A positive electrode active material obtained using a baking method may be used after being washed with water, an acidic aqueous solution, an alkaline aqueous solution, or an organic solvent.

The positive electrode active material may be used singly, or two or more positive electrode active materials may be used in combination.

In the case of forming a positive electrode active material layer, the mass (mg) of the positive electrode active material per unit area ($cm^2$) of the positive electrode active material layer (the electrode active material mass per unit area) is not particularly limited. The weight per unit area can be appropriately determined depending on a set battery capacity.

The content of the positive electrode active material in the composition for an electrode is not particularly limited; however, it is preferably 10% to 95% by mass, more preferably 30% to 90% by mass, still more preferably 50% to 85% by mass, and particularly preferably 55% to 80% by mass, with respect to 100% by mass of the solid content.

(Negative Electrode Active Material)

The negative electrode active material is preferably capable of reversibly intercalating and deintercalating lithium ions. The material is not particularly limited as long as it has the above-described properties, and examples thereof include a carbonaceous material, a metal oxide, a metal composite oxide, lithium, a lithium alloy, and a negative electrode active material that is capable of being alloyed (capable of forming an alloy) with lithium. Among the above, a carbonaceous material, a metal composite oxide, or lithium is preferably used from the viewpoint of reliability. An active material that is capable of being alloyed with lithium is preferable since the capacity of the all-solid state secondary battery can be increased. As described above, the solid electrolyte layer formed of the solid electrolyte composition according to the embodiment of the present invention maintains a firmly bound state and a contact state between the solid particles even in a case where the volume changes, and thus, in the present invention, the above-described active material that is capable of being alloyed with lithium, which has a large expansion and contraction due to charging and discharging and has room for improvement in terms of battery life, can be used as a negative electrode active material. As a result, it possible to increase the capacity of the all-solid state secondary battery and extend battery life.

The carbonaceous material that is used as the negative electrode active material is a material substantially consisting of carbon. Examples thereof include petroleum pitch, carbon black such as acetylene black (AB), graphite (natural graphite, artificial graphite such as vapor-grown graphite), and carbonaceous material obtained by firing a variety of synthetic resins such as polyacrylonitrile (PAN)-based resins or furfuryl alcohol resins. Furthermore, examples thereof also include a variety of carbon fibers such as PAN-based carbon fibers, cellulose-based carbon fibers, pitch-based carbon fibers, vapor-grown carbon fibers, dehydrated polyvinyl alcohol (PVA)-based carbon fibers, lignin carbon fibers, vitreous carbon fibers, and activated carbon fibers, mesophase microspheres, graphite whisker, and tabular graphite.

These carbonaceous materials can be classified into non-graphitizable carbonaceous materials (also referred to as "hard carbon") and graphitizable carbonaceous materials based on the graphitization degree. In addition, it is preferable that the carbonaceous material has the lattice spacing, density, and crystallite size described in JP1987-022066A (JP-S62-022066A), JP1990-006856A (JP-H2-006856A), and JP1991-045473A (JP-H3-045473A). The carbonaceous material is not necessarily a single material and, for example, may be a mixture of natural graphite and artificial graphite described in JP1993-090844A (JP-H5-090844A) or graphite having a coating layer described in JP1994-004516A (JP-H6-004516A).

As the carbonaceous material, hard carbon or graphite is preferably used, and graphite is more preferably used.

The oxide of a metal or a metalloid element that can be used as the negative electrode active material is not particularly limited as long as it is an oxide capable of intercalating and deintercalating lithium, and examples thereof include an oxide of a metal element (metal oxide), a composite oxide of a metal element or a composite oxide of a metal element and a metalloid element (collectively referred to as "metal composite oxide), and an oxide of a metalloid element (a metalloid oxide). The oxides are more preferably amorphous oxides, and preferred examples thereof include chalcogenides which are reaction products between metal elements and elements in Group 16 of the periodic table). In the present invention, the metalloid element refers to an element having intermediate properties between those of a metal element and a non-metal element. Typically, the metalloid elements include six elements including boron, silicon, germanium, arsenic, antimony, and tellurium, and further includes three elements including selenium, polonium, and astatine. In addition, "Amorphous" represents an oxide having a broad scattering band with a peak in a range of 20° to 40° in terms of 2θ in case of being measured by an X-ray diffraction method using CuKα rays, and the oxide may have a crystal diffraction line. The highest intensity in a crystal diffraction line observed in a range of 40° to 70° in terms of 2θ is preferably 100 times or less and more preferably 5 times or less relative to the intensity of a diffraction peak line in a broad scattering band observed in a range of 200 to 400 in terms of 2θ, and it is still more preferable that the oxide does not have a crystal diffraction line.

In the compound group consisting of the amorphous oxides and the chalcogenides, amorphous oxides of metalloid elements and chalcogenides are more preferable, and (composite) oxides consisting of one element or a combination of two or more elements selected from elements (for example, Al, Ga, Si, Sn, Ge, Pb, Sb, and Bi) belonging to Groups 13 (IIIB) to 15 (VB) in the periodic table or chalcogenides are more preferable. Specific examples of preferred amorphous oxides and chalcogenides include $Ga_2O_3$, GeO, PbO, $PbO_2$, $Pb_2O_3$, $Pb_2P_4$, $Pb_3O_4$, $Sb_2O_3$, $Sb_2O_4$, $Sb_2O_8Bi_2O_3$, $Sb_2O_8Si_2O_3$, $Sb_2O_5$, $Bi_2O_3$, $Bi_2O_4$, GeS, PbS, $PbS_2$, $Sb_2S_3$, and $Sb_2S_5$.

Preferred examples of the negative electrode active material which can be used in combination with amorphous oxides containing Sn, Si, or Ge as a major component include a carbonaceous material capable of intercalating and/or deintercalating lithium ions or lithium metal, lithium, a lithium alloy, and an active material that is capable of being alloyed with lithium.

It is preferable that an oxide of a metal or a metalloid element, in particular, a metal (composite) oxide and the chalcogenide contains at least one of titanium or lithium as the constituent component from the viewpoint of high current density charging and discharging characteristics. Examples of the metal composite oxide (lithium composite metal oxide) including lithium include a composite oxide consisting of lithium oxide and the metal (composite) oxide or the chalcogenide, specifically, $Li_2SnO_2$.

As the negative electrode active material, for example, a metal oxide (titanium oxide) having a titanium atom is also preferable. Specifically, $Li_4Ti_5O_{12}$ (lithium titanium oxide [LTO]) is preferable since the volume variation during the intercalation and deintercalation of lithium ions is small, and thus the high-speed charging and discharging characteristics are excellent, and the deterioration of electrodes is suppressed, whereby it becomes possible to improve the life of the lithium ion secondary battery.

The lithium alloy as the negative electrode active material is not particularly limited as long as it is typically used as a negative electrode active material for a secondary battery, and examples thereof include a lithium aluminum alloy.

The active material that is capable of being alloyed with lithium is not particularly limited as long as it is typically used as a negative electrode active material for a secondary battery. Such an active material has a large expansion and contraction due to charging and discharging of the all-solid state secondary battery and accelerates the deterioration of the battery performance. However, since the inorganic solid electrolyte-containing composition according to the embodiment of the present invention contains non-spherical binder particles, and thus it is possible to suppress the deterioration of battery performance. Examples of such an active material include a (negative electrode) active material (an alloy or the like) having a silicon element or a tin element and a metal such as Al or In, a negative electrode active material (a silicon-containing active material) having a silicon element capable of exhibiting high battery capacity is preferable, and a silicon-containing active material in which the content of the silicon element is 50% by mol or more with respect to all the constituent elements is more preferable.

In general, a negative electrode including the negative electrode active material (for example, a Si negative electrode including a silicon-containing active material or an Sn negative electrode containing an active material containing a tin element) can intercalate a larger amount of Li ions than a carbon negative electrode (for example, graphite or acetylene black). That is, the amount of Li ions intercalated per unit mass increases. Therefore, it is possible to increase the battery capacity. As a result, there is an advantage that the battery driving duration can be extended.

Examples of the silicon-containing active material include a silicon-containing alloy (for example, $LaSi_2$, $VSi_2$, La—Si, Gd—Si, or Ni—Si) including a silicon material such as Si or SiOx ($0<x\leq1$) and titanium, vanadium, chromium, manganese, nickel, copper, lanthanum, or the like or a structured active material thereof (for example, $LaSi_2$/Si), and an active material such as $SnSiO_3$ or $SnSiS_3$ including silicon element and tin element. In addition, since SiOx itself can be used as a negative electrode active material (a metalloid oxide) and Si is produced along with the operation of an all-solid state secondary battery, SiOx can be used as a negative electrode active material (or a precursor material thereof) capable of forming an alloy with lithium.

Examples of the negative electrode active material including tin element include Sn, SnO, $SnO_2$, SnS, $SnS_2$, and the above-described active material including silicon element and tin element. In addition, a composite oxide with lithium oxide, for example, $Li_2SnO_2$ can also be used.

In the present invention, the above-described negative electrode active material can be used without any particular limitation. From the viewpoint of battery capacity, a preferred aspect as the negative electrode active material is a negative electrode active material that is capable of being alloyed with lithium. Among them, the silicon material or the silicon-containing alloy (the alloy containing a silicon element) described above is more preferable, and it is more preferable to include a negative electrode active material containing silicon (Si) or a silicon-containing alloy.

The chemical formulae of the compounds obtained by the baking can be calculated using an inductively coupled plasma (ICP) emission spectroscopic analysis method as a measurement method from the mass difference of powder before and after firing as a convenient method.

The shape of the negative electrode active material is not particularly limited but is preferably a particle shape. The volume-average particle size of the negative electrode active material is not particularly limited; however, it is preferably 0.1 to 60 μm. The volume-average particle size of the negative electrode active material particles can be measured using the same method as that of the average particle size of the inorganic solid electrolyte. In order to obtain the predetermined particle size, a typical crusher or classifier is used as in the case of the positive electrode active material.

The negative electrode active material may be used singly, or two or more negative electrode active materials may be used in combination.

In the case of forming a negative electrode active material layer, the mass (mg) of the negative electrode active material per unit area ($cm^2$) in the negative electrode active material layer (the electrode active material mass per unit area) is not particularly limited. The weight per unit area can be appropriately determined depending on a set battery capacity.

The content of the negative electrode active material in the composition for an electrode is not particularly limited; however, it is preferably 10 to 80% by mass and more preferably 20% to 80% by mass, with respect to 100% by mass of the solid content.

In the present invention, in a case where a negative electrode active material layer is formed by charging a secondary battery, ions of a metal belonging to Group 1 or Group 2 in the periodic table produced in the all-solid state secondary battery can be used instead of the negative electrode active material. By bonding the ions to electrons and precipitating a metal, a negative electrode active material layer can be formed.

(Coating of Active Material)

The surfaces of the positive electrode active material and the negative electrode active material may be coated with a separate metal oxide. Examples of the surface coating agent include metal oxides and the like containing Ti, Nb, Ta, W, Zr, Al, Si, or Li. Specific examples thereof include titanium oxide spinel, tantalum-based oxides, niobium-based oxides, and lithium niobate-based compounds, and specific examples thereof include $Li_4TisO_{12}$, $Li_2Ti_2O_5$, $LiTaO_3$, $LiNbO_3$, $LiAlO_2$, $Li_2ZrO_3$, $Li_2WO_4$, $Li_2TiO_3$, $Li_2B_4O_7$, $Li_3PO_4$, $Li_2MoO_4$, $Li_3BO_3$, $LiBO_2$, $Li_2CO_3$, $Li_2SiO_3$, $SiO_2$, $TiO_2$, $ZrO_2$, $Al_2O_3$, and $B_2O_3$.

In addition, a surface treatment may be carried out on the surfaces of electrodes including the positive electrode active material or the negative electrode active material using sulfur, phosphorous, or the like.

Furthermore, the particle surface of the positive electrode active material or the negative electrode active material may be treated with an active light ray or an active gas (plasma or the like) before or after the coating of the surfaces.

<Conductive Auxiliary Agent>

The solid electrolyte composition according to the embodiment of the present invention may also include a conductive auxiliary agent. The conductive auxiliary agent is not particularly limited, and conductive auxiliary agents that are known as ordinary conductive auxiliary agents can be used. The conductive auxiliary agent may be, for example, graphite such as natural graphite or artificial graphite, carbon black such as acetylene black, Ketjen black, or furnace black, irregular carbon such as needle cokes, a carbon fiber such as a vapor-grown carbon fiber or a carbon nanotube, or a carbonaceous material such as graphene or fullerene which are electron-conductive materials and also may be a metal powder or a metal fiber of copper, nickel, or the like, and a conductive polymer such as polyaniline, polypyrrole, polythiophene, polyacetylene, or a polyphenylene derivative may also be used.

In the present invention, in a case where the active material and the conductive auxiliary agent are used in combination, among the above-described conductive auxiliary agents, a conductive auxiliary agent that does not intercalate and deintercalate ions (preferably Li ions) of a metal belonging to Group 1 or Group 2 in the periodic table and does not function as an active material at the time of charging and discharging of the battery is classified as the conductive auxiliary agent. Therefore, among the conductive auxiliary agents, a conductive auxiliary agent that can function as the active material in the active material layer at the time of charging and discharging of the battery is classified as an active material but not as a conductive auxiliary agent. Whether or not the conductive auxiliary agent functions as the active material at the time of charging and discharging of a battery is not unambiguously determined but is determined by the combination with the active material.

As the conductive auxiliary agent, one kind may be used singly, or two or more kinds may be used in combination.

The total content of the conductive auxiliary agent in the composition for an electrode is preferably 0.1% to 10% by mass, more preferably 0.1% to 5% by mass, and still more preferably 0.5% to 3% by mass with respect to 100% by mass of the solid content.

The shape of the conductive auxiliary agent is not particularly limited but is preferably a particle shape. The median diameter D50 of the conductive auxiliary agent is not particularly limited, and is, for example, preferably 0.01 to 1 μm, and more preferably 0.02 to 0.1 μm.

<Dispersion Medium>

The solid electrolyte composition according to the embodiment of the present invention preferably contains a dispersion medium. In a case where this solid electrolyte composition contains a dispersion medium, in addition to the typical effects (improvement of composition uniformity, improvement of handleability, or the like) as a dispersion medium, an effect of controlling the aggregating properties of the non-spherical binder particles can be obtained.

The dispersion medium is not particularly limited as long as it can disperse the respective components included in the solid electrolyte composition according to the embodiment of the present invention, and it is preferable that a dispersion medium that can disperse the above-described non-spherical binder particles (the polymer which forms the binder) in the form of particles is selected.

Examples of the dispersion medium to be used in the present invention include various organic solvents. Examples of the organic solvent include the respective solvents of an alcohol compound, an ether compound, an amide compound, an amine compound, a ketone compound, an aromatic compound, an aliphatic compound, a nitrile compound, and an ester compound.

Examples of the alcohol compound include methyl alcohol, ethyl alcohol, 1-propyl alcohol, 2-propyl alcohol, 2-butanol, ethylene glycol, propylene glycol, glycerin, 1,6-hexanediol, cyclohexanediol, sorbitol, xylitol, 2-methyl-2,4-pentanediol, 1,3-butanediol, and 1,4-butanediol.

Examples of the ether compound include an alkylene glycol (for example, diethylene glycol, triethylene glycol, polyethylene glycol, or dipropylene glycol), an alkylene glycol alkyl ether (for example, ethylene glycol monomethyl ether, ethylene glycol monobutyl ether, diethylene glycol monomethyl ether, propylene glycol monomethyl ether, dipropylene glycol monomethyl ether, tripropylene glycol monomethyl ether, or diethylene glycol monobutyl ether), a dialkyl ether (for example, dimethyl ether, diethyl ether, diisopropyl ether, or dibutyl ether), and a cyclic ether (for example, tetrahydrofuran or dioxane (including 1,2-, 1,3- or 1,4-isomer)).

Examples of the amide compound include N,N-dimethylformamide, N-methyl-2-pyrrolidone, 2-pyrrolidinone, 1,3-dimethyl-2-imidazolidinone, 2-pyrrolidinone, 6-caprolactam, formamide, N-methylformamide, acetamide, N-methylacetamide, N,N-dimethylacetamide, N-methylpropanamide, and hexamethylphosphoric amide.

Examples of the amine compound include triethylamine, diisopropylethylamine, and tributylamine.

Examples of the ketone compound include acetone, methyl ethyl ketone (MEK), methyl isobutyl ketone, cyclohexanone, and diisobutyl ketone (DIBK).

Examples of the aromatic compound include an aromatic hydrocarbon compound such as benzene, toluene, or xylene.

Examples of the aliphatic compound include an aliphatic hydrocarbon compound such as hexane, heptane, octane, or decane.

Examples of the nitrile compound include acetonitrile, propionitrile, and isobutyronitrile.

Examples of the ester compound include a carboxylic acid ester such as ethyl acetate, butyl acetate, propyl acetate, propyl butyrate, isopropyl butyrate, butyl butyrate, isobutyl butyrate, butyl pentanoate, ethyl isobutyrate, propyl isobutyrate, isopropyl isobutyrate, isobutyl isobutyrate, propyl pivalate, isopropyl pivalate, butyl pivalate, and isobutyl pivalate.

Examples of a non-aqueous dispersion medium include the aromatic compound and the aliphatic compound described above.

In the present invention, the dispersion medium is preferably a ketone compound, an ester compound, an aromatic compound, or an aliphatic compound and more preferably a dispersion medium including at least one selected from a ketone compound, an ester compound, an aromatic compound, or an aliphatic compound.

The number of non-aqueous dispersion media in the solid electrolyte composition may be one or two or more but is preferably two or more.

The total content of the dispersion medium in the solid electrolyte composition is not particularly limited; however, it is preferably 20% to 80% by mass, more preferably 30% to 70% by mass, and particularly preferably 40% to 60% by mass.

<Other Additives>

As components other than the respective components described above, the solid electrolyte composition according to the embodiment of the present invention may optionally include a lithium salt, an ionic liquid, a thickener, a crosslinking agent (an agent causing a crosslinking reaction by radical polymerization, condensation polymerization, or ring-opening polymerization), a polymerization initiator (an agent that generates an acid or a radical by heat or light), an antifoaming agent, a leveling agent, a dehydrating agent, or an antioxidant.

[Method of Manufacturing Solid Electrolyte Composition]

The solid electrolyte composition according to the embodiment of the present invention can be prepared, preferably as a slurry, by mixing the inorganic solid electrolyte, the non-spherical binder particles, and the dispersion medium, and further mixing other components or the like, for example using various mixers that are typically used.

A mixing method is not particularly limited, and the components may be mixed at once or sequentially. The non-spherical binder particles are typically used as a dispersion liquid of the non-spherical binder particles but are not limited thereto. A mixing environment is not particularly limited, and examples thereof include a dry air environment and an inert gas environment.

[Sheet for an all-Solid State Secondary Battery]

A sheet for an all-solid state secondary battery according to the embodiment of the present invention is a sheet-shaped molded body with which a constituent layer of an all-solid state secondary battery can be formed, and includes various aspects depending on uses thereof. Examples of the sheet for an all-solid state secondary battery include a sheet that is preferably used in a solid electrolyte layer (also referred to as a solid electrolyte sheet), and a sheet that is preferably used in an electrode or a laminate of an electrode and a solid electrolyte layer (an electrode sheet for an all-solid state secondary battery).

The solid electrolyte sheet is not particularly limited as long as it is a sheet including a solid electrolyte layer, and may be a sheet in which a solid electrolyte layer is formed on a substrate or may be a sheet that is formed of a solid electrolyte layer without including a substrate. The solid electrolyte sheet may include another layer in addition to the solid electrolyte layer. Examples of the other layer include a protective layer (stripping sheet), a current collector, and a coating layer.

Examples of the solid electrolyte sheet according to the embodiment of the present invention include a sheet including a layer formed of the solid electrolyte composition according to the embodiment of the present invention, a typical solid electrolyte layer, and optionally a protective layer on a substrate in this order. The solid electrolyte layer formed of the solid electrolyte composition according to the embodiment of the present invention contains an inorganic solid electrolyte and non-spherical binder particles as one of the binders, and in this solid electrolyte layer, the contact state between the solid particles and the binding force between the solid particles and the like are improved with a good balance as described above. In the solid electrolyte layer, the inorganic solid electrolyte and the non-spherical binder particles are in a state where the inorganic solid electrolyte is bound by the non-spherical binder particles. The contents of the respective components in the solid electrolyte layer are not particularly limited; however, the contents are preferably the same as the contents of the respective components with respect to the solid content of the solid electrolyte composition according to the embodiment of the present invention. The solid electrolyte layer is the same as a solid electrolyte layer in an all-solid state secondary battery described below and typically does not include an active material. The solid electrolyte sheet can be suitably used as a material which forms a solid electrolyte layer for an all-solid state secondary battery.

The substrate is not particularly limited as long as it can support the solid electrolyte layer, and examples thereof include a sheet body (plate-shaped body) formed of materials described below regarding the current collector, an organic material, an inorganic material, or the like. Examples of the organic materials include various polymers, and specific examples thereof include polyethylene terephthalate, polypropylene, polyethylene, and cellulose. Examples of the inorganic materials include glass and ceramic.

An electrode sheet for an all-solid state secondary battery according to the embodiment of the present invention (simply also referred to as "electrode sheet according to the embodiment of the present invention") is not particularly limited as long as it is an electrode sheet including an active material layer, and may be a sheet in which an active material layer is formed on a substrate (current collector) or may be a sheet that is formed of an active material layer without including a substrate. The electrode sheet is typically a sheet including the current collector and the active material layer, and examples of an aspect thereof include an aspect including the current collector, the active material layer, and the solid electrolyte layer in this order and an aspect including the current collector, the active material layer, the solid electrolyte layer, and the active material layer in this order. The electrode sheet according to the embodiment of the present invention may include the above-described other layers. The thickness of each of the layers forming the electrode sheet according to the embodiment of the present invention is the same as the thickness of each of layers described below regarding the all-solid state secondary battery.

Regarding the electrode sheet according to the embodiment of the present invention, the preferred aspect is a negative electrode sheet for an all-solid state secondary battery, which contains an active material that is capable of being alloyed with lithium, as the negative electrode active material, since the discharge capacity (the discharge capacity density) is further increased while low resistance and long battery life are maintained in a case where the electrode sheet is used as a negative electrode active material layer of an all-solid state secondary battery.

The active material layer of the electrode sheet is preferably formed of the solid electrolyte composition (the composition for an electrode) according to the embodiment of the present invention, which contains the active material, and in particular, the negative electrode sheet is particularly preferably formed of the solid electrolyte composition according to the embodiment of the present invention, which contains the negative electrode active material that is capable of being alloyed with lithium. Similar to the solid electrolyte layer formed of the solid electrolyte composition according to the embodiment of the present invention, in the active material layer of the electrode sheet, solid particles containing the active material and the conductive auxiliary agent are bound to each other by the non-spherical binder particles, and the contact state between the solid particles and the binding force between the solid particles and the like are improved with a good balance. The contents of the respective components in the active material layer of the electrode sheet are not particularly limited; however, the contents are preferably the same as the contents of the respective components with respect to the solid content of the solid electrolyte composition (the composition for an electrode) according to the embodiment of the present invention. The electrode sheet can be suitably used as a material which forms a (negative electrode or positive electrode) active material layer of an all-solid state secondary battery.

[Method for Manufacturing Sheet for all-Solid State Secondary Battery]

The method of manufacturing the sheet for an all-solid state secondary battery is not particularly limited. The sheet for an all-solid state secondary battery can be manufactured using the solid electrolyte composition according to the embodiment of the present invention. For example, a method of preparing the solid electrolyte composition according to the embodiment of the present invention as described above and forming a film (carrying out coating and drying) on the substrate (another layer may be interposed) using the obtained solid electrolyte composition to form a solid electrolyte layer (a coated and dried layer) on the substrate can be used. This method makes it possible to prepare a sheet for an all-solid state secondary battery having an appropriate base material (a current collector) and a coated and dried layer. Here, the coated and dried layer refers to a layer formed by carrying out coating with the solid electrolyte composition according to the embodiment of the present invention and drying the dispersion medium (that is, a layer formed using the solid electrolyte composition according to the embodiment of the present invention and consisting of a composition obtained by removing the dispersion medium from the solid electrolyte composition according to the embodiment of the present invention). In this coated and dried layer, the inorganic solid electrolyte is bound by the non-spherical binder particles. In the active material layer and the coated and dried layer, the dispersion medium may remain within a range where the effects of the present invention do not deteriorate, and the residual amount thereof, for example, in each of the layers may be 3% by mass or lower.

In the above-described manufacturing method, it is preferable that the solid electrolyte composition according to the embodiment of the present invention is used as a slurry. The solid electrolyte composition according to the embodiment of the present invention can be converted into a slurry using a conventionally known method as desired. Each of the processes of coating, drying, and the like for the solid electrolyte composition according to the embodiment of the present invention will be described in the following method of manufacturing an all-solid state secondary battery.

In the method of manufacturing a sheet for an all-solid state secondary battery, the coated and dried layer obtained as described above can be pressurized. The pressurizing condition and the like will be described later in the section of the method of manufacturing an all-solid state secondary battery.

In addition, in the method of manufacturing a sheet for an all-solid state secondary battery, the base material, the protective layer (particularly stripping sheet), or the like can also be stripped.

[All-Solid State Secondary Battery]

The all-solid state secondary battery according to the embodiment of the present invention includes a positive electrode active material layer, a negative electrode active material layer facing the positive electrode active material layer, and a solid electrolyte layer disposed between the positive electrode active material layer and the negative electrode active material layer. The positive electrode active material layer is formed optionally on a positive electrode current collector to configure a positive electrode. The negative electrode active material layer is formed optionally on a negative electrode current collector to configure a negative electrode.

It is preferable that at least one of the solid electrolyte layer, the positive electrode active material layer, or the negative electrode active material layer in an all-solid state secondary battery is formed of the solid electrolyte composition according to the embodiment of the present invention and more preferable that all the layers are formed of the solid electrolyte composition according to the embodiment of the present invention. In this aspect, the respective components such as the non-spherical binder contained in each layer or the like may be the same or different from each other. In the present invention, an aspect in which the negative electrode active material layer is formed of the solid electrolyte composition according to the embodiment of the present invention, which contains an active material that is capable of being alloyed with lithium, is also preferable. The all-solid state secondary battery in which the negative electrode active material layer is formed of the solid electrolyte composition according to the embodiment of the present invention, which contains an active material that is capable of being alloyed with lithium, provides a further large discharge capacity (high discharge capacity density) while maintaining low resistance and long battery life.

The positive electrode active material layer and the negative electrode active material layer, which are formed of the solid electrolyte composition according to the embodiment of the present invention, contains an inorganic solid electrolyte, an active material, non-spherical binder particles, and as appropriate, another binder, a conductive auxiliary agent, and each of the above components. In a case where the negative electrode active material layer is not formed of the solid electrolyte composition according to the embodiment of the present invention, as the negative electrode active material layer, for example, a layer containing an inorganic solid electrolyte, an active material, and appropriately a component among the above-described respective components, a layer (for example, a lithium metal layer) formed of a metal or an alloy described above as the negative electrode active material, or a layer (sheet) formed of a carbonaceous material described above as the negative electrode active material is adopted. The layer formed of a metal or an alloy includes, for example, a layer, a metal foil or alloy foil, or a deposited film in which powder of a metal such as lithium or an alloy is deposited or molded. The thickness of each of the layers formed of a metal or an alloy and the layer formed of a carbonaceous material is not particularly limited and is, for example, 0.01 to 100 μm. The solid electrolyte layer formed of the solid electrolyte composition according to the embodiment of the present invention contains a solid electrolyte having ion conductivity of a metal belonging to Group 1 or Group 2 in the periodic table, a non-spherical binder, and appropriately each of the above components.

(Positive Electrode Active Material Layer, Solid Electrolyte Layer, and Negative Electrode Active Material Layer)

In the all-solid state secondary battery according to the embodiment of the present invention, as described above, a solid electrolyte composition or an active material layer can be formed of the solid electrolyte composition according to the embodiment of the present invention or the above-described sheet for an all-solid state secondary battery. Unless specified otherwise regarding each of the components and each of the contents thereof, the solid electrolyte layer and active material layer to be formed are preferably the same as those of the solid content in the solid electrolyte composition.

The thickness of each of the negative electrode active material layer, the solid electrolyte layer, and the positive electrode active material layer is not particularly limited. In case of taking a dimension of an ordinary all-solid state secondary battery into account, the thickness of each of the layers is preferably 5 to 1,000 μm and more preferably 10 μm or more and less than 500 μm. In the all-solid state secondary battery according to the embodiment of the present invention, the thickness of at least one layer of the positive electrode active material layer, the solid electrolyte layer, or the negative electrode active material layer is still more preferably 20 μm or more and less than 500 μm.

Each of the positive electrode active material layer and the negative electrode active material layer may include a current collector on the side opposite to the solid electrolyte layer.

(Case)

Depending on uses, the all-solid state secondary battery according to the embodiment of the present invention may be used as the all-solid state secondary battery having the above-described structure as it is but is preferably sealed in an appropriate case to be used in the form of a dry cell. The case may be a metallic case or a resin (plastic) case. In a case where a metallic case is used, examples thereof include an aluminum alloy case and a stainless steel case. It is preferable that the metallic case is classified into a positive electrode-side case and a negative electrode-side case and that the positive electrode-side case and the negative electrode-side case are electrically connected to the positive electrode current collector and the negative electrode current collector, respectively. The positive electrode-side case and the negative electrode-side case are preferably integrated by being joined together through a gasket for short circuit prevention.

Hereinafter, the all-solid state secondary battery of the preferred embodiments of the present invention will be described with reference to FIG. 1, but the present invention is not limited thereto.

FIG. 1 is a cross-sectional view schematically illustrating an all-solid state secondary battery (a lithium ion secondary battery) according to a preferred embodiment of the present invention. In the case of being seen from the negative electrode side, an all-solid state secondary battery 10 of the present embodiment includes a negative electrode current collector 1, a negative electrode active material layer 2, a solid electrolyte layer 3, a positive electrode active material layer 4, and a positive electrode current collector 5 in this order. The respective layers are in contact with one another and have a laminated structure. In a case in which the above-described structure is employed, during charging, electrons ($e^-$) are supplied to the negative electrode side, and lithium ions ($Li^+$) are accumulated on the negative electrode side. On the other hand, during discharging, the lithium ions ($Li^+$) accumulated in the negative electrode side return to the positive electrode, and electrons are supplied to an operation portion 6. In an example illustrated in the drawing, an electric bulb is employed as the operation portion 6 and is lit by discharging.

The solid electrolyte composition according to the embodiment of the present invention can be preferably used as a material which forms the solid electrolyte layer, the negative electrode active material layer, or the positive electrode active material layer. In addition, the sheet for an all-solid state secondary battery according to the embodiment of the present invention is suitable as the negative electrode active material layer, the positive electrode active material layer, and the solid electrolyte layer.

In the present specification, the positive electrode active material layer (hereinafter, also referred to as the positive electrode layer) and the negative electrode active material layer (hereinafter, also referred to as the negative electrode layer) will be collectively referred to as the electrode layer or the active material layer in some cases.

In a case where the all-solid state secondary battery having a layer configuration illustrated in FIG. 1 is put into a 2032-type coin case, the all-solid state secondary battery will be referred to as the "laminate for an all-solid state secondary battery", and a battery prepared by putting this laminate for an all-solid state secondary battery into a 2032-type coin case will be referred to as "all-solid state secondary battery", thereby referring to both batteries distinctively in some cases.

(Positive Electrode Active Material Layer, Solid Electrolyte Layer, and Negative Electrode Active Material Layer)

In the all-solid state secondary battery 10, any one of the solid electrolyte layer or the active material layer is formed using the solid electrolyte composition according to the embodiment of the present invention or the above-described sheet for an all-solid state secondary battery. In the preferred aspect, all layers are formed using the solid electrolyte composition according to the embodiment of the present invention or the above-described sheet for an all-solid state secondary battery, and in another preferred aspect, the negative electrode active material layer is formed of the solid electrolyte composition according to the embodiment of the present invention or the negative electrode sheet for an all-solid state secondary battery, which contains an active material that is capable of being alloyed with lithium.

In a case where at least one of the solid electrolyte layer or the positive electrode active material layer is formed using the solid electrolyte composition according to the embodiment of the present invention or the above-described sheet for an all-solid state secondary battery, the negative electrode active material layer can also be formed by using a layer formed of a metal or an alloy as the negative electrode active material, a layer formed of a carbonaceous material as the negative electrode active material, or the like and further precipitating a metal belonging to Group 1 or Group 2 in the periodic table on a negative electrode current collector or the like during charging.

Each component that the positive electrode active material layer 4, the solid electrolyte layer 3, and the negative electrode active material layer 2 contain may be identical to or different from each other.

The positive electrode current collector 5 and the negative electrode current collector 1 are preferably an electron conductor.

In the present invention, either or both of the positive electrode current collector and the negative electrode current collector will also be simply referred to as the current collector.

As a material which forms the positive electrode current collector, not only aluminum, an aluminum alloy, stainless steel, nickel, or titanium but also a material (a material on which a thin film is formed) obtained by treating the surface of aluminum or stainless steel with carbon, nickel, titanium, or silver is preferable. Among these, aluminum or an aluminum alloy is more preferable.

As a material which forms the negative electrode current collector, aluminum, copper, a copper alloy, stainless steel, nickel, titanium, or the like, and further, a material obtained by treating the surface of aluminum, copper, a copper alloy, or stainless steel with carbon, nickel, titanium, or silver is preferable, and aluminum, copper, a copper alloy, or stainless steel is more preferable.

Regarding the shape of the current collector, a film sheet shape is typically used; however, it is also possible to use shapes such as a net shape, a punched shape, a lath body, a porous body, a foaming body, and a molded body of fiber.

The thickness of the current collector is not particularly limited; however, it is preferably 1 to 500 μm. In addition, protrusions and recesses are preferably provided on the surface of the current collector by carrying out a surface treatment.

In the present invention, a functional layer, a functional member, or the like may be appropriately interposed or disposed between each layer of the negative electrode current collector, the negative electrode active material layer, the solid electrolyte layer, the positive electrode active material layer, and the positive electrode current collector or on the outside thereof. In addition, each layer may be constituted of a single layer or multiple layers.

[Method of Manufacturing of all-Solid State Secondary Battery]

The all-solid state secondary battery according to the embodiment of the present invention is not particularly limited and can be manufactured by carrying out (including) the method of manufacturing the solid electrolyte composition. Focusing on raw materials to be used, the all-solid state secondary battery can be manufactured using the solid electrolyte composition according to the embodiment of the present invention. Specifically, the all-solid state secondary battery can be manufactured by preparing the solid electrolyte composition according to the embodiment of the present invention as described above and forming a solid electrolyte layer and/or an active material layer of the all-solid state secondary battery using the obtained solid electrolyte composition or the like. In this manner, it possible to manufacture an all-solid state secondary battery that maintains excellent battery performance even after repeated charging and discharging. The method of preparing the solid electrolyte composition is as described above, and thus the description thereof will not be repeated.

The all-solid state secondary battery according to the embodiment of the present invention can be manufactured using a method including (carrying out) a process of carrying out coating with the solid electrolyte composition according to the embodiment of the present invention onto base material (for example, a metal foil which serves as a current collector) and forming a coating film (making a film).

For example, the solid electrolyte composition (the composition for an electrode) according to the embodiment of the present invention as the composition for a positive electrode is applied onto a metal foil which is a positive electrode current collector to form a positive electrode active material layer. As a result, a positive electrode sheet for an all-solid state secondary battery is prepared. Next, the solid electrolyte composition according to the embodiment of the present invention, which forms a solid electrolyte layer is applied onto the positive electrode active material layer to form the solid electrolyte layer. Furthermore, the solid electrolyte composition (the composition for an electrode) according to the embodiment of the present invention as the composition for a negative electrode is applied onto the solid electrolyte layer to form a negative electrode active material layer. A negative electrode current collector (a metal foil) is overlaid on the negative electrode active material layer, whereby it is possible to obtain an all-solid state secondary battery having a structure in which the solid electrolyte layer is sandwiched between the positive electrode active material layer and the negative electrode active material layer. Optionally by sealing the laminate in a case, a desired all-solid state secondary battery can be obtained.

In addition, it is also possible to manufacture an all-solid state secondary battery by carrying out the forming method for each layer in reverse order to form a negative electrode active material layer, a solid electrolyte layer, and a positive electrode active material layer on a negative electrode current collector and overlaying a positive electrode current collector thereon.

As another method, the following method can be exemplified. That is, the positive electrode sheet for an all-solid state secondary battery is prepared as described above. In addition, the solid electrolyte composition according to the embodiment of the present invention is applied as a composition for a negative electrode onto a metal foil which is a negative electrode current collector to form a negative electrode active material layer. As a result, a negative electrode sheet for an all-solid state secondary battery is prepared. Next, the solid electrolyte layer is formed on the active material layer in any one of the sheets by carrying out coating with solid electrolyte composition according to the embodiment of the present invention thereto as described above. Furthermore, the other one of the positive electrode sheet for an all-solid state secondary battery and the negative electrode sheet for an all-solid state secondary battery is laminated on the solid electrolyte layer such that the solid electrolyte layer and the active material layer come into contact with each other. This way, an all-solid state secondary battery can be manufactured.

As still another method, for example, the following method can be used. That is, a positive electrode sheet for an all-solid state secondary battery and a negative electrode sheet for an all-solid state secondary battery are prepared as described above. In addition, separately from the positive electrode sheet for an all-solid state secondary battery and the negative electrode sheet for an all-solid state secondary battery, a solid electrolyte composition is applied onto a base material, thereby producing a solid electrolyte sheet constituted of a solid electrolyte layer. Furthermore, the positive electrode sheet for an all-solid state secondary battery and the negative electrode sheet for an all-solid state secondary battery are laminated with each other to sandwich the solid electrolyte layer that has been peeled off from the base material. This way, an all-solid state secondary battery can be manufactured.

The respective manufacturing methods are the methods of forming the solid electrolyte layer, the negative electrode active material layer, and the positive electrode active material layer using the solid electrolyte composition according to the embodiment of the present invention. However, in this method of manufacturing the all-solid state secondary battery, at least one of the solid electrolyte layer, the negative electrode active material layer, or the positive electrode active material layer is formed using the solid electrolyte composition according to the embodiment of the present invention. In a case where the solid electrolyte layer is formed by a composition other than the solid electrolyte composition according to the embodiment of the present invention, examples thereof include a typically used solid electrolyte composition. In a case where the negative electrode active material layer is formed using a material other than the solid electrolyte composition according to the embodiment of the present invention, examples of a material of the composition a well-known negative electrode active material, a metal, or an alloy (metal layer) as a negative electrode active material, and a carbonaceous material (carbonaceous material layer) as a negative electrode active material. In addition, the negative electrode active material layer can also be formed by binding ions of a metal belonging to Group 1 or Group 2 in the periodic table, which are accumulated on a negative electrode current collector during initialization described below or during charging for use, without forming the negative electrode active material layer during the manufacturing of the all-solid state secondary battery to electrons and precipitating the ions on a negative electrode current collector or the like as a metal.

In each of the manufacturing method described above, the solid electrolyte layer or the like can also be formed on the substrate or the active material layer, for example, by pressure-molding the solid electrolyte composition or the like under a pressurizing condition described below, or the solid electrolyte composition or a sheet molded body of the active material.

<Formation of Respective Layers (Film Formation)>

The method of carrying out coating with the composition used for manufacturing the all-solid state secondary battery is not particularly limited and can be appropriately selected. Examples thereof include coating (preferably wet-type coating), spray coating, spin coating, dip coating, slit coating, stripe coating, and bar coating.

In this case, the composition may be dried after being applied each time or may be dried after being applied multiple times. The drying temperature is not particularly limited. The lower limit is preferably 30° C. or higher, more preferably 60° C. or higher, and still more preferably 80° C. or higher. The upper limit is preferably 300° C. or lower, more preferably 250° C. or lower, and still more preferably 200° C. or lower. In a case where the solid electrolyte composition is heated in the above-described temperature range, the dispersion medium can be removed to make the composition enter a solid state (coated and dried layer). This temperature range is preferable since the temperature is not excessively increased and each member of the all-solid state secondary battery is not impaired.

As described above, in a case where the solid electrolyte composition according to the embodiment of the present invention is applied and dried, a coated and dried layer in which solid particles are strongly bound and the interfacial resistance between the solid particles is low can be formed.

After the application of the composition or after the preparation of the all-solid state secondary battery, the respective layers or the all-solid state secondary battery is preferably pressurized. In addition, each of the layers is also preferably pressurized together in a state of being laminated. Examples of the pressurization methods include a method using a hydraulic cylinder pressing machine and the like. The pressurizing force is not particularly limited and generally, the range of 10 (preferably 50) to 1,500 MPa can be mentioned.

In addition, the applied composition may be heated while being pressurized. The heating temperature is not particularly limited but is generally in a range of 30° C. to 300° C. Each of the layers or the all-solid state secondary battery can also be pressed at a temperature higher than the glass transition temperature of the inorganic solid electrolyte.

The pressurization may be carried out in a state in which the coating solvent or dispersion medium has been dried in advance or in a state in which the coating solvent or the dispersion medium remains.

The respective compositions may be applied at the same time, and the application, the drying, and the pressing may be carried out simultaneously and/or sequentially. Each of the compositions may be applied onto each of the separate base materials and then laminated by carrying out transfer.

The atmosphere during the pressurization is not particularly limited and may be any one of the atmospheres such as an atmosphere of dried air (the dew point: −20° C. or lower) and an atmosphere of an inert gas (for example, an argon gas, a helium gas, or a nitrogen gas). Since the inorganic solid electrolyte reacts with moisture, it is preferable that the atmosphere during pressurization is dry air or an inert gas.

The pressurization time may be a short time (for example, within several hours) under the application of a high pressure or a long time (one day or longer) under the application of an intermediate pressure. In case of members other than the sheet for an all-solid state secondary battery, for example, the all-solid state secondary battery, it is also possible to use a restraining device (screw fastening pressure or the like) of the all-solid state secondary battery in order to continuously apply an intermediate pressure.

The pressing pressure may be a pressure that is constant or varies with respect to a portion under pressure such as a sheet surface.

The pressing pressure may be variable depending on the area or the thickness of the pressed portion. In addition, the pressure may also be variable stepwise for the same portion.

A pressing surface may be flat or roughened.

<Initialization>

The all-solid state secondary battery manufactured as described above is preferably initialized after the manufacturing or before use. The initialization is not particularly limited, and it is possible to initialize the all-solid state secondary battery by, for example, carrying out initial charging and discharging in a state in which the pressing pressure is increased and then releasing the pressure up to a pressure at which the all-solid state secondary battery is ordinarily used.

[Usages of all-Solid State Secondary Battery]

The all-solid state secondary battery according to the embodiment of the present invention can be applied to a variety of usages. Application aspects are not particularly limited, and, in the case of being mounted in electronic apparatuses, examples thereof include notebook computers, pen-based input personal computers, mobile personal computers, e-book players, mobile phones, cordless phone handsets, pagers, handy terminals, portable faxes, mobile copiers, portable printers, headphone stereos, video movies, liquid crystal televisions, handy cleaners, portable CDs, mini discs, electric shavers, transceivers, electronic notebooks, calculators, portable tape recorders, radios, backup power supplies, and memory cards. Additionally, examples of consumer usages include automobiles (electric vehicles and the like), electric vehicles, motors, lighting equipment, toys, game devices, road conditioners, watches, strobes, cameras, medical devices (pacemakers, hearing aids, and shoulder massage devices, and the like). Furthermore, the all-solid state secondary battery can be used for a variety of military usages and universe usages. In addition, the all-solid state secondary battery can also be combined with a solar battery.

EXAMPLES

Hereinafter, the present invention will be described in more detail with reference to Examples. Meanwhile, the present invention is not interpreted to be limited thereto. "Parts" and "%" that represent compositions in the following Examples are mass-based unless particularly otherwise described.

Non-spherical binder particles and inorganic solid electrolytes used in Examples and Comparative Examples were synthesized as follows.

Synthesis Example 1: Synthesis of Binder-Forming Polymer P-1 (Preparation of Polymer Solution P-1)

2.5 g of 2,2-bis(hydroxymethyl) butyric acid, 10.6 g of PEG 200 (polyethylene glycol), and 19.9 g of both-terminal hydroxyl group-hydrogenated polybutadiene GI-1000 (trade name, NISSO PB GI-1000), and 20.8 g of methylene diphenyl 4,4'-diisocyanate were added in a 500 mL three-necked flask and dissolved in 215 g of tetrahydrofuran (THF). To this solution, 80 mg of Neostan U-600 (trade name, manufactured by Nitto Kasei Co., Ltd.) was added and stirred at 60° C. for 5 hours. 1.8 g of methanol was added to this solution, and stirring was continued at 60° C. for 30 minutes to synthesize a binder-forming polymer P-1, whereby a polymer solution P-1 was obtained.

Synthesis Examples 2 to 10: Synthesis of Binder-Forming Polymers P-2 to P-10 (Preparation of Polymer Solutions P-2 to P-10)

Each of polymers P-2 to P-10 (polymer solutions P-2 t P-10) was synthesized (prepared) in the same manner as in the synthesis of the polymer P-1 described above, except that compounds from which the constituent components shown in Table 1-1 were derived, as compounds from which constituent components were respectively derived, were used so that the amounts used were respectively the contents shown in the same table in the synthesis of the polymer P-1.

All of the polymers P-1 to P-10 are polyurethane polymers having, in the side chain, a carboxy group among the functional groups contained in Group (a) of functional groups.

Synthesis Example 11: Synthesis of Binder-Forming Polymer P-11 (Preparation of Polymer Solution P-11)

12.0 g of lauryl methacrylate, 6.0 g of acrylic acid, 24.0 g of methyl methacrylate, and 18.0 g of acrylonitrile were added in a 500 mL three-necked flask equipped with a reflux cooling pipe and a gas introduction cock and dissolved in 130 g of butyl acetate. Thereafter, nitrogen gas was introduced at a flow rate of 200 m/min for 30 minutes, and the solution was heated to 80° C. A solution (a mixture of 0.6 g of a radical polymerization initiator V-601 (trade name, manufactured by Wako Pure Chemical Industries, Ltd.) prepared in a separate container and 10 g of butyl acetate) was dropwise added thereto over 2 hours, and stirring was continued at 80° C. for 2 hours. Then, 1.2 g of the radical polymerization initiator V-601 was further added, and the mixture was stirred at 95° C. for 2 hours. The obtained solution was cooled to room temperature to synthesize a binder-forming polymer P-11, whereby a polymer solution P-11 was obtained.

The polymer P-11 is a (meth)acrylic polymer having a carboxy group and a cyano group, in the side chain, among the functional groups included in Group (a) of functional groups, and the content of the constituent component having these functional groups in the polymer is 40% by mass.

Synthesis Example 12: Synthesis of Binder-Forming Polymer P-12 (Preparation of Polymer Solution P-12)

A polymer P-12 (a polymer solution P-12) was synthesized (prepared) in the same manner as in the synthesis of the polymer P-11, except that methyl methacrylate was changed from 24.0 g to 18.0 g and 18.0 g of acrylonitrile was changed to 24.0 g of hydroxyethyl acrylate in the synthesis of the polymer P-11.

The polymer P-12 is a (meth)acrylic polymer having a carboxy group and a hydroxy group, in the side chain, among the functional groups included in Group (a) of functional groups, and the content of the constituent component having these functional groups in the polymer is 50% by mass.

<Measurement of Mass-Average Molecular Weight of Binder-Forming Polymer>

The mass-average molecular weight (Mw) of each of the obtained polymers was measured by the method described above. The results are shown in Table 1-1 and Table 1-2 (collectively referred to as Table 1).

<Measurement of Glass Transition Temperature of Binder-Forming Polymer>

The glass transition temperature (Tg) of each of the obtained polymers was measured by the method described above. The results are shown in Table 1. In a case where a plurality of glass transition temperatures were observed, they were denoted, with being separated by "/", in order from the lowest Tg in Table 1-1.

The synthesized binder-forming polymers P-1 to P-7 and P-10 to 12 are shown below. The number written at the lower right of the constituent component of each of the binder-forming polymers P-1 to P-7 and P-10 indicates the content (% by mol) of the constituent component in the binder-forming polymer, and the number written at the lower right of the constituent component of each of the binder-forming polymer P-11 and P-12 indicates the content (% by mass) of the constituent component in the binder-forming polymer.

The binder-forming polymers P-8 and P-9 have the same constituent components as the binder-forming polymer P-1, and thus the details thereof are not described.

P-1

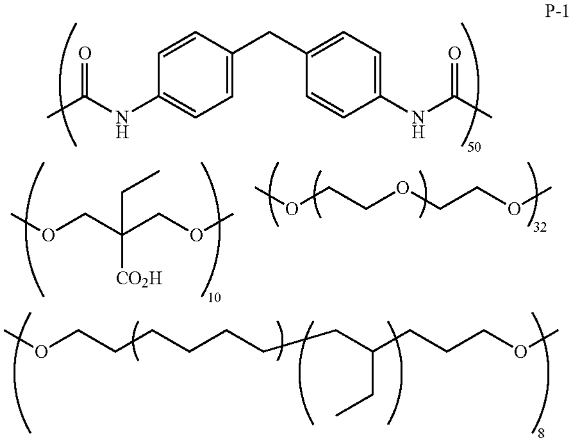

P-2

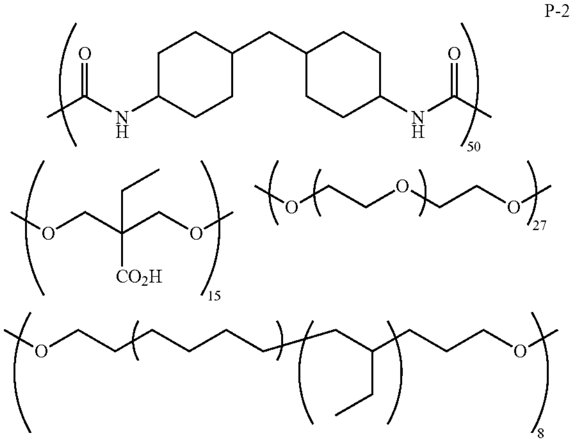

P-3

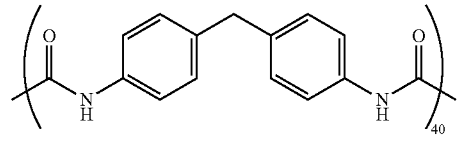

-continued
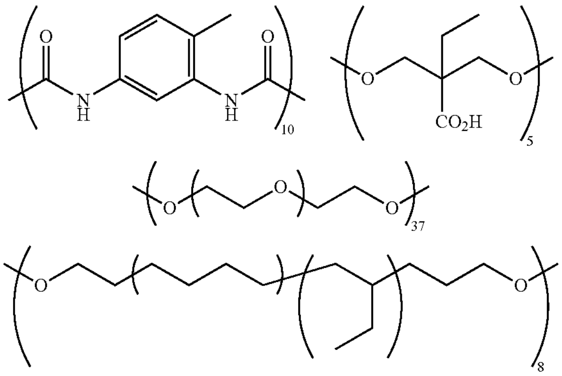
P-4
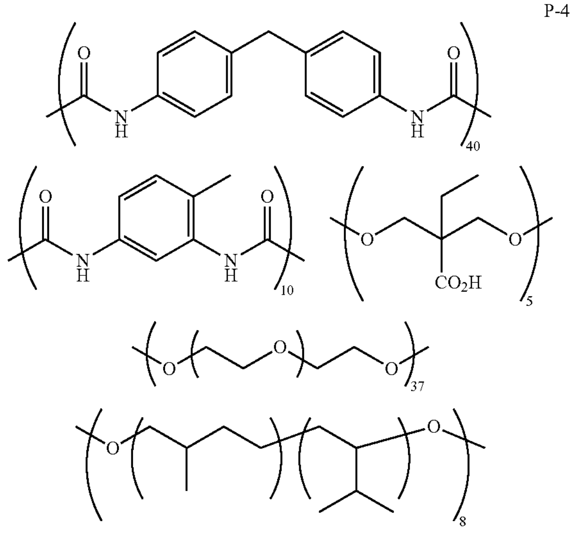
P-5
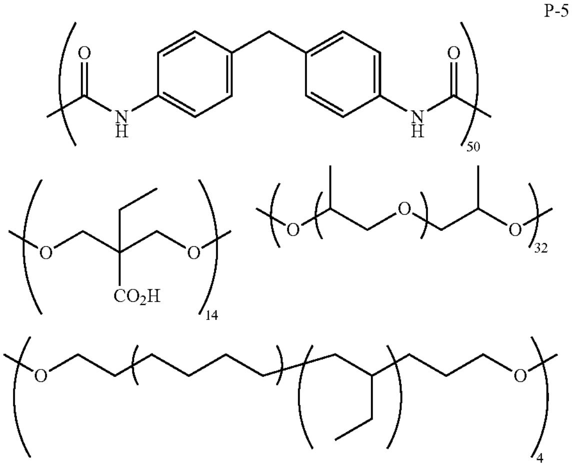
P-6
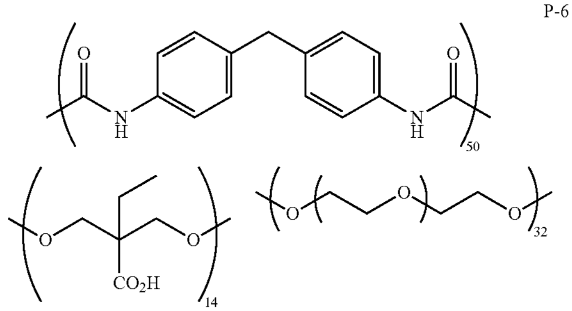
-continued
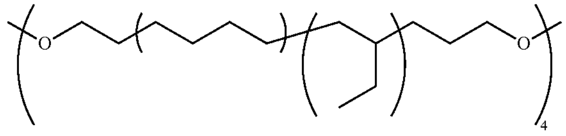
P-7
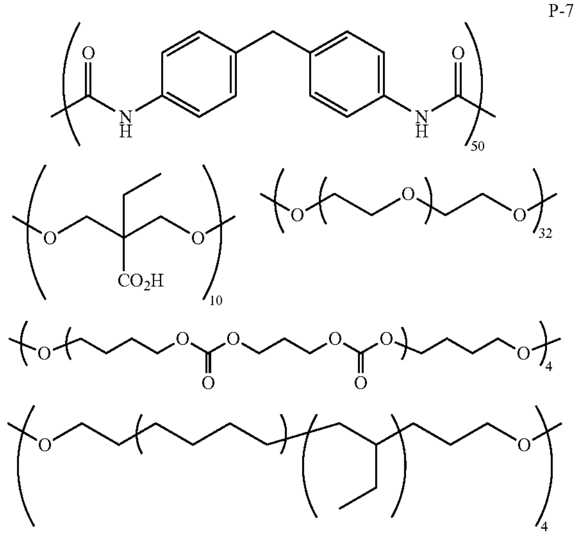
P-10
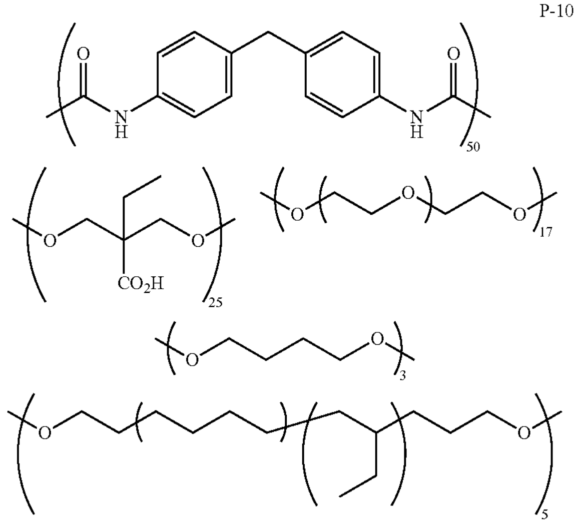
P-11
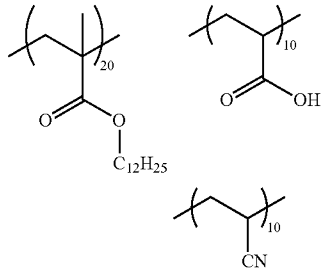
P-12
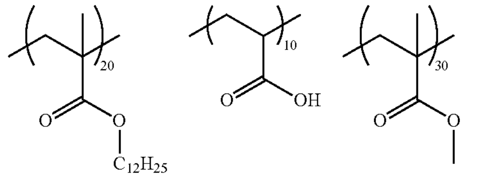

-continued

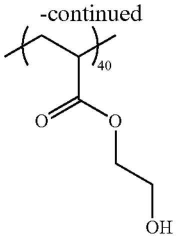

The details of the polymers P-1 to P-10 are shown in Table 1-1 below, and the details of the polymers P-1l and P-12 are shown in Table 1-2 below.

In Table 1-1, the constituent component 1 represents the constituent component represented by Formula (I-1). The constituent component 2 indicates a constituent component (corresponding to the constituent component represented by Formula (I-3A) described above) represented by Formula (I-3), in which $R^{P2}$ is an aliphatic hydrocarbon group having a carboxy group. The constituent component 3 indicates a constituent component (corresponding to the constituent component represented by Formula (I-3B) described above) represented by Formula (I-3), in which $R^{P2}$ is a polyalkylene oxide chain as a molecular chain. The constituent component 4 indicates a constituent component (corresponding to the constituent component represented by Formula (I-3C) described above) represented by Formula (I-3), in which $R^{P2}$ is the hydrocarbon polymer chain as a molecular chain. The constituent component 5 indicates the other constituent components. Specifically, the other constituent components are the constituent component (the binder-forming polymer P-7) represented by Formula (I-3), in which $R^{P2}$ is a polycarbonate chain as a molecular chain, and the constituent component (the binder-forming polymer P-10, corresponding to the constituent component represented by Formula (I-3A) described above) represented by Formula (I-3), in which $R^{P2}$ is an aliphatic hydrocarbon group which does not have a carboxy group.

Abbreviations in Table

MDI: 4,4'-methylene diphenyl diisocyanate (manufactured by Fujifilm Wako Pure Chemical Corporation)

HMDI: 4,4'-dicyclohexylmethane diisocyanate (manufactured by Tokyo Chemical Industry Co., Ltd.)

TDI: 2,4-tolylene diisocyanate (manufactured by Tokyo Chemical Industry Co., Ltd.)

DMBA: 2,2-bis(hydroxymethyl) butyric acid (manufactured by Tokyo Chemical Industry Co., Ltd.)

PEG 200: polyethylene glycol (manufactured by Fujifilm Wako Pure Chemical Corporation, number-average molecular weight: 200)

PEG 400: polyethylene glycol (manufactured by Fujifilm Wako Pure Chemical Corporation, number-average molecular weight: 400)

PPG 400: polypropylene glycol (manufactured by Sigma-Aldrich Co., LLC, number-average molecular weight: 400)

GI-1000: both-terminal hydroxyl group-modified hydroxylated polybutadiene (NISSO PB GI-1000 (trade name), manufactured by NIPPON SODA Co., Ltd., number-average molecular weight: 1,500)

EPOL: both-terminal hydroxyl group-modified hydroxylated polyisoprene (EPOL (trade name), manufactured by Idemitsu Kosan Co., Ltd., number-average molecular weight: 2,500)

G3450J: polycarbonate diol (DURANOL G3450J (trade name), manufactured by Asahi Kasei Corporation, number-average molecular weight: 800)

BD: 1,4-butanediol

TABLE 1-1

| Polymer solution No. | Constituent component 1 Compound | Content (% by mol) | Constituent component 2 Compound | Content (% by mol) | Constituent component 3 Compound | Content (% by mol) | Constituent component 4 Compound | Content (% by mol) | Constituent component 5 Compound | Content (% by mol) | Mass-average molecular weight | Glass transition temperature (° C.) |
|---|---|---|---|---|---|---|---|---|---|---|---|---|
| P-1 | MDI | 50 | DMBA | 10 | PEG200 | 32 | GI-1000 | 8 | — | — | 32,000 | −30/40 |
| P-2 | HMDI | 50 | DMBA | 15 | PEG200 | 27 | GI-1000 | 8 | — | — | 30,500 | −30/45 |
| P-3 | MDI | 40 | DMBA | 5 | PEG200 | 37 | GI-1000 | 8 | — | — | 29,000 | −30/40 |
| | TDI | 10 | | | | | | | | | | |
| P-4 | MDI | 40 | DMBA | 5 | PEG200 | 37 | EPOL | 8 | — | — | 35,500 | −30/30 |
| | TDI | 10 | | | | | | | | | | |
| P-5 | MDI | 50 | DMBA | 14 | PPG400 | 32 | GI-1000 | 4 | — | — | 27,600 | −30/40 |
| P-6 | MDI | 50 | DMBA | 14 | PEG400 | 32 | GI-1000 | 4 | — | — | 31,100 | −30/40 |
| P-7 | MDI | 50 | DMBA | 10 | PEG200 | 32 | GI-1000 | 4 | G3540J | 4 | 25,600 | −30/35 |
| P-8 | MDI | 50 | DMBA | 10 | PEG200 | 24 | GI-1000 | 16 | — | — | 33,000 | −30/35 |
| P-9 | MDI | 50 | DMBA | 10 | PEG200 | 16 | GI-1000 | 24 | — | — | 32,200 | −35/30 |
| P-10 | MDI | 50 | DMBA | 25 | PEG200 | 17 | GI-1000 | 5 | BD | 3 | 18,000 | −30/45 |

TABLE 1-2

| Polymer solution No. | Constituent component 1 Compound | Content (% by weight) | Constituent component 2 Compound | Content (% by weight) | Constituent component 3 Compound | Content (% by weight) | Constituent component 4 Compound | Content (% by weight) | Mass-average molecular weight | Glass transition temperature (° C.) |
|---|---|---|---|---|---|---|---|---|---|---|
| P-11 | LMA | 20 | AA | 10 | MMA | 40 | AN | 30 | 34,000 | 75 |
| P-12 | LMA | 20 | AA | 10 | MMA | 30 | HEA | 40 | 31,500 | 55 |

Abbreviations in Table

LMA: lauryl methacrylate (manufactured by Fujifilm Wako Pure Chemical Corporation)
AA: acrylic acid (manufactured by Fujifilm Wako Pure Chemical Corporation)
MMA: methyl methacrylate (manufactured by Fujifilm Wako Pure Chemical Corporation)
AN: acrylonitrile (manufactured by Fujifilm Wako Pure Chemical Corporation)
HEA: hydroxyethyl acrylate (manufactured by Fujifilm Wako Pure Chemical Corporation)
wt %: means % by mass.

Preparation Example 1: Preparation of Dispersion Liquid PA-1 of Non-Spherical Binder Particle 135 g of octane (boiling point: 135° C.) was added in a 500 mL three-necked flask, and the polymer solution P-1 (30 g) prepared above was dropwise added at room temperature over 1 hour while stirring at 500 rpm, whereby an emulsion of the polymer P-1 was obtained. This emulsion was heated at 85° C. for 120 minutes while flowing nitrogen gas. Further, the operation of adding 50 g of octane to the residue and heating at 85° C. for 60 minutes was repeated four times to remove THF (boiling point: 66° C.), whereby a 5% by mass octane dispersion liquid of the polymer P-1 was obtained.

Preparation Examples 2 to 12: Preparation of Dispersion Liquids PA-2 to PA-12 of Non-Spherical Binder Particle Each of dispersion liquids PA-2 to PA-12 was prepared in the same manner as in the preparation of the dispersion liquid PA-1, except that the polymer solution and the dispersion medium were respectively changed to the polymer solution and the dispersion medium shown in Table 2 below in the preparation of the dispersion liquid PA-1.

The boiling point of toluene used as the dispersion medium is 110° C.

Preparation Examples 13 and 14: Preparation of Dispersion Liquids PA-13 and PA-14 of Non-Spherical Binder Particle Each of dispersion liquids PA-13 and PA-14 was prepared in the same manner as in the preparation of the dispersion liquid PA-1, except that the polymer solution was changed to the polymer solution in Table 2 below and then a dispersion treatment was carried out for one minute with an ultrasound homogenizer.

Preparation Example 15: Preparation of Dispersion Liquid CP-1 of Non-Spherical Binder Particle A dispersion liquid CP-1 of the non-spherical binder particles was prepared with reference to Example A-5 of JP2015-167126A. That is, 5 g of propylene glycol monomethyl ether acetate (PGMEA) was added in a 200 mL three-necked flask and heated to 80° C. under a nitrogen gas stream. To this, 15.5 g of benzyl methacrylate, 1.0 g of methacrylic acid, 3.2 g of 2-hydroxyethyl methacrylate, and 45 g of a PGMEA solution containing V-601 (0.23 g, manufactured by FUJIFILM Wako Pure Chemical Corporation) were added dropwise over 4 hours. After completion of the dropwise addition, the mixture was further heated and stirred at 80° C. for 2 hours. The obtained polymer solution was subjected to crystallization in 1 L of hexane/ethyl acetate (80/20), and the obtained polymer was vacuum dried at 80° C. for 6 hours. The mass-average molecular weight of the obtained methacrylic polymer was 52,300, and the glass transition temperature was 23° C.

Subsequently, 180 zirconia beads having a diameter of 5 mm were put into a 45 mL container made of zirconia (manufactured by FRITSCH), 1.0 g of the obtained polymer and 15.0 g of toluene as a dispersion medium were put into the container, and then the container was set in a planetary ball mill P-7 (manufactured by FRITSCH), and mechanical dispersion was continued at 25° C. at a rotation speed of 300 rpm for 2 hours to obtain a dispersion liquid of non-spherical polymer particles, in which particles consisting of a methacrylic polymer were pulverized. These non-spherical polymer particles do not contain secondary particles.

Preparation Example 16: Preparation of Dispersion Liquid CP-2 of Spherical Binder Particle 400 parts by mass of water, 200 parts by mass of methyl methacrylate (manufactured by Wako Pure Chemical Industries, Ltd.), 50 parts by mass of styrene (manufactured by Wako Pure Chemical Industries, Ltd.), 5 parts by mass of divinyl benzene (manufactured by Wako Pure Chemical Industries, Ltd.), 10 parts by mass of sodium dodecylbenzene sulfonate (manufactured by Wako Pure Chemical Industries, Ltd.), and 10 parts by mass of azobisbutyronitrile (manufactured by Wako Pure Chemical Industries, Ltd. were added in a 5 L three-necked flask equipped with a reflux cooling pipe and a gas introduction cock, and after introducing nitrogen gas at a flow rate of 200 mL/min for 10 minutes, the temperature was raised to 80° C. To this, a liquid (a mixture of 400 parts by mass of nonylphenoxy polyethylene glycol acrylate (manufactured by Showa Denko Materials Co., Ltd.), 100 parts by mass of styrene (manufactured by Wako Pure Chemical Industries, Ltd.), 800 parts by mass of water, and 10 parts by mass of azobisbutyronitrile (Wako Pure Chemical Industries, Ltd.) prepared in a separate container was dropwise added, and stirring was continued at 80° C. for 5 hours. Then, 15,000 parts by mass of decalin (manufactured by Wako Pure Chemical Industries, Ltd.) was added thereto, the mixture was sufficiently stirred, and then water was removed by drying under reduced pressure to obtain a dispersion liquid CP-2 of spherical binder particles.

Preparation Example 17: Preparation of Binder Solution CP-3

As a polymer, hydrogenated styrene-butadiene rubber (HSBC, DYNARON 1321P (trade name), manufactured by JSR Corporation, styrene content: 10% by mass, mass-average molecular weight: 229,000) was dissolved in toluene to prepare a polymer solution CP-3.

<Confirmation of Binder Shape, Aspect Ratio, Average Particle Size, and Measurement of Secondary Particle Ratio>

A TEM image of each of the obtained binder particles was taken by the above method and the shape thereof was checked. As a result, the binders in the dispersion liquids PA-1 to PA-12 contained non-spherical secondary particles consisting of primary particles of urethane polymer, the binders in the dispersion liquids PA-13 and PA-14 contained non-spherical secondary particles consisting of primary particles of (meth)acrylic polymer, the binder in the dispersion liquid CP-1 was non-spherical primary particles, and the binder in the dispersion liquid CP-2 was spherical. In addition, the aspect ratio of the secondary particles, the average secondary particle size, and the ratio of the secondary particles were measured by the above-described method using the above TEM image. In addition, the average primary particle size of the primary particles forming the binder particles was measured by the above method. Further, the particle size ratio [average secondary particle size/average primary particle size] was calculated from the obtained average secondary particle size and average primary particle size. The results are shown in Table 2.

Regarding the dispersion liquid CP-2 of spherical binder particles, although the binder particles do not contain secondary particles, the aspect ratio of the binder particles was described in the "Aspect ratio of secondary particle" column of Table 2.

<Method of Measuring Breaking Elongation>

The breaking elongation of each of the synthesized binder-forming polymers and the HSBR was measured by the measurement method using the above-described film. The results are shown in Table 2.

The aspect ratio, the average particle size, the ratio of secondary particles, and the breaking elongation, which had been measured or calculated for the non-spherical binder particles taken out by the above method from the solid electrolyte composition and the sheet for an all-solid state secondary battery described later, were respectively almost the same as the values shown in Table 2.

TABLE 2

| Dispersion liquid No. | Polymer solution No. | Dispersion medium | Average primary particle size (nm) | Average secondary particle size (nm) | Particle size ratio | Aspect ratio | Ratio of secondary particle (%) | Breaking elongation (%) |
|---|---|---|---|---|---|---|---|---|
| PA-1 | P-1 | Octane | 22 | 150 | 6.8 | 15 | 94 | 150 |
| PA-2 | P-1 | Toluene | 70 | 220 | 3.1 | 4 | 80 | 220 |
| PA-3 | P-1 | Octane Toluene | 53 | 190 | 3.6 | 7 | 90 | 200 |
| PA-4 | P-2 | Octane | 40 | 300 | 7.5 | 20 | 84 | 160 |
| PA-5 | P-3 | Octane | 20 | 450 | 22.5 | 30 | 96 | 50 |
| PA-6 | P-4 | Octane | 80 | 110 | 1.4 | 2 | 94 | 60 |
| PA-7 | P-5 | Octane | 50 | 320 | 6.4 | 9 | 74 | 110 |
| PA-8 | P-6 | Octane | 42 | 260 | 6.2 | 30 | 88 | 40 |
| PA-9 | P-7 | Octane | 20 | 230 | 11.5 | 50 | 92 | 160 |
| PA-10 | P-8 | Octane | 20 | 40 | 2.0 | 4 | 60 | 70 |
| PA-11 | P-9 | Octane | 20 | 30 | 1.5 | 2 | 50 | 40 |
| PA-12 | P-10 | Octane | 16 | 180 | 11.3 | 60 | 96 | 8 |
| PA-13 | P-11 | Octane | 40 | 350 | 8.8 | 3 | 30 | 10 |
| PA-14 | P-12 | Octane | 35 | 550 | 15.7 | 3 | 35 | 150 |
| CP-1 | CP-1 | Toluene | 850 | — | — | 2 | 0 | 260 |
| CP-2 | CP-2 | Octane | 180 | — | — | 1 | 0 | 50 |
| CP-3 | HSBR | Toluene | — | — | — | — | — | 300 |

<Note for Table>

Particle size ratio: the ratio of the average secondary particle size of secondary particles to the average primary particle size of primary particles Aspect ratio: the ratio of the average length to the average diameter of secondary particles Ratio of secondary particles: the ratio of secondary particles to 100% of the total of secondary particles and primary particles Dispersion liquid No. PA-3 is a mixed dispersion medium of octane and toluene having a mass ratio of 1:1.

Synthesis Example 13: Synthesis of Sulfide-Based Inorganic Solid Electrolyte Li—P—S-Based Glass As a sulfide-based inorganic solid electrolyte, Li—P—S-based glass was synthesized with reference to a non-patent document of T. Ohtomo, A. Hayashi, M. Tatsumisago, Y Tsuchida, S. Hama, K. Kawamoto, Journal of Power Sources, 233, (2013), pp. 231 to 235 and A. Hayashi, S. Hama, H. Morimoto, M. Tatsumisago, T Minami, Chem. Lett., (2001), pp. 872 and 873.

Specifically, in a globe box under an argon atmosphere (dew point: −70° C.), lithium sulfide ($Li_2S$, manufactured by Sigma-Aldrich Co., LLC, purity: >99.98%) (2.42 g) and diphosphorus pentasulfide ($P_2S_5$, manufactured by Sigma-Aldrich Co., LLC, purity: >99%) (3.90 g) each were weighed, injected into an agate mortar, and mixed using an agate muddler for five minutes. The mixing ratio between $Li_2S$ and $P_2S_5$($Li_2S$:$P_2S_5$) was set to 75:25 in terms of molar ratio.

66 zirconia beads having a diameter of 5 mm were put into a 45 mL zirconia container (manufactured by FRITSCH), the full amount of the mixture of the lithium sulfide and the diphosphorus pentasulfide was put thereinto, and the container was sealed in an argon atmosphere. The container was set in a planetary ball mill P-7 (trade name, manufactured by FRITSCH), mechanical milling was carried out at a temperature of 25° C. and a rotation speed of 510 rpm for 20 hours, and a yellow powder (6.20 g) of a sulfide-based inorganic solid electrolyte (Li—P—S-based glass, LPS) was obtained. The ion conductivity was 0.28 mS/cm. The average particle size of the Li—P—S-based glass measured using the above-described measurement method was 15 μm.

Example 1

Using the obtained non-spherical binder particles, each of the solid electrolyte composition, the sheet for an all-solid state secondary battery, and the all-solid state secondary battery were manufactured, and the following characteristics were evaluated for the electrode sheet for an all-solid state secondary battery and the all-solid state secondary battery. The results are shown in Table 5.

<Preparation of Solid Electrolyte Composition>

180 zirconia beads having a diameter of 5 mm were put into a 45 mL zirconia container (manufactured by FRITSCH), and then 4.85 g of LPS synthesized in Synthesis Example 13, 0.15 g (in terms of the solid content) of the dispersion liquid shown in Table 3, and 8.0 g of heptane as a dispersion medium were put into the container. Next, the container was set in a planetary ball mill P-7 (trade name, manufactured by FRITSCH) and the components were continuously mixed for 60 minutes at a temperature of 25° C. and a rotation speed of 250 rpm, whereby solid electrolyte compositions S-1 to S-3 were prepared.

<Production of Sheet for all-Solid State Secondary Battery (Solid Electrolyte Sheet)>

Each of the solid electrolyte compositions obtained as described above was applied onto an aluminum foil (electrode active material mass per unit area: 7 mg/cm$^2$), as the support, having a thickness of 20 μm using a baker-type applicator (trade name: SA-201, manufactured by Tester Sangyo Co., Ltd.), and heating was carried out at 80° C. for 1 hour. In this manner, each of solid electrolyte sheets SS-1 to SS-3 having a laminated structure of the aluminum foil and the solid electrolyte layer was prepared.

TABLE 3

| Solid electrolyte composition or solid electrolyte | In organic solid electrolyte | | Dispersion liquid | | Dispersion | |
|---|---|---|---|---|---|---|
| sheet | Kind | Content* | Kind | Content* | medium | Note |
| S-1 | LPS | 97 | PA-1 | 3 | Pentane | Example |
| S-2 | LPS | 97 | PA-9 | 3 | Pentane | Example |
| S-3 | LPS | 97 | CP-1 | 3 | Pentane | Comparative Example |
| SS-1 | LPS | 97 | PA-1 | 3 | — | Example |
| SS-2 | LPS | 97 | PA-9 | 3 | — | Example |
| SS-3 | LPS | 97 | CP-1 | 3 | — | Comparative Example |

In Table 3, "Content*" indicates the content (% by mass) in the solid content of the solid electrolyte composition or in the solid electrolyte layer.

<Production of Electrode Sheet for all-Solid State Secondary Battery (Negative Electrode Sheet for all-Solid State Secondary Battery)>

(Preparation of Composition a-1 for Negative Electrode)

180 zirconia beads having a diameter of 5 mm were put into a 45 mL zirconia container (manufactured by FRITSCH), and then 4.6 g of LPS synthesized in Synthesis Example 13, and 12.3 g (total amount) of heptane as a dispersion medium were put into the container. Then, into this container, 4.6 g of Si (manufactured by Sigma-Aldrich Co., LLC) as a negative electrode active material, 0.7 g of acetylene black (AB) as a conductive auxiliary agent, and 0.1 g (in terms of the solid content) of the dispersion liquid PA-1 of the non-spherical binder particles were put, the container was set in a planetary ball mill P-7, and mixing was continued for 30 minutes at a temperature of 25° C. and a rotation speed of 200 rpm to prepare a composition a-1 for a negative electrode.

(Preparation of Compositions a-2 to a-23 for Negative Electrode)

Each of compositions a-2 to a-23 for a negative electrode was prepared in the same manner as in the preparation of the composition a-1 for a negative electrode, except that the kinds and the amounts used of the inorganic solid electrolyte, the negative electrode active material, the dispersion liquid of the binder particles, the conductive auxiliary agent were changed as shown in Table 4 in the preparation of the composition a-1 for a negative electrode.

In the preparation of the compositions a-17 and a-18 for a negative electrode, 2.3 g of graphite and 2.3 g of Si were used as the negative electrode active material.

The compositions a-19 to a-21 for a negative electrode are compositions for a negative electrode for carrying out the comparison.

(Production of Negative Electrode Sheets A-1 to A-23 for all-Solid State Secondary Battery)

The composition for a negative electrode prepared above was applied onto a stainless steel (SUS) foil having a thickness of 15 μm, as a negative electrode current collector, using a baker-type applicator (trade name: SA-201, manufactured by Tester Sangyo Co., Ltd.) so that the electrode active material mass per unit area was as shown in Table 4, heating was carried out at 80° C. for 1 hour, and then heating was further carried out at 110° C. for 1 hour to dry the composition for a negative electrode. Next, using a heat press machine, the dried composition (coated and dried layer) for a negative electrode was pressurized (20 MPa, 1 minute) while being heated at 120° C., whereby negative electrode sheets A-1 to A-23 for an all-solid state secondary battery, which had a laminated structure of the negative electrode active material layer and the SUS foil, were prepared.

The negative electrode sheets A-19 to A-21 for an all-solid state secondary battery are negative electrode sheets for carrying out the comparison.

<Production of Electrode Sheet for all-Solid State Secondary Battery (Positive Electrode Sheet for all-Solid State Secondary Battery)>

(Preparation of Composition c-1 for Positive Electrode)

180 zirconia beads having a diameter of 5 mm were put into a 45 mL zirconia container (manufactured by FRITSCH), and then 1.7 g of the LPS-based glass synthesized in Synthesis Example 13, and 12.3 g (total amount) of heptane as a dispersion medium were put into the container. The container was set in a planetary ball mill P-7 (trade name, manufactured by FRITSCH) and the components were stirred for 30 minutes at 25° C. and a rotation speed of 200 rpm. Then, into this container, 8.0 g of LiNi$_{1/3}$Co$_{1/3}$Mn$_{1/3}$O$_2$(NMC, manufactured by Sigma-Aldrich Co., LLC) as a positive electrode active material, 0.2 g of acetylene black (AB) as a conductive auxiliary agent, and 0.1 g (in terms of the solid content) of the dispersion liquid PA-1 of the non-spherical binder particles were put, the container was set in a planetary ball mill P-7, and mixing was continued for 30 minutes at a temperature of 25° C. and a rotation speed of 200 rpm to prepare a composition c-1 for a positive electrode.

(Preparation of Compositions c-2 to c-6 for Positive Electrode)

Each of compositions c-2 to c-6 for a positive electrode was prepared in the same manner as in the preparation of the composition c-1 for a positive electrode, except that the kinds of the dispersion liquid of the positive electrode active material and the binder particles were changed as shown in Table 4 in the preparation of the composition c-1 for a positive electrode.

The compositions c-4 to c-6 for a positive electrode are compositions for a positive electrode for carrying out the comparison.

(Preparation of Positive Electrode Sheets C-1 to C-6 for all-Solid State Secondary Battery)

The composition for a positive electrode, prepared above was, applied onto an aluminum foil (a positive electrode current collector) having a thickness of 20 μm, as a current collector, using a baker-type applicator (trade name: SA-201, manufactured by Tester Sangyo Co., Ltd.) so that the electrode active material mass per unit area was as shown in Table 4, heating was carried out at 80° C. for 1 hour, and then heating was further carried out at 110° C. for 1 hour to dry the composition for a positive electrode. Next, using a heat press machine, the dried composition (coated and dried layer) for a positive electrode was pressurized (20 MPa, 1 minute) while being heated at 120° C., whereby positive electrode sheets C-1 to C-6 for an all-solid state secondary battery, which had a laminated structure of the positive electrode active material layer and the aluminum foil, were prepared.

The positive electrode sheets C-4 to C-6 for an all-solid state secondary battery are positive electrode sheets for carrying out the comparison.

TABLE 4

| Electrode sheet | Active material | | Solid electrolyte | | Dispersion liquid of binder particle | | Conductive auxiliary agent | | Electrode active material mass per |
|---|---|---|---|---|---|---|---|---|---|
| No | Kind | Content* | Kind | Content* | Kind | Content* | Kind | Content* | unit area |
| A-1 | Si | 46 | LPS | 46 | PA-1 | 1 | AB | 7 | 3.3 |
| A-2 | Sn | 46 | LPS | 46 | PA-1 | 1 | AB | 7 | 10 |
| A-3 | SiO | 46 | LPS | 46 | PA-1 | 1 | AB | 7 | 4.2 |
| A-4 | C | 46 | LPS | 46 | PA-1 | 1 | AB | 7 | 21 |
| A-5 | Si | 46 | LPS | 46 | PA-2 | 1 | AB | 7 | 3.3 |
| A-6 | Si | 46 | LPS | 46 | PA-3 | 1 | AB | 7 | 10 |
| A-7 | Si | 46 | LPS | 46 | PA-4 | 1 | AB | 7 | 10 |
| A-8 | Si | 46 | LPS | 46 | PA-5 | 1 | AB | 7 | 3.3 |
| A-9 | Si | 46 | LPS | 46 | PA-6 | 1 | AB | 7 | 3.3 |
| A-10 | Si | 46 | LPS | 46 | PA-7 | 1 | AB | 7 | 3.3 |
| A-11 | Si | 46 | LPS | 46 | PA-8 | 1 | AB | 7 | 3.3 |
| A-12 | Si | 46 | LPS | 46 | PA-9 | 1 | AB | 7 | 3.3 |
| A-13 | Si | 46 | LPS | 46 | PA-10 | 1 | AB | 7 | 3.3 |
| A-14 | Si | 46 | LPS | 46 | PA-11 | 1 | AB | 7 | 3.3 |
| A-15 | Si | 46 | LPS | 46 | PA-12 | 1 | AB | 7 | 3.3 |
| A-16 | Si | 50 | LPS | 49 | PA-3 | 1 | — | — | 3.3 |
| A-17 | C/Si | 23/23 | LPS | 46 | PA-9 | 1 | AB | 7 | 12.2 |
| A-18 | C/Si | 23/23 | LLZ | 46 | PA-9 | 1 | AB | 7 | 12.2 |
| A-19 | Si | 46 | LPS | 46 | CP-1 | 1 | AB | 7 | 3.3 |
| A-20 | Si | 46 | LPS | 46 | CP-2 | 1 | AB | 7 | 3.3 |
| A-21 | Si | 46 | LPS | 46 | CP-3 | 1 | AB | 7 | 3.3 |
| A-22 | Si | 46 | LPS | 46 | PA-13 | 1 | AB | 7 | 3.3 |
| A-23 | Si | 46 | LPS | 46 | PA-14 | 1 | AB | 7 | 3.3 |
| C-1 | NMC | 80 | LPS | 17 | PA-1 | 1 | AB | 2 | 20 |
| C-2 | NMC | 80 | LPS | 17 | PA-4 | 1 | AB | 2 | 20 |
| C-3 | LCO | 80 | LPS | 17 | PA-4 | 1 | AB | 2 | 20 |
| C-4 | NMC | 80 | LPS | 17 | CP-1 | 1 | AB | 2 | 20 |
| C-5 | LCO | 80 | LPS | 17 | CP-2 | 1 | AB | 2 | 20 |
| C-6 | LCO | 80 | LPS | 17 | CP-3 | 1 | AB | 2 | 20 |

In Table 4, "Content*" indicates the content (% by mass) in the solid content of the composition or in the active material layer.

<Abbreviations in Table>
Si: silicon
Sni: tin
SiO: silicon monoxide
C: graphite
NMC: LiNi$_{1/3}$Co$_{1/3}$Mn$_{1/3}$O$_2$
LCO: LiCoO$_2$
LPS: the sulfide-based inorganic solid electrolyte (the Li—P—S-based glass) synthesized in Synthesis Example 13
LLZ: Li$_7$La$_3$Zr$_2$O$_{12}$
AB: acetylene black <Manufacturing of all-Solid State Secondary Battery>
(Preparation of Electrode Sheet)

All-solid state secondary batteries were manufactured using the electrode sheets subjected to the following bending test.

The bending test of each of the prepared negative electrode sheets for an all-solid state secondary battery and the positive electrode sheets for an all-solid state secondary battery were carried out in the same manner as in <Evaluation 1: Film strength test of negative electrode sheet for an all-solid state secondary battery> described later, except that the electrode sheets were repeatedly bent three times using a mandrel having a diameter of 10 mm in <Evaluation 1: Film strength test of negative electrode sheet for an all-solid state secondary battery>.

(Manufacturing of all-Solid State Secondary Batteries Nos. 101 to 103, 106 to 130, c01, and c03)

The solid electrolyte composition shown in Table 5 prepared above was applied by an applicator onto the negative electrode active material layer of each of the negative electrode sheets for an all-solid state secondary battery, where the negative electrode sheets had been subjected to the bending test, so that the electrode active material mass per unit area was as shown in Table 5, heating was carried out at 80° C. for 1 hour, and then drying was carried out at 110° C. for 6 hours. The sheet having a coated and dried layer formed on the negative electrode active material layer was pressurized (30 MPa, 1 minute) while being heated (120° C.) using a heat press machine, to prepare a sheet having a structure in which the solid electrolyte layer, the negative electrode active material layer, and the stainless steel foil were laminated in order, and the sheet was cut out into a disk shape having a diameter of 15 mm (may be referred to as a disk-shaped negative electrode sheet).

The positive electrode sheet for an all-solid state secondary battery shown in Table 5, which had been subjected to the bending test was cut out into a disk shape having a diameter of 13 mm. After arranging (laminating) the disk-shaped negative electrode sheet and the disk-shaped positive electrode sheet so that the positive electrode active material layer of the disk-shaped positive electrode sheet and the solid electrolyte layer of the disk-shaped negative electrode sheet faced each other, pressurization (40 MPa, 1 minute) was carried out using a heat press machine while heating (120° C.). In this manner, the configuration illustrated in FIG. 1, that is, a laminate for an all-solid state secondary battery, which has a structure in which the aluminum foil, the positive electrode active material layer, the solid electrolyte layer, the negative electrode active material layer (the layer thickness of each of the layers is shown in Table 5), and the SUS foil were laminated in order, was prepared.

Figure 2:
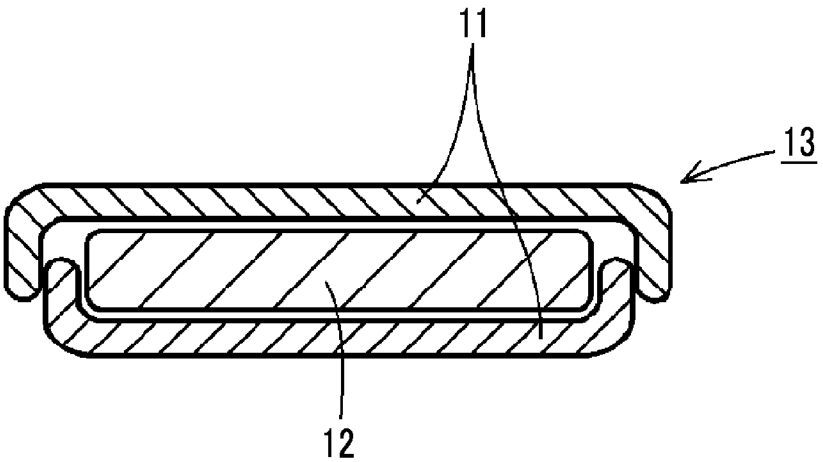
FIG. 2 is a vertical cross-sectional view schematically illustrating an all-solid state secondary battery (coin battery) prepared in Examples.

As shown in FIG. 2, a laminate 12 for an all-solid state secondary battery prepared in this manner was placed in a 2032-type coin case 11 made of stainless steel, in which a spacer and a washer (not shown in FIG. 2) had been incorporated, and the 2032-type coin case 11 was firmly adhered to prepare all-solid state secondary batteries 13 of Nos. 101 to 103, 106 to 130, c01, and c03.

(Manufacturing of all-Solid State Secondary Batteries Nos. 104, 105, and c02)

Each of-solid state secondary batteries Nos. 104, 105, and c02 was prepared in the same manner as in the production of the all-solid state secondary battery No. 101, except that a disk-shaped negative electrode sheet prepared by transferring the solid electrolyte layer to the negative electrode active material layer as described below was used in the production of the all-solid state secondary battery No. 101.

-Preparation of Disk-Shaped Negative Electrode Sheet by Transfer Method-

The solid electrolyte sheets shown in Table. 5 and prepared as described above (the electrode active material mass per unit area at the time of production is shown in Table 5) were arranged to face each other on the negative electrode active material layer of each of the negative electrode sheets for an all-solid state secondary battery, where the negative electrode sheets had been subjected to the bending test, the obtained sheet laminate was pressurized (30 MPa, 1 minute) in the thickness direction using a press machine, and the aluminum foil that was the support of the solid electrolyte sheet was peeled off. In this manner, a sheet having a structure in which the solid electrolyte layer, the negative electrode active material layer, and the stainless foil were laminated in order was prepared. This sheet was cut out into a disk shape having a diameter of 15 mm to prepare a disk-shaped negative electrode sheet.

<Evaluation 1: Film Strength Test of Negative Electrode Sheet for all-Solid State Secondary Battery>

The film strength of the negative electrode active material layer in each of the negative electrode sheets A-1 to A-23 for an all-solid state secondary battery was evaluated by a bending resistance test (according to JIS K5600-5-1) using a mandrel tester.

Specifically, a test piece cut out from the negative electrode sheet for an all-solid state secondary battery into a strip shape having a width of 50 mm and a length of 100 mm was used and set so that the negative electrode active material layer was on the side opposite to the mandrel (the SUS foil is on the mandrel side) and the width direction of the test piece was parallel to the axis of the mandrel, the test piece was bent (once) by 1800 along the outer peripheral surface of the mandrel, and then the presence or absence of cracks or splits on the surface of the negative electrode active material layer was visually observed. First, this bending test was carried out using a mandrel having a diameter of 32 mm, and in a case where no cracking or splitting had occurred, the diameter (mm) of the mandrel was gradually reduced to 25, 20, 16, 12, 10, 8, 6, 5, 4, 3 and 2, and the diameter of the mandrel at the time when cracking or splitting first occurred was recorded.

The evaluation was made based on the following evaluation criteria by determining which criteria included the diameter (the defect occurrence diameter) of the mandrel at which cracking or splitting peeling first occurred. This test indicates that the smaller the defect occurrence diameter is, the firmly the solid particles are bound and the better the film strength is in good response to the bending of the negative electrode active material, and in this test, the evaluation criteria C or higher is the pass level.

-Evaluation Criteria-

A: 5 mm or less
B: 6 mm or 8 mm
C: 10 mm
D: 12 mm or 16 mm
E: 20 mm or 25 mm
F: 32 mm The film strength of each of the solid electrolyte sheets SS-1 to SS-3 and the positive electrode sheets C-1 to C-3 for an all-solid state secondary battery was evaluated in the same manner as in <Evaluation 1: Film strength test of negative electrode sheet for all-solid state secondary battery> described above. The results of the solid electrolyte sheet and the positive electrode sheet for an all-solid state secondary battery were the same as the result of the negative electrode sheet for an all-solid state secondary battery, in which the same dispersion liquid of binder particles was used.

<Evaluation 2: Battery Performance Test (Discharge Capacity) of all-Solid State Secondary Battery>

The discharge capacity of each of the all-solid state secondary batteries manufactured as described above was measured using a charging and discharging evaluation device "TOSCAT-3000" (trade name, manufactured by Toyo System Corporation). Specifically, the all-solid state secondary battery was charged with a current value of 0.2 mA until the battery voltage reached 4.2 V, and then discharged at a current value of 0.2 mA until the battery voltage reached 3.0 V. One charging operation and one discharging operation were set as one cycle of charging and discharging, and three cycles of charging and discharging were repeated. The discharge capacity at the third cycle was determined. This discharge capacity was converted in terms of the surface area of 100 $cm^2$ of the positive electrode active material layer and used as the discharge capacity of the all-solid state secondary battery (simply denoted as "capacity" in Table 5). The evaluation was made based on the following evaluation criteria by determining which criteria included the value of this discharge capacity. In this test, evaluation criteria C or higher is the pass level.

-Evaluation Criteria-

A: 200 mAh or more

B: 160 mAh or more and less than 200 mAh

C: 100 mAh or more and less than 160 mAh

D: 60 mAh or more, less than 100 mAh

E: less than 60 mAh

<Evaluation 3: Battery Performance Test (Discharge Capacity Density) of all-Solid State Secondary Battery>

For each of the all-solid state secondary batteries, the discharge capacity (the converted value in terms of the surface area of 100 $cm^2$) measured in Evaluation 2 above was divided by the total volume of the positive electrode active material layer, the solid electrolyte layer, and the negative electrode active material layer (the volume of both current collectors excluded) to calculate the discharge capacity density (simply denoted as "Capacity density" in Table 5). In this test, evaluation criteria C or higher is the pass level.

-Evaluation Criteria-

A: 180 Ah/L or more

B: 130 Ah/L or more and less than 180 Ah/L

C: 90 Ah/L or more and less than 130 Ah/L

D: 60 Ah/L or more and less than 90 Ah/L

E: less than 60 Ah/L

<Evaluation 4: Resistance Measurement of all-Solid State Secondary Battery>

The resistance of each of the all-solid state secondary batteries manufactured as described above was measured using a charging and discharging evaluation device "TOSCAT-3000" (trade name, manufactured by Toyo System Corporation). Specifically, the all-solid state secondary battery was charged with a current value of 0.2 mA until the battery voltage reached 4.2 V, and then discharged at a current value of 2.0 mA until the battery voltage reached 3.0 V. The battery voltage 10 seconds after the start of discharging was read and evaluated by determining which criteria included the voltage based on the following evaluation criteria. This test indicates that the higher the battery voltage is, the smaller the resistance of the all-solid state secondary battery is, and the evaluation criteria C or higher is the pass level.

-Evaluation Criteria-

A: 4.1 V or higher

B: 4.0 V or more and less than 4.1 V

C: 3.8 V or more and less than 4.0 V

D: 3.6 V or more and less than 3.8 V

E: less than 3.6V

<Evaluation 5: Evaluation of Battery Life of all-Solid State Secondary Battery>

10 specimens for each sample No. of the all-solid state secondary batteries were manufactured, and the discharge capacity of 10 specimens of the all-solid state secondary battery was measured with a charging and discharging evaluation device "TOSCAT-3000" (trade name, manufactured by Toyo System Corporation) to evaluate the battery life (simply denoted as "Life" in Table 5) was evaluated. Specifically, each of the all-solid state secondary batteries was charged with a current value of 0.2 mA until the battery voltage reached 4.2 V, and then discharged at a current value of 2.0 mA until the battery voltage reached 3.0 V. One charging operation and one discharging operation were set as one cycle of charging and discharging, and 100 cycles of charging and discharging were repeated under the same conditions. The discharge capacity at the fifth charging and discharging cycle and the discharge capacity at the hundredth charging and discharging cycle were determined as follows. The average discharge capacity of each of the 6 specimens of the all-solid state secondary battery, excluding the 2 specimens having the highest and lowest performances among the 10 specimens of the battery, was obtained at the fifth cycle and the hundredth cycle, the ratio of the average discharge capacity at the hundredth cycle to the average discharge capacity at the fifth cycle ([average discharge capacity at hundredth cycle/average discharge capacity at the fifth cycle]×100 (%)) was calculated. The evaluation was made based on the following evaluation criteria by determining which criteria included this proportion. In this test, the higher the ratio is, the longer the battery life is, which indicates that the initial battery performance (the discharge capacity and the discharge capacity density) can be maintained even in a case where charging and discharging is repeated a plurality of times (even in long-term use). In this test, evaluation criteria C or higher is the pass level.

-Evaluation Criteria-

A: 85% or more

B: 75% or more and less than 85%

C: 65% or more and less than 75%

D: 55% or more and less than 65%

E: less than 55%

TABLE 5

| All- | Positive electrode active material layer | | | Solid electrolyte layer | | | Negative electrode active material layer | | | Performance | | | | |
|---|---|---|---|---|---|---|---|---|---|---|---|---|---|---|
| solid secondary battery No. | Kind | Electrode active material mass per unit area | Film thickness | Kind | Electrode active material mass per unit area | Film thickness | Kind | Electrode active material mass per unit area | Film thickness | Capacity | Capacity density | Resistance | Film strength of negative electrode sheet | Life |
| 101 | C-1 | 20 | 57 | S-1 | 7 | 30 | A-1 | 3.3 | 20 | A | A | B | A | A |
| 102 | C-2 | 20 | 57 | S-1 | 7 | 30 | A-1 | 3.3 | 20 | A | A | A | A | A |
| 103 | C-3 | 20 | 57 | S-1 | 7 | 30 | A-1 | 3.3 | 20 | A | A | A | A | A |
| 104 | C-2 | 20 | 57 | SS-1 | 7 | 30 | A-1 | 3.3 | 20 | A | A | A | A | A |
| 105 | C-2 | 20 | 57 | SS-2 | 7 | 30 | A-1 | 3.3 | 20 | A | A | A | A | A |
| 106 | C-2 | 20 | 57 | S-1 | 7 | 30 | A-2 | 10 | 30 | B | B | B | B | B |

TABLE 5-continued

| All- | Positive electrode active material layer | | | Solid electrolyte layer | | | Negative electrode active material layer | | | Performance | | | | |
|---|---|---|---|---|---|---|---|---|---|---|---|---|---|---|
| solid secondary battery No. | Kind | Electrode active material mass per unit area | Film thickness | Kind | Electrode active material mass per unit area | Film thickness | Kind | Electrode active material mass per unit area | Film thickness | Capacity | Capacity density | Resistance | Film strength of negative electrode sheet | Life |
| 107 | C-2 | 20 | 57 | S-1 | 7 | 30 | A-3 | 4.2 | 22 | A | A | B | A | B |
| 108 | C-2 | 20 | 57 | S-1 | 7 | 30 | A-4 | 21 | 60 | B | C | B | B | B |
| 109 | C-2 | 20 | 57 | S-1 | 7 | 30 | A-5 | 3.3 | 20 | B | B | B | B | B |
| 110 | C-2 | 20 | 57 | S-1 | 7 | 30 | A-6 | 10 | 30 | A | B | A | A | B |
| 111 | C-2 | 20 | 57 | S-1 | 7 | 30 | A-7 | 10 | 30 | A | A | A | A | A |
| 112 | C-2 | 20 | 57 | S-1 | 7 | 30 | A-8 | 3.3 | 20 | A | A | A | A | A |
| 113 | C-2 | 20 | 57 | S-1 | 7 | 30 | A-9 | 3.3 | 20 | B | B | B | B | B |
| 114 | C-2 | 20 | 57 | S-1 | 7 | 30 | A-10 | 3.3 | 20 | A | A | A | A | A |
| 115 | C-2 | 20 | 57 | S-1 | 7 | 30 | A-11 | 3.3 | 20 | A | A | A | A | A |
| 116 | C-2 | 20 | 57 | S-1 | 7 | 30 | A-12 | 3.3 | 20 | A | A | A | A | A |
| 117 | C-2 | 20 | 57 | S-1 | 7 | 30 | A-13 | 3.3 | 20 | A | A | B | A | B |
| 118 | C-2 | 20 | 57 | S-1 | 7 | 30 | A-14 | 3.3 | 20 | B | B | B | B | B |
| 119 | C-2 | 20 | 57 | S-1 | 7 | 30 | A-15 | 3.3 | 20 | B | B | B | B | B |
| 120 | C-2 | 20 | 57 | S-1 | 7 | 30 | A-16 | 3.3 | 20 | B | B | B | B | B |
| 121 | C-2 | 20 | 57 | S-1 | 7 | 30 | A-17 | 12.2 | 40 | B | B | A | B | B |
| 122 | C-2 | 20 | 57 | S-1 | 7 | 30 | A-18 | 12.2 | 40 | C | C | C | C | C |
| 123 | C-2 | 20 | 57 | S-1 | 7 | 30 | A-19 | 3.3 | 22 | C | C | C | D | C |
| 124 | C-2 | 20 | 57 | S-1 | 7 | 30 | A-20 | 3.3 | 20 | C | C | C | D | C |
| 125 | C-4 | 20 | 60 | S-1 | 7 | 30 | A-12 | 3.3 | 20 | A | A | B | A | B |
| 126 | C-4 | 20 | 60 | S-3 | 7 | 30 | A-12 | 3.3 | 20 | B | B | B | A | B |
| 127 | C-2 | 20 | 57 | S-1 | 7 | 30 | A-19 | 3.3 | 22 | C | C | C | D | C |
| 128 | C-2 | 20 | 57 | S-3 | 7 | 30 | A-19 | 3.3 | 22 | C | C | C | D | C |
| 129 | C-2 | 20 | 57 | S-1 | 7 | 30 | A-22 | 3.3 | 20 | B | B | B | B | C |
| 130 | C-2 | 20 | 57 | S-1 | 7 | 30 | A-23 | 3.3 | 20 | B | B | B | B | C |
| c01 | C-4 | 20 | 60 | S-3 | 7 | 30 | A-19 | 3.3 | 22 | C | C | D | D | D |
| c02 | C-5 | 20 | 60 | SS-3 | 7 | 30 | A-20 | 3.3 | 22 | C | C | D | D | D |
| c03 | C-6 | 20 | 60 | S-3 | 7 | 30 | A-21 | 3.3 | 24 | E | E | E | D | E |

In Table 5, the units of the electrode active material mass per unit area and the film thickness are respectively mg/cm$^2$ and μm.

The followings can be seen from the results of Table 5.

All the negative electrode sheets A-19 to A-21 for an all-solid state secondary battery formed of solid electrolyte compositions (compositions for an electrode) containing no non-spherical binder particles specified in the present invention do not exhibit sufficient film strength. Moreover, the all-solid state secondary battery c01 using the binder particles consisting of the primary particles as a binder and the all-solid state secondary battery c02 using the spherical binder particles as a binder does not have sufficient resistance and are inferior in battery life. Further, the all-solid state secondary battery c03 using the dissolution type binder has insufficient discharge capacity, insufficient discharge capacity density, and insufficient and resistance, and is inferior in battery life.

On the other hand, all the negative electrode sheets A-1 to A-18, A-22, and A-23 for an all-solid state secondary battery formed of solid electrolyte compositions (compositions for an electrode) containing the non-spherical binder particles specified in the present invention exhibit sufficient film strength. Further, all the all-solid state secondary batteries 101 to 130 in which at least one layer of the positive electrode active material layer, the solid electrolyte layer, or negative electrode active material layer is formed of the solid electrolyte composition or the composition for an electrode, which contains the non-spherical binder particles specified in the present invention, have an excellent discharge capacity, an exhibit discharge capacity density, and an excellent resistance, and exhibit a long battery life. As described above, the solid electrolyte composition containing the non-spherical binder particles specified in the present invention suppresses the increase in the interfacial resistance between the solid particles in the all-solid state secondary battery and firmly binds the solid particles, exhibits a low resistance, and contributes to maintaining an excellent discharge capacity and an excellent discharge capacity density even after repeated charging and discharging. In particular, in the all-solid state secondary battery in which the positive electrode active material layer, the solid electrolyte layer, and the negative electrode active material layer are formed of the solid electrolyte composition or the composition for an electrode, which is specified in the present invention, reduction of interfacial resistance, binding property, and battery performance can be in balance with each other at a high level.

In addition, in all the all-solid state secondary batteries 101 to 107, 109 to 121, and the like using Si, Sn, or SiO as the negative electrode active material, the discharge capacity density is increased as compared with the all-solid state secondary battery 108 using graphite as the negative electrode active material layer. Moreover, these all-solid state secondary batteries maintain a firm film strength and a long battery life even in a case where the volume change of the negative electrode active material layer is large. As described above, according to the preferred aspect of the present invention, it is possible to solve the problems (the low binding property of solid particles and the short battery life) peculiar to the negative electrode active material layer having a large volume change. On the other hand, it can be seen that the all-solid state secondary batteries c01 to c03 using the binder that does not contain the non-spherical binder particles specified in the present invention are inferior in the binding property of the solid particles and the battery life, and thus the problems peculiar to the negative electrode active material layer having a large volume change cannot be solved.

The present invention has been described together with the embodiments of the present invention. However, the inventors of the present invention do not intend to limit the present invention in any part of the details of the description unless otherwise specified, and it is considered that the present invention should be broadly construed without departing from the spirit and scope of the invention shown in the attached "WHAT IS CLAIMED IS".

This application claims priority based on JP2018-192281 filed in Japan on Oct. 11, 2018, which is incorporated herein by reference as a part of the description of the present specification.

EXPLANATION OF REFERENCES

1: negative electrode current collector
2: negative electrode active material layer
3: solid electrolyte layer
4: positive electrode active material layer
5: positive electrode current collector
6: operation portion
10: all-solid state secondary battery
11: 2032-type coin case
12: laminate for all-solid state secondary battery
13: all-solid state secondary battery

What is claimed is:

1. A solid electrolyte composition comprising: an inorganic solid electrolyte having ion conductivity of a metal belonging to Group 1 or Group 2 in the periodic table; and a binder consisting of a polymer, wherein the binder contains non-spherical binder particles which consist of secondary particles formed of primary particles having an average primary particle size of 1 nm to 1,000 nm.

2. The solid electrolyte composition according to claim 1, wherein the secondary particles have an average particle size of 2 to 1,000 times the average primary particle size.

3. The solid electrolyte composition according to claim 1, wherein the secondary particle has an aspect ratio of 1.1 to 1,000.

4. The solid electrolyte composition according to claim 1, wherein the polymer exhibits a breaking elongation of 10% or more.

5. The solid electrolyte composition according to claim 1, further comprising a dispersion medium.

6. The solid electrolyte composition according to claim 1, further comprising an active material.

7. The solid electrolyte composition according to claim 6, wherein the active material is an active material that is capable of being alloyed with lithium.

8. The solid electrolyte composition according to claim 1, wherein the polymer contains at least one functional group selected from Group (a) of functional groups, wherein the Group (a) of functional groups comprises: an acidic functional group, a basic functional group, a hydroxy group, a cyano group, an alkoxysilyl group, an aryl group, a heteroaryl group, and an aliphatic hydrocarbon ring group in which 3 or more rings are fused.

9. The solid electrolyte composition according to claim 1, wherein the polymer is polyamide, polyimide, polyurea, polyurethane, or a (meth)acrylic polymer.

10. The solid electrolyte composition according to claim 1, wherein the inorganic solid electrolyte is a sulfide-based solid electrolyte.

11. A sheet for an all-solid state secondary battery, comprising a layer formed of the solid electrolyte composition according to claim 1.

12. An electrode sheet for an all-solid state secondary battery, the sheet comprising an active material layer formed of the solid electrolyte composition according to claim 6.

13. An all-solid state secondary battery comprising, in the following order:
a positive electrode active material layer;
a solid electrolyte layer; and
a negative electrode active material layer,
wherein at least one of the positive electrode active material layer, the negative electrode active material layer, or the solid electrolyte layer is a layer formed of the solid electrolyte composition according to claim 1.

14. The all-solid state secondary battery according to claim 13,
wherein the negative electrode active material layer is a layer formed of a solid electrolyte composition comprising:
an inorganic solid electrolyte having ion conductivity of a metal belonging to Group 1 or Group 2 in the periodic table;
a binder formed of a polymer, wherein the binder contains non-spherical binder particles consisting of secondary particles formed of primary particles having an average primary particle size of 1 to 1,000 nm; and
an active material.

15. The all-solid state secondary battery according to claim 14,
wherein the active material is an active material that is capable of being alloyed with lithium.

16. The solid electrolyte composition according to claim 1, wherein an average length of the secondary particles is in a range of 20 nm to 1,000 nm, and an average width of the secondary particles is in a range of 10 nm to 500 nm.

17. The solid electrolyte composition according to claim 1, wherein the secondary particles have an average particle size that is 2 times or more and 25 times or less of the average primary particle size.

18. The solid electrolyte composition according to claim 1, wherein an average length of the secondary particles is in a range of 20 nm to 1,000 nm, and an average width of the secondary particles is in a range of 10 nm to 500 nm, and the secondary particles have an average particle size that is 2 times or more and 25 times or less of the average primary particle size.

* * * * *